United States Patent [19]
Seto et al.

[11] Patent Number: 5,694,293
[45] Date of Patent: Dec. 2, 1997

[54] PORTABLE ELECTRONIC APPARATUS HAVING A UNIT WHICH GENERATES HEAT WHILE OPERATING AND A HOUSING CONTAINING THE UNIT, THE UNIT SUPPORTED BY A HOLDER ON A CIRCUIT BOARD AND A CONNECTOR SUPPORT MEMBER

[75] Inventors: Masaru Seto; Kazuya Shibasaki; Hiroaki Itakura; Hiroshi Nakamura, all of Tokyo, Japan

[73] Assignee: Kabushiki Kaisha Toshiba, Kawasaki, Japan

[21] Appl. No.: 534,872

[22] Filed: Sep. 27, 1995

[30] Foreign Application Priority Data

Oct. 31, 1994 [JP] Japan ................... 6-267553
Mar. 3, 1995 [JP] Japan ................... 7-044592

[51] Int. Cl.⁶ .................. G06F 1/20; G06F 1/16; H05K 7/20; H05K 7/02
[52] U.S. Cl. ............................. 361/687; 361/683
[58] Field of Search ............ 364/708.1; 361/680–687

[56] References Cited

U.S. PATENT DOCUMENTS

| | | |
|---|---|---|
| 4,143,417 | 3/1979 | Wald et al. . |
| 4,998,055 | 3/1991 | Nash et al. . |
| 5,015,546 | 5/1991 | Dulaney et al. . |
| 5,068,652 | 11/1991 | Kobayashi ............ 364/708.1 X |
| 5,216,371 | 6/1993 | Nagai . |
| 5,237,486 | 8/1993 | LaPointe et al. . |
| 5,243,549 | 9/1993 | Oshiba ............... 361/681 |
| 5,250,758 | 10/1993 | Fjelstad et al. . |
| 5,255,154 | 10/1993 | Hosoi et al. ........... 361/680 |
| 5,272,598 | 12/1993 | Kobayashi et al. . |
| 5,301,132 | 4/1994 | Akahame . |
| 5,305,180 | 4/1994 | Mitchell et al. . |
| 5,311,455 | 5/1994 | Ho . |
| 5,355,278 | 10/1994 | Hosoi et al. . |
| 5,365,502 | 11/1994 | Misono . |

OTHER PUBLICATIONS

Toshiba T1000XE Portable Computer Reference Manual, front cover, back cover, copyright page, Figures 1/F, 3/A, and 3/B, and p. 3-1.

*Primary Examiner*—Michael W. Phillips
*Attorney, Agent, or Firm*—Cushman, Darby & Cushman, IP Group of Pillsbury, Madison & Sutro LLP

[57] ABSTRACT

A portable electronic apparatus comprising a main body. The main body has a box-shaped housing including a unit receptacle. The unit receptacle protrudes upwards from said box-shaped housing and is located in a rear part of the box-shaped housing. The unit receptacle define a chamber and extends in a widthwise direction thereof. The apparatus further comprises a display unit and an AC power unit. The display unit is coupled to the rear part of the box-shaped housing. The AC power unit is provided in the chamber and electrically connected to said main body. The AC power unit is designed to convert AC power to DC power and supply the DC power to the main body. The AC power unit contains circuit components which generate heat while operating. The AC power unit is supported by a holder which is mounted on a circuit board and by a connector support member which is located at an inner side of the back wall of the box-shaped housing.

11 Claims, 30 Drawing Sheets

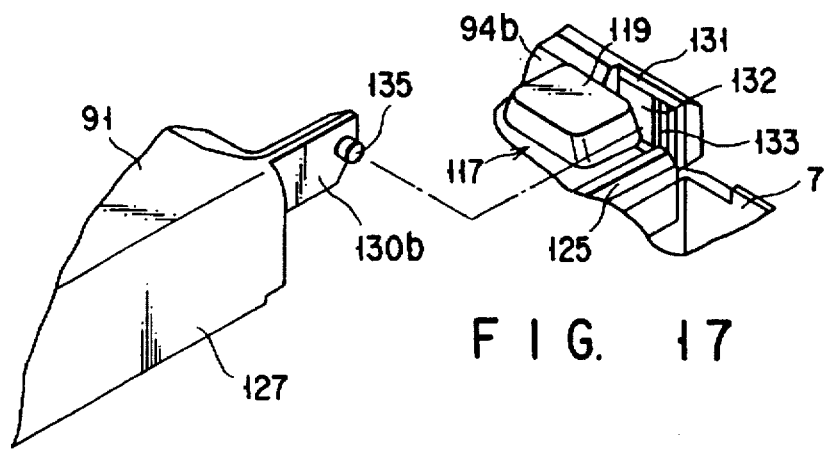
F I G. 17
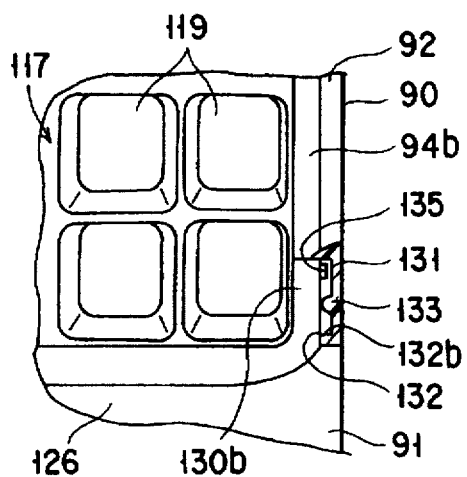
F I G. 18A
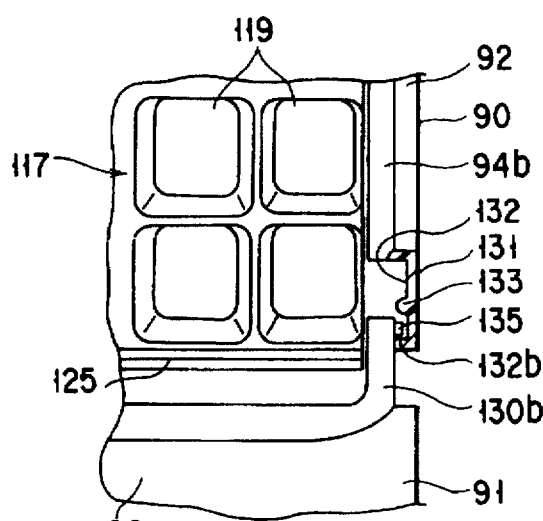
F I G. 18B
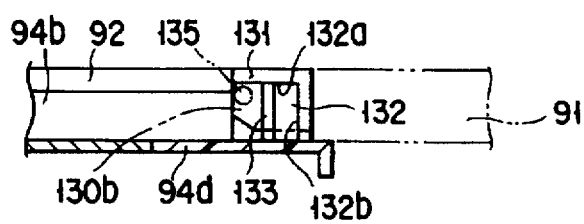
F I G. 19A
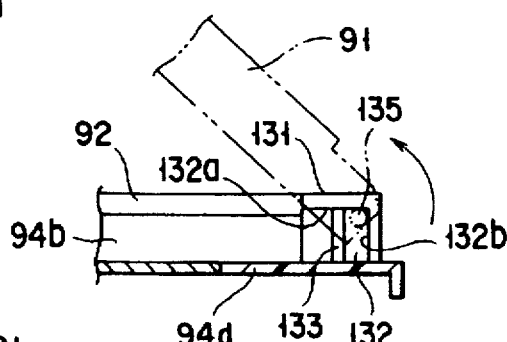
F I G. 19C
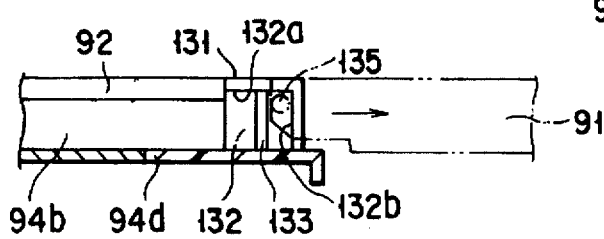
F I G. 19B

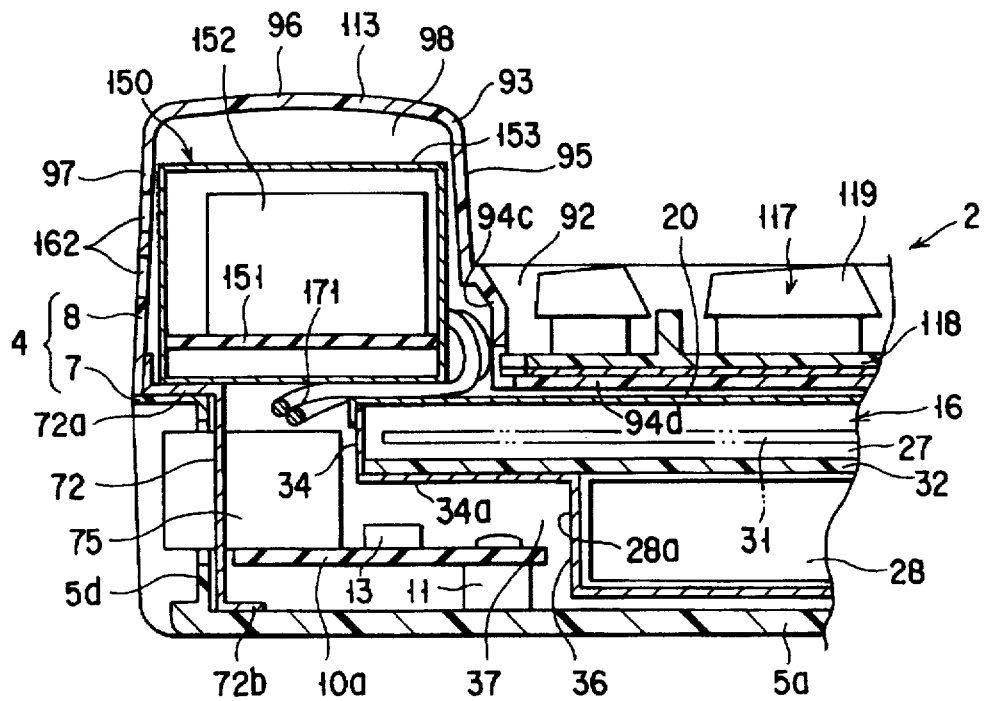
F I G. 23
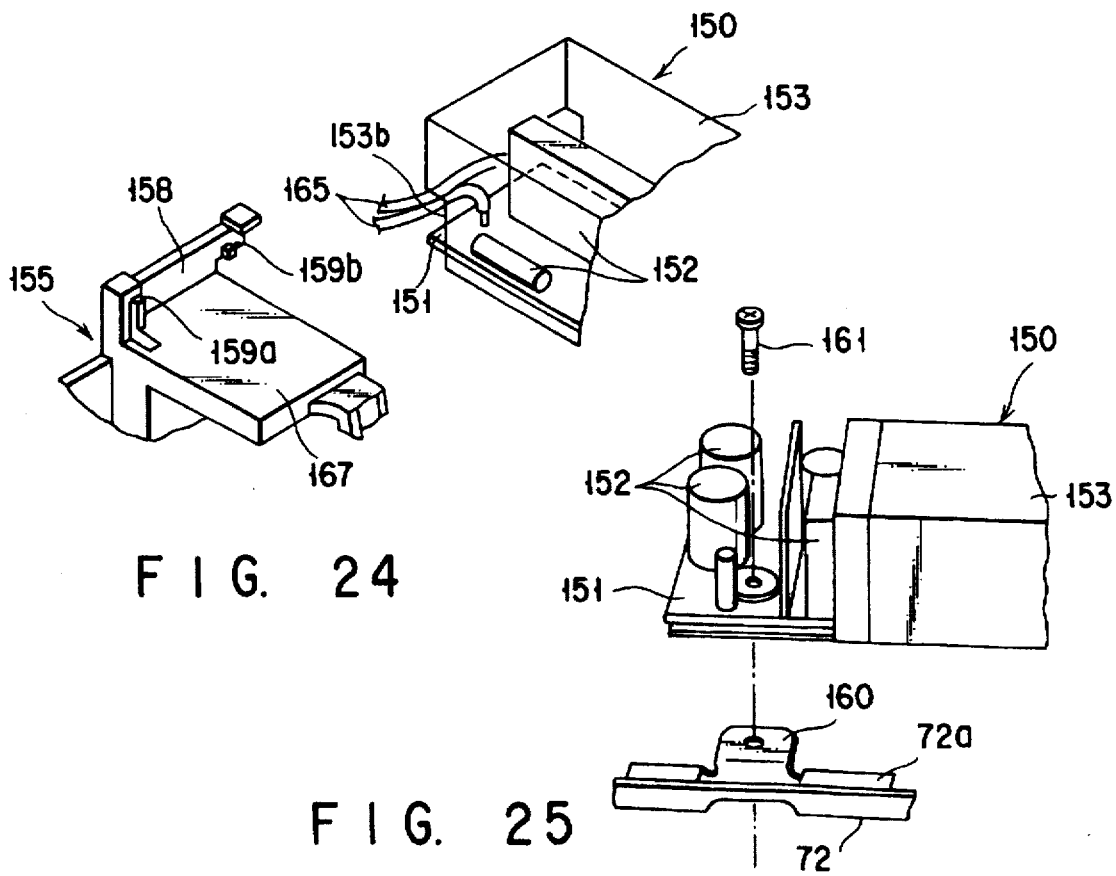
F I G. 24
F I G. 25

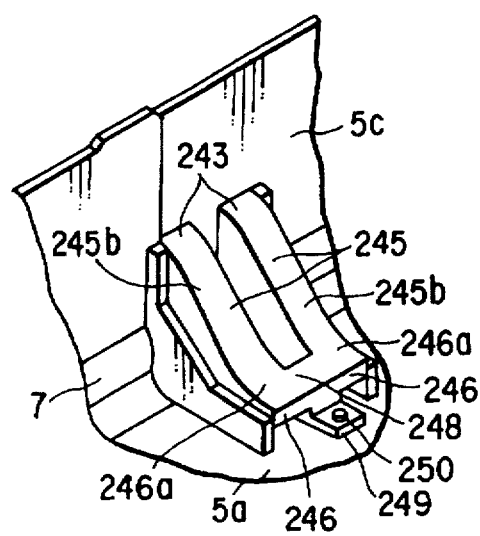
F I G. 27
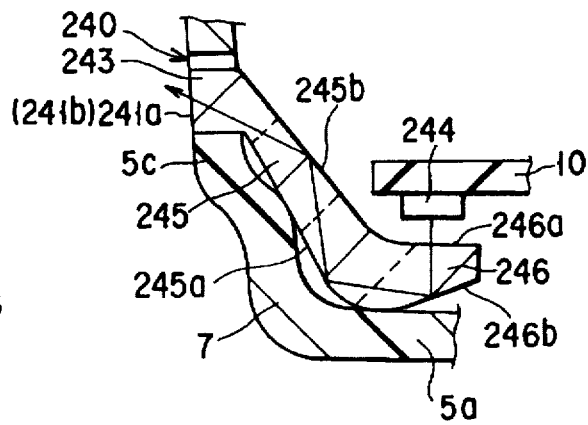
F I G. 29
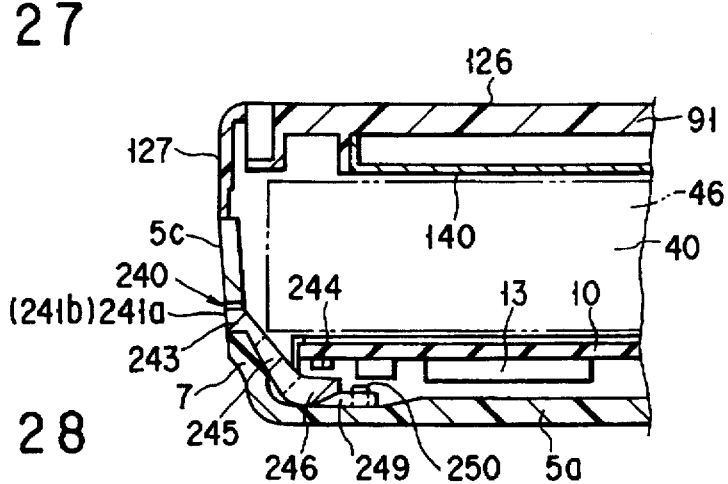
F I G. 28
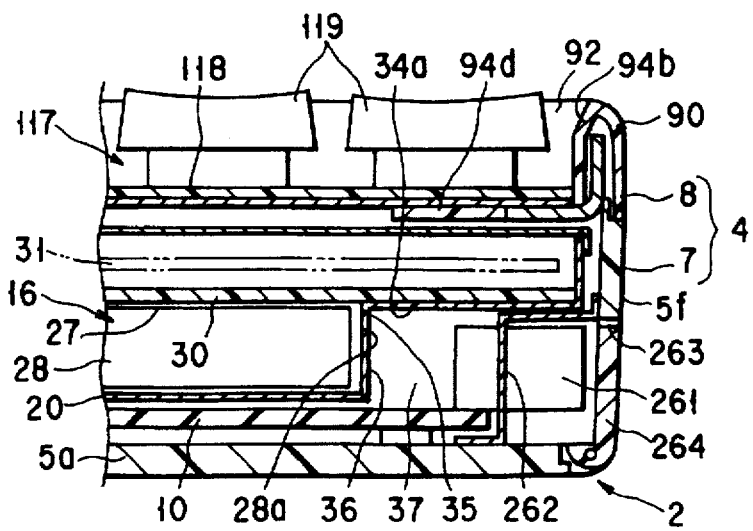
F I G. 30

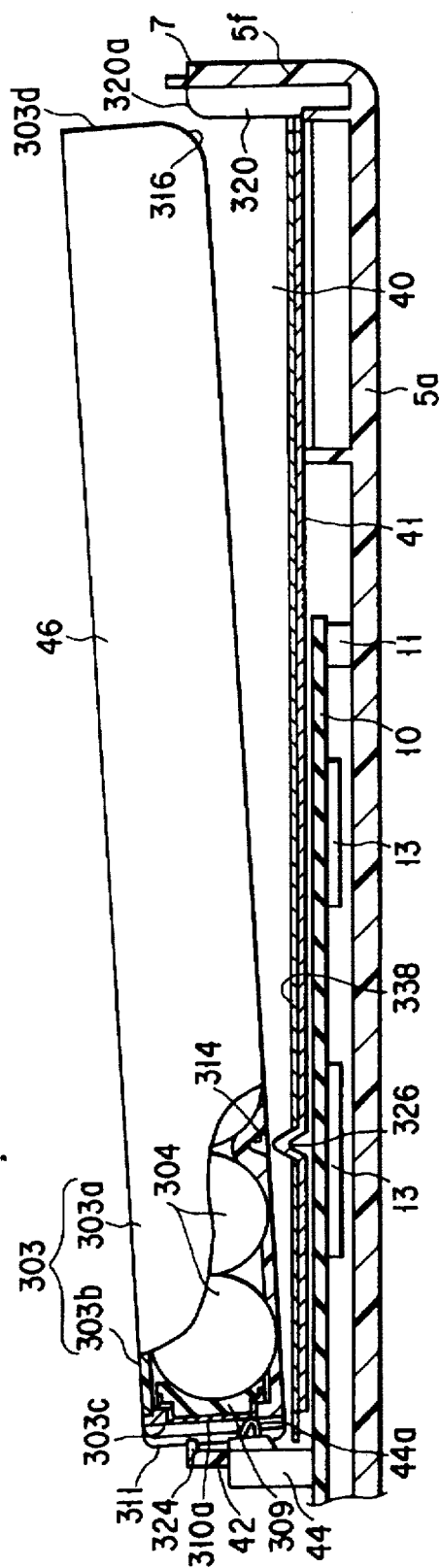
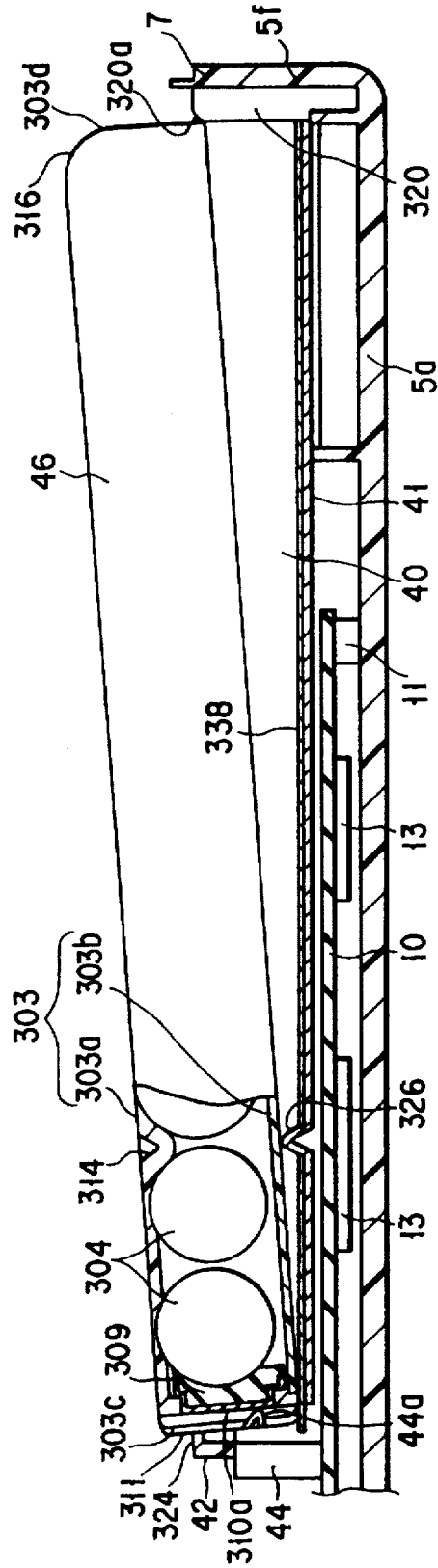
FIG. 38
FIG. 39

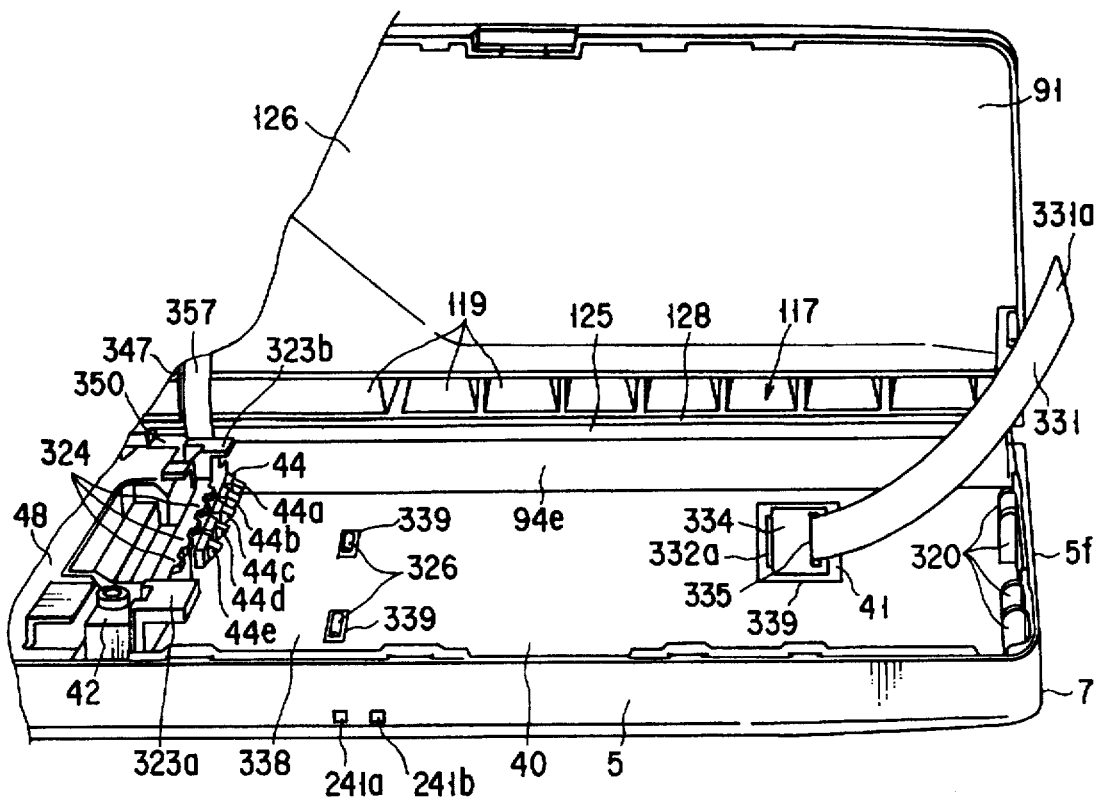
F I G. 40
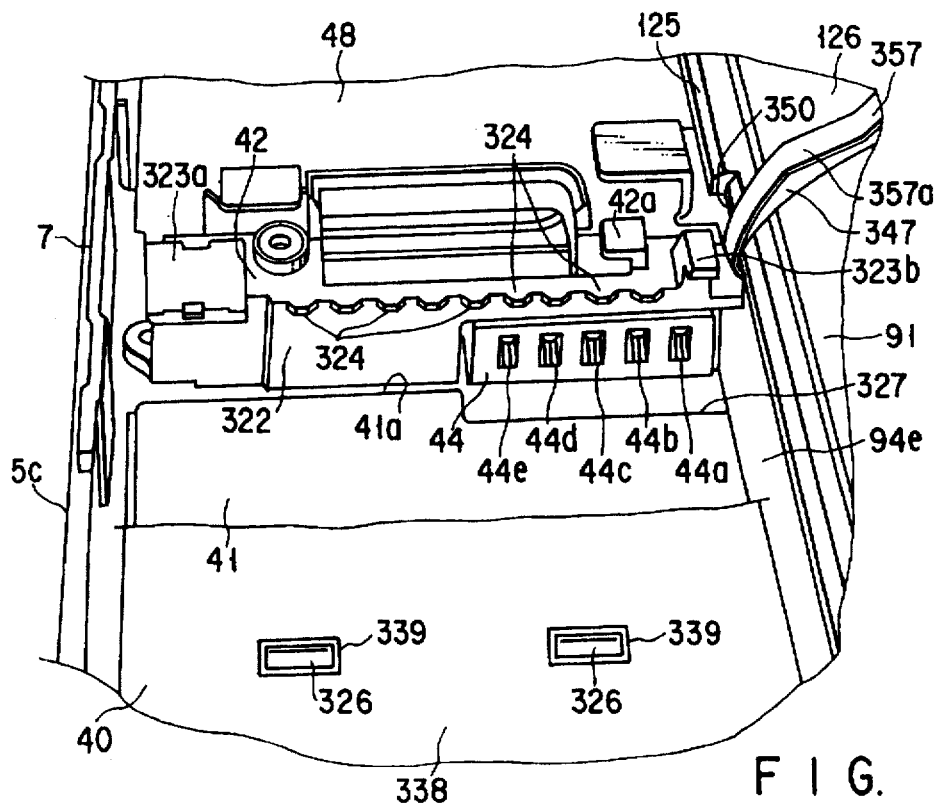
F I G. 41

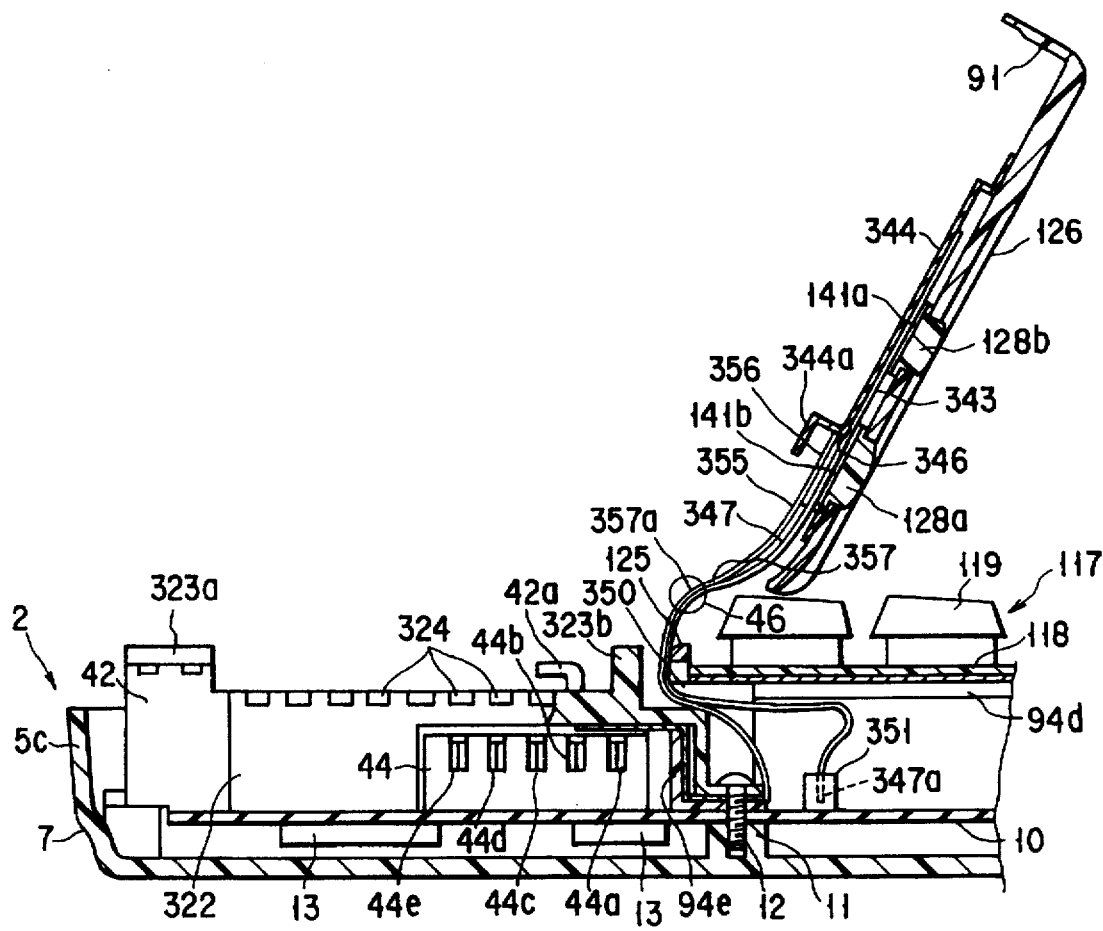
F I G. 45
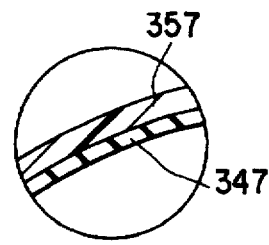
F I G. 46

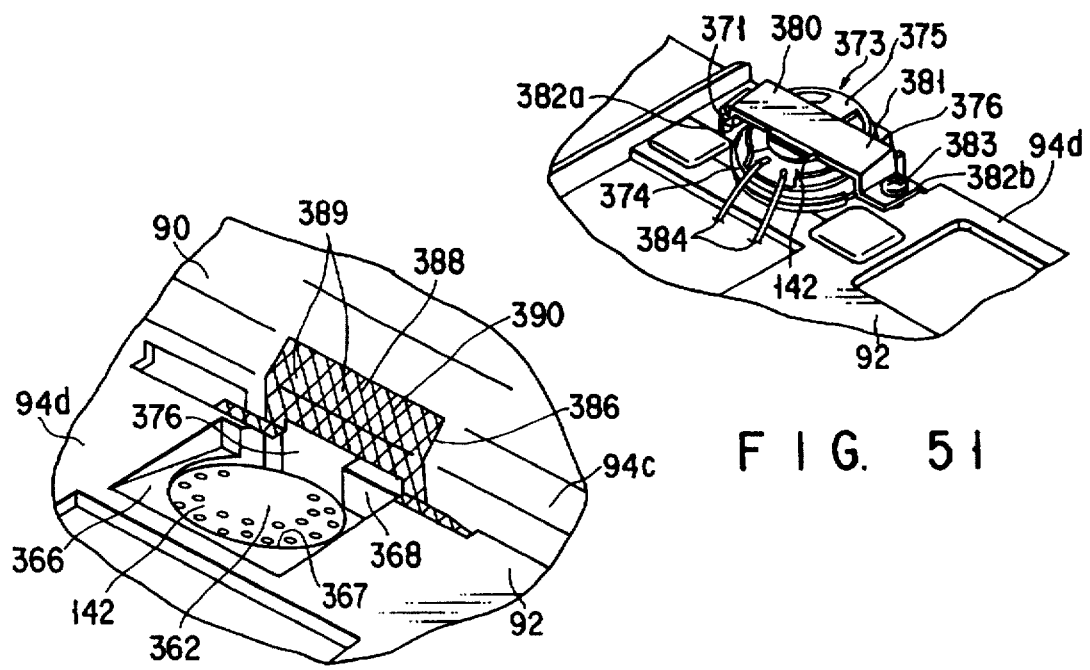
FIG. 51
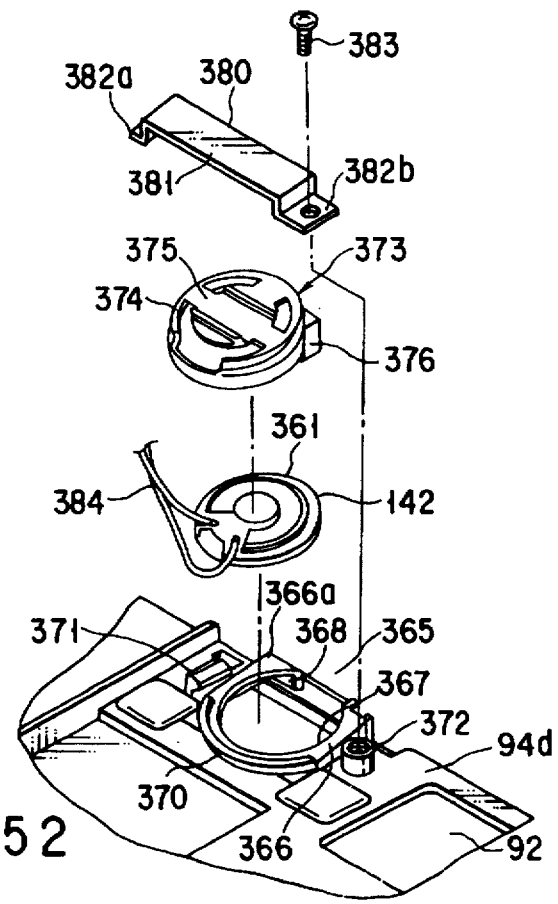
FIG. 50
FIG. 52

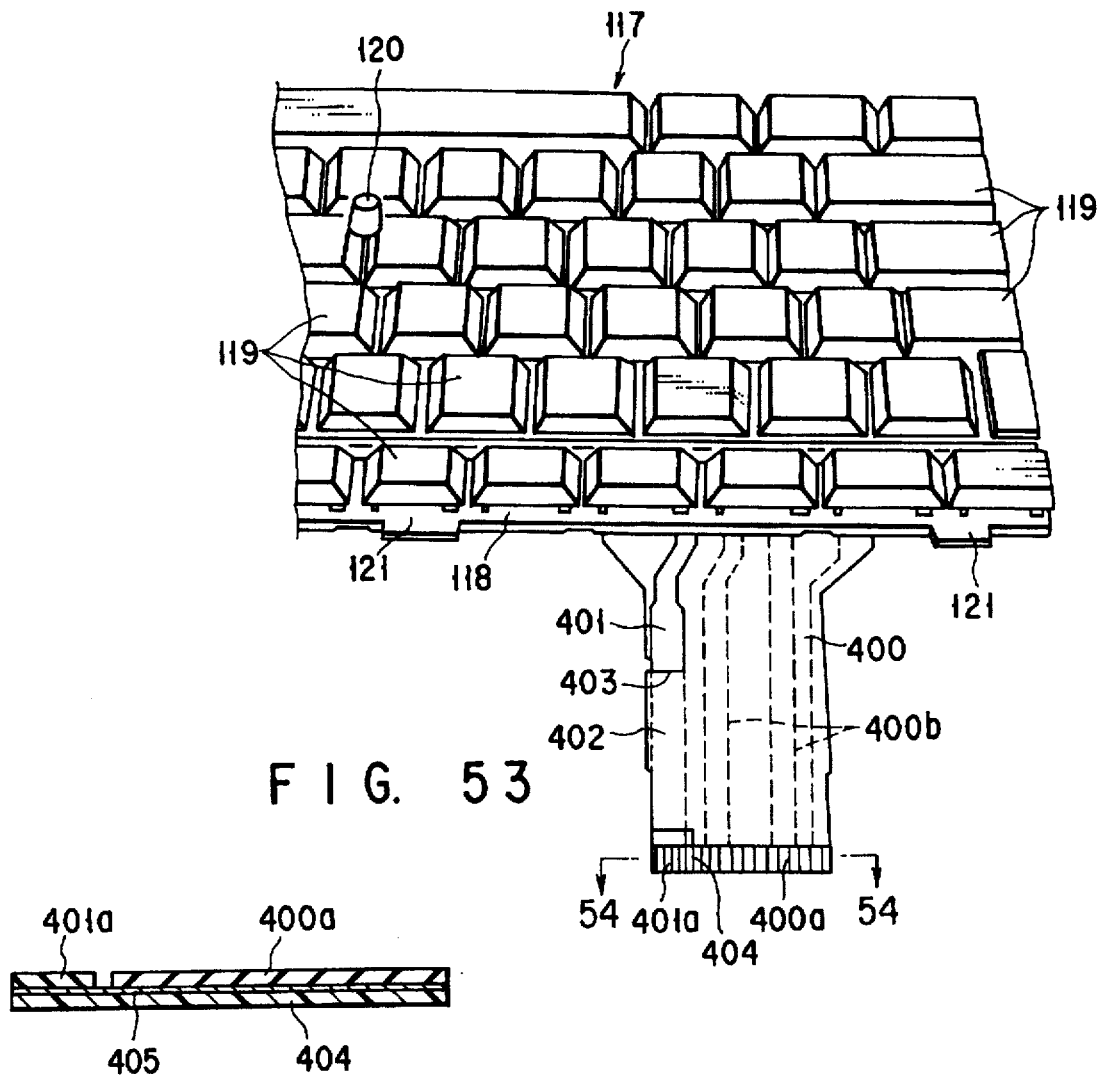
F I G. 53
F I G. 54
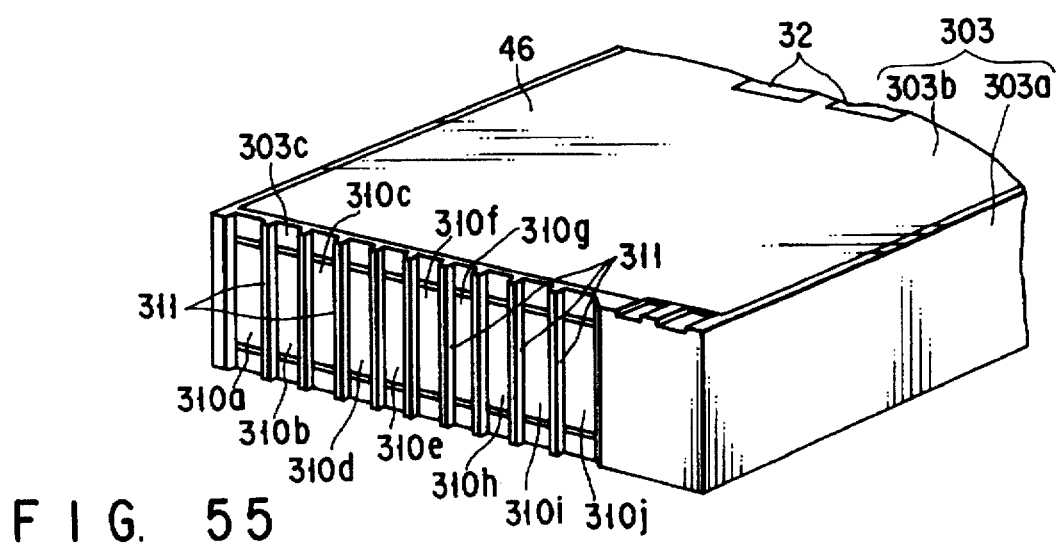
F I G. 55

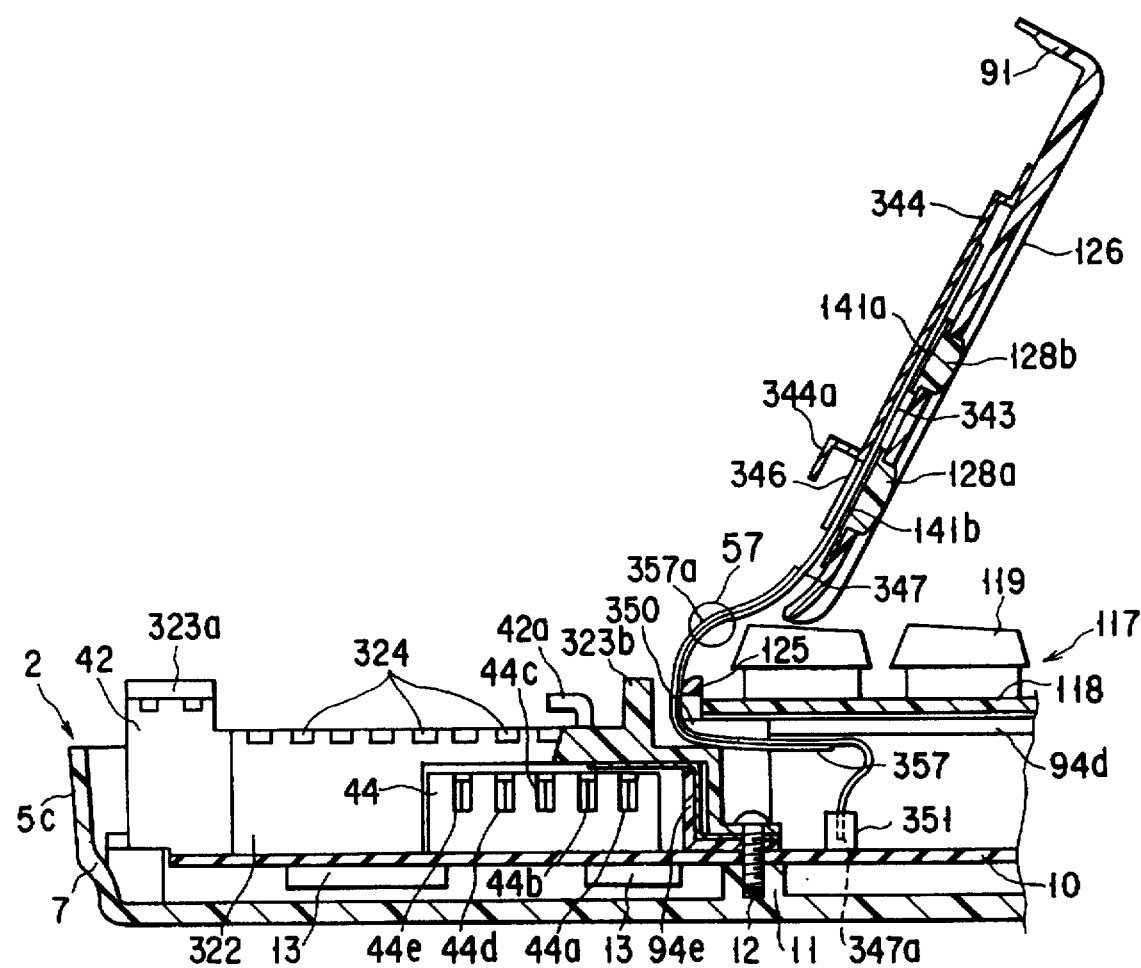
F I G. 56
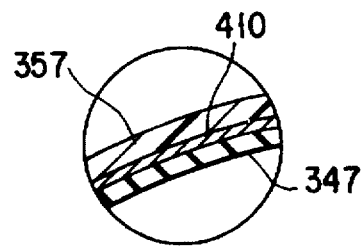
F I G. 57

5,694,293

PORTABLE ELECTRONIC APPARATUS HAVING A UNIT WHICH GENERATES HEAT WHILE OPERATING AND A HOUSING CONTAINING THE UNIT, THE UNIT SUPPORTED BY A HOLDER ON A CIRCUIT BOARD AND A CONNECTOR SUPPORT MEMBER

BACKGROUND OF THE INVENTION

1. Field of the Invention

The present invention relates to a portable electronic apparatus such as a book-type portable computer, and more particularly to a housing for containing a unit which generates heat while operating.

2. Description of the Related Art

Book-type portable computers are advantageous in some respects. First, they are easy to carry. Second, with battery packs, they can be used in places where no electric power is available.

To recharge the battery pack incorporated in a portable computer, an AC adapter, i.e., a device for converting an AC current to a DC current, must be removably connected to the computer at one end and to a commercial AC power supply at the other end. The user needs to carry the AC adapter, along with the computer, in case he or she finds that a little or no power remains in the battery pack. Relatively bulky and heavy, the AC adapter is inconvenient to carry it together with the book-type portable computer. After all, the AC adapter lessens the portability of the computer. To solve this problem, the AC adapter may be contained in the housing of the book-type portable computer.

Book-type portable computers recently developed are more compact and can perform more functions than the conventional ones. Each book-type portable computer has various function units packed densely in the housing. Among these units are: a hard disk drive or a CD-ROM drive, either capable of storing a great amount of data; and a card connector for connecting an interface card to the computer to achieve communication with external devices. In the housing no more space is available to accommodate the AC adapter. To accommodate the AC adapter, the housing may be made larger in height or depth, or both. This would obviously run counter to the demand that the portable computer be as small as possible.

There is another problem with the AC adapter. The AC adapter has circuit components which generate heat while they are converting an AC current to a DC current. If these circuit components are placed in a deep section of the housing of the portable computer, the heat they generate will hardly be radiated from the housing. The heat will greatly affect the various function units of the computer, which are usually located in the housing. To protect the units from the heat, a device must be used to cool the AC adapter.

SUMMARY OF THE INVENTION

The object of the present invention is to provide a portable electronic apparatus which comprises a relatively small housing and a unit contained in the housing and generating heat while operating, and in which the heat generated by the unit can be efficiently radiated from the housing to minimize the influence of the heat on the components incorporated in the housing and located near the unit.

To attain the object, a portable electronic apparatus according to the invention comprises: a main body having a box-shaped housing including a unit receptacle which protrudes upwards from a top of the housing, which is located in a rear part of the housing and which extends in a widthwise direction thereof; a display unit coupled to the rear part of the housing; and a unit provided in the unit receptacle, electrically connected to the main body, assembled in the form of a module, and containing circuit components which generate heat while operating.

Since the unit receptacle protrude upwards from the top of the housing and is not provided within the housing, space need not be provided in the housing to accommodate the unit. The unit can therefore be integrated with the housing, without making the housing larger.

When the unit generates heat, the heat is radiated outside the housing through the walls of the unit receptacle. The heat can hardly accumulate within the housing. The heat would not influence the housing. Nor would the unit be overheated.

According to the present invention, there is provided another portable electronic apparatus comprising: a main body which has a box-shaped housing containing data input means and having a top wall, a unit receptacle having a hollow communicating with the interior of the housing and projecting upwards from the top wall of the housing and extending in the widthwise direction thereof, a first display support portion provided at one end of the projection, and a second display support portion provided at the other end of the projection; a display unit having a first leg rotatably supported by the first display support portion a second leg rotatably supported by the second display support portion; and an AC power unit provided in the hollow of the projection, connected to the main body, designed to convert an AC power to a DC power and supplies the DC power to the main body, and containing circuit components which generate heat while operating.

The projection for supporting the display unit contains only small parts such as an indicator and cables extending from the display unit and an indicator. It has an extra space, in which the AC power unit is incorporated. Thus, the housing need not be made larger to accommodate the AC power unit. Furthermore, since the projection protrudes upwards from the top wall of the housing, heat generated by of the AC power unit is radiated through the walls of the projection and does not propagate into the housing. The heat the AC power unit generates is radiated through the walls of the projection, not propagating into the housing. No heat accumulation occurs within the housing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 17 is an exploded perspective view showing the mechanism coupling the arm rest and the keyboard receptacle together;

FIG. 18A is a cutaway plan view of a part of first embodiment, illustrating the arm rest pushed into the keyboard receptacle;

FIG. 18B is a cutaway plan view of a part of the first embodiment, showing the arm rest pulled out of the keyboard receptacle;

FIG. 19A is a sectional view, showing the positional relationship which the arm rest has with the recess made in the keyboard receptacle when the arm rest is pushed toward the keyboard receptacle;

FIG. 19B is a sectional view, illustrating the positional relationship which the arm rest has with the recess when the arm rest is pulled from the keyboard receptacle;

FIG. 19C is a sectional view, showing the positional relationship which the arm rest has with the recess when the arm rest is rotated upwards;

FIG. 23 is a sectional view of a part of the first embodiment, showing how a relay cable extends from the AC power unit;

FIG. 24 is an exploded perspective view, showing the positional relationship between the AC power unit and the holder;

FIG. 25 is an exploded perspective view, showing the positional relationship between the AC power unit and the connector panel;

FIG. 27 is a perspective view of the indicator incorporated in the first embodiment;

FIG. 28 is a sectional view of a part of the first embodiment, illustrating the indicator secured to the lower housing half;

FIG. 29 is a sectional view, illustrating an optical path extending from the light-emitting diode to the lens, both incorporated in the first embodiment;

FIG. 30 is a sectional view showing a part of a portable computer which is a second embodiment of the present invention;

FIG. 38 is a sectional view of a part of the fifth embodiment, illustrating the battery pack inserted in the battery receptacle;

FIG. 39 is a sectional view of a part of the fifth embodiment, showing the battery pack inserted in a wrong position in the battery receptacle;

FIG. 40 is a perspective view of the battery receptacle used in the fifth embodiment;

FIG. 41 is a perspective view of the battery receptacle, showing the battery connector;

FIG. 45 is a sectional view of a part of the fifth embodiment, showing the arm rest rotated into the opened position;

FIG. 46 is an enlarged view of section 46 in FIG. 45;

FIG. 50 is a perspective view the speaker holding section;

FIG. 51 is a perspective view showing the speaker held by the speaker holder;

FIG. 52 is an exploded view of the speaker holder;

FIG. 53 is a perspective view of the keyboard used in the fifth embodiment;

FIG. 54 is a sectional view taken along line 54—54 in FIG. 53;

FIG. 55 is a perspective view of the battery pack as seen from the terminal side, said pack designed for use in a portable computer which is the sixth embodiment of the invention;

FIG. 56 is a sectional view of a part of a portable computer which is a seventh embodiment of the invention, illustrating the arm rest set in the open position; and FIG. 57 is an enlarged view of section 57 in FIG. 56.

DETAILED DESCRIPTION OF THE PREFERRED EMBODIMENTS

A book-type portable computer, which is the first embodiment of the present invention, will be described with reference to FIGS. 1 to 29.

Figure 1:
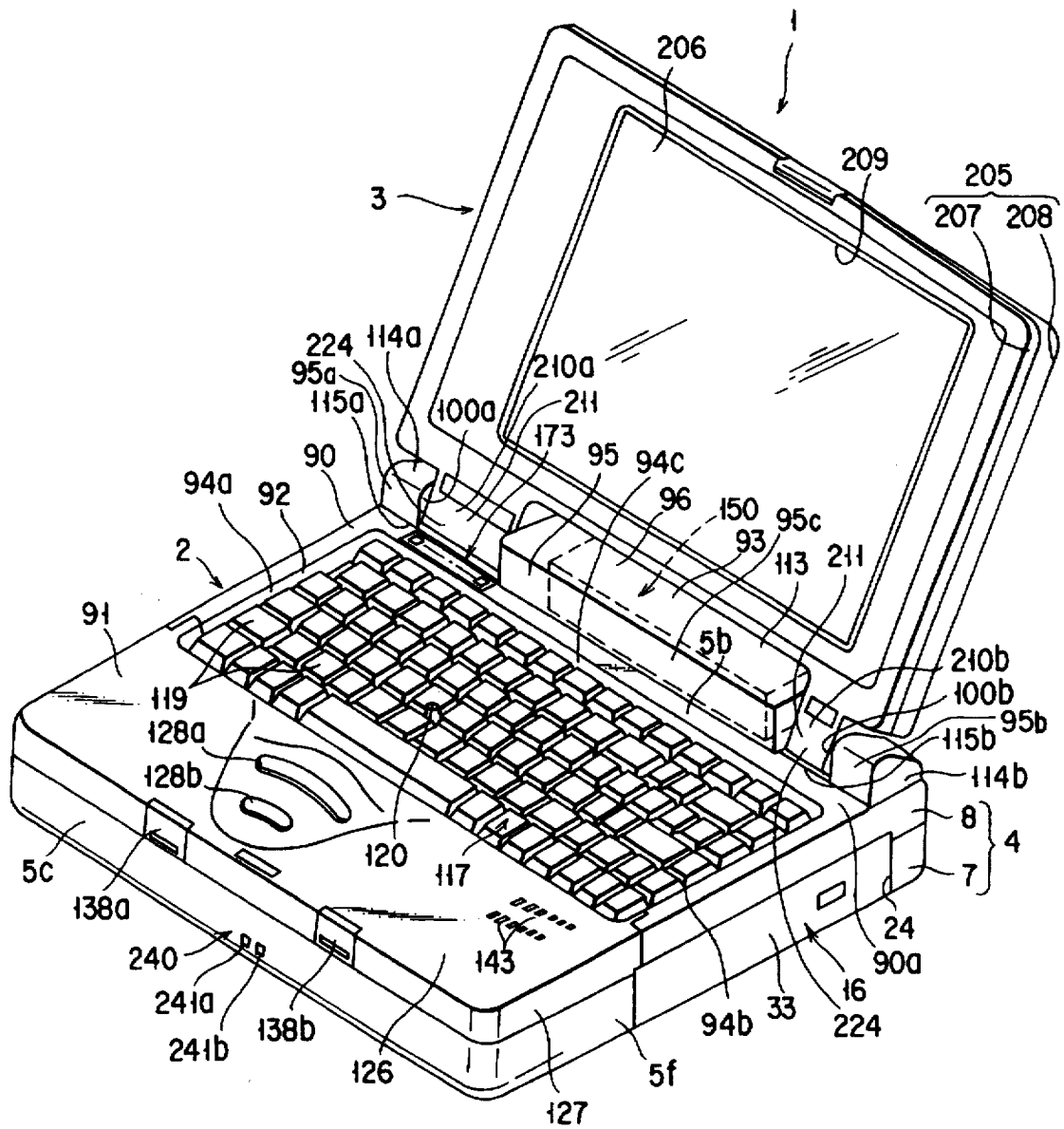
FIG. 1 is a perspective view of a portable computer which is a first embodiment of the invention.

FIG. 1 is a perspective view of the portable computer 1 which has the size of an A4 paper sheet. The computer 1 comprises a main body 2 and a display unit 3. The main body 2 is mounted on a desk when the portable computer is used. The display unit 3 is rotatably connected to the main body 2.

The main body 2 has a rectangular, box-shaped housing 4. The housing 4 is shaped like a flat box and has a rectangular bottom wall 5a, a rectangular top wall 5b, a front wall 5c, a back wall 5d, a left-side wall 5e, and a right-side wall 5f. The walls 5c, 5d, 5e and 5f are continuous to the bottom wall 5a and the top wall 5b. More precisely, the housing 4 consists of a lower housing half 7 and an upper housing half 8, which are made of a synthetic resin such as ABS (Acrylonitrile Butadiene Styrene) resin. The lower housing half 7 comprises the rectangular bottom wall 5a, the front wall 5c, the back wall 5d and the side walls 5e and 5f, whereas the upper housing half 8 has the top wall 5b.

Figure 5:
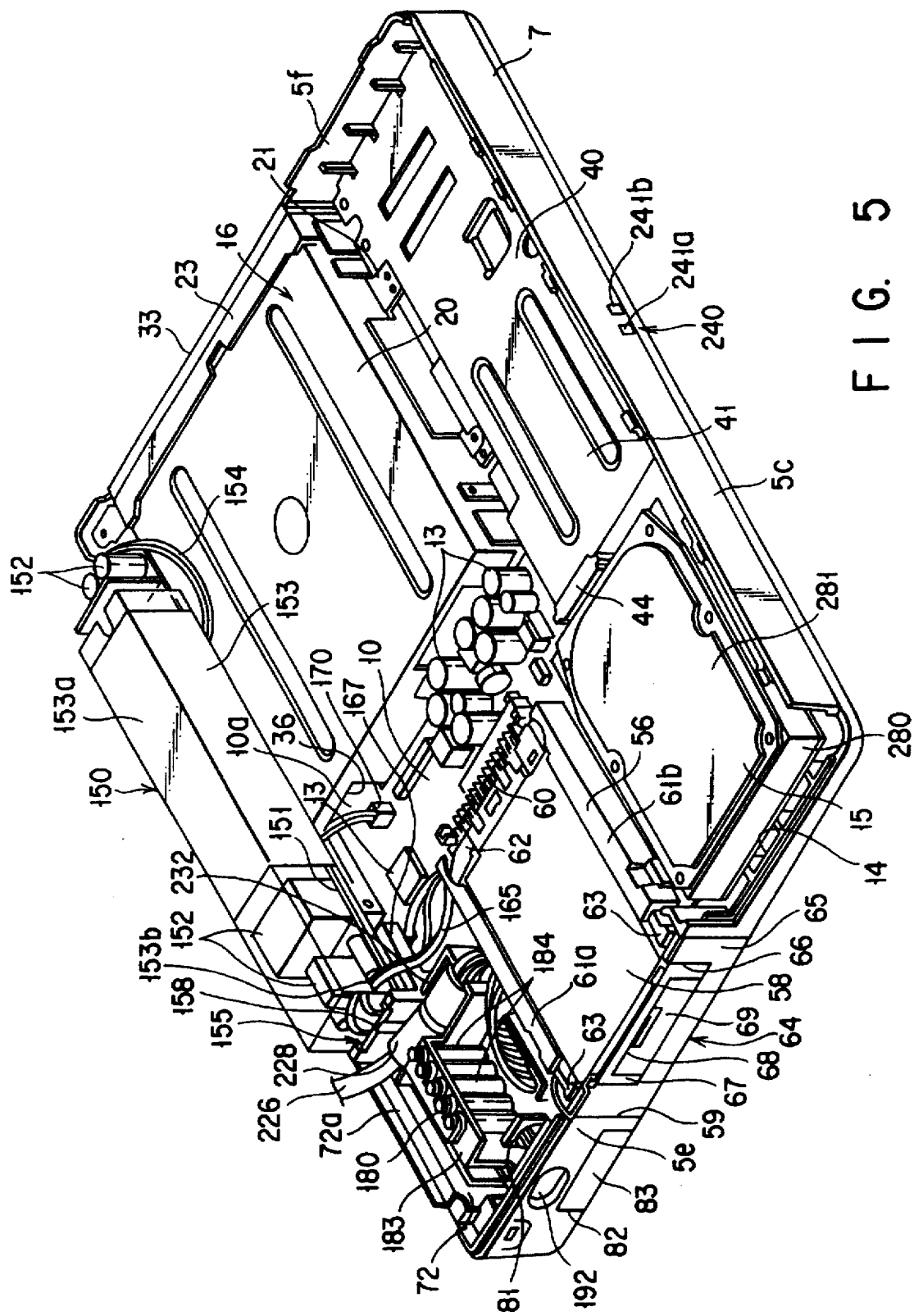
FIG. 5 is a perspective view of the lower housing half of the first embodiment, showing various function units arranged in the lower housing half, including the hard disk drive, the CD-ROM drive and the AC power unit.
Figure 13:
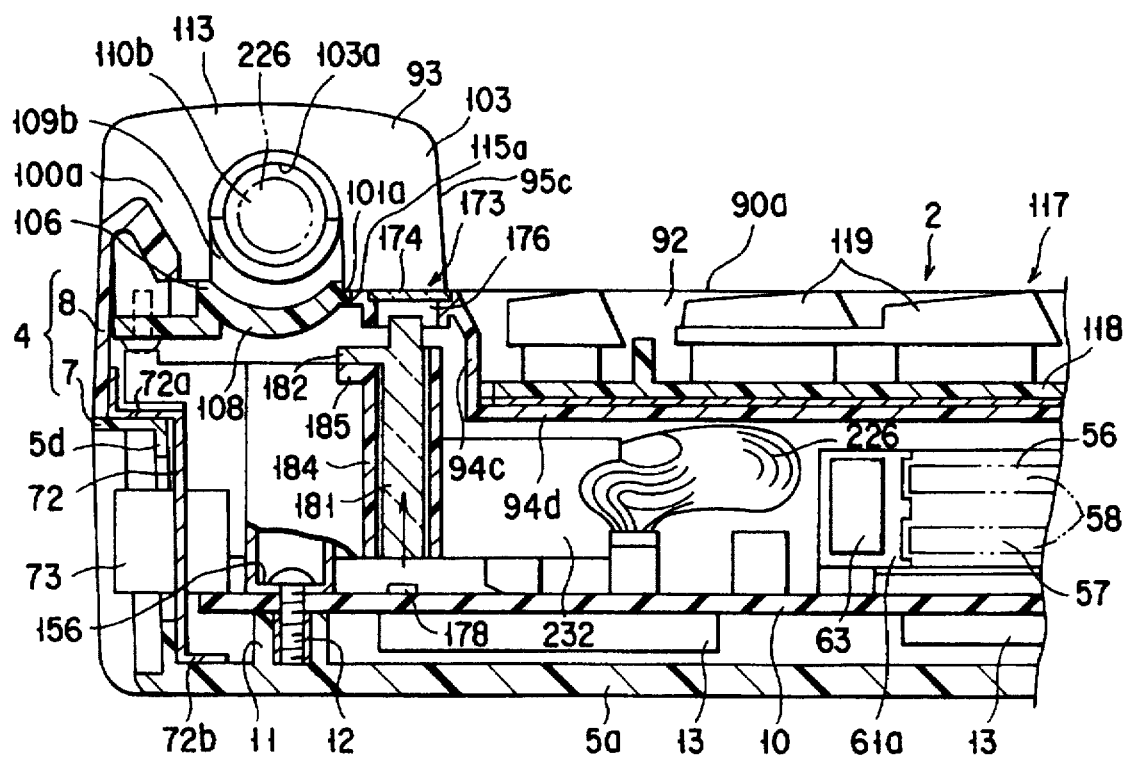
FIG. 13 is a sectional view of a part of the first embodiment, illustrating the positional relationship between icons and light-emitting diodes.

As shown in FIGS. 5 and 13, a circuit board 10 is provided in the left half of the lower housing half 7. The circuit board 10 is secured by screws 12 to the bosses 11 which are formed integral with the bottom wall 5a and extends parallel thereto. The three sides of the board 10 are located near the front wall 5c, the back wall 5d and left-side wall 5e of the lower housing half 7. Various circuit components 13 including an LSI package are mounted on the upper and lower surfaces of the circuit board 10.

Figure 7:
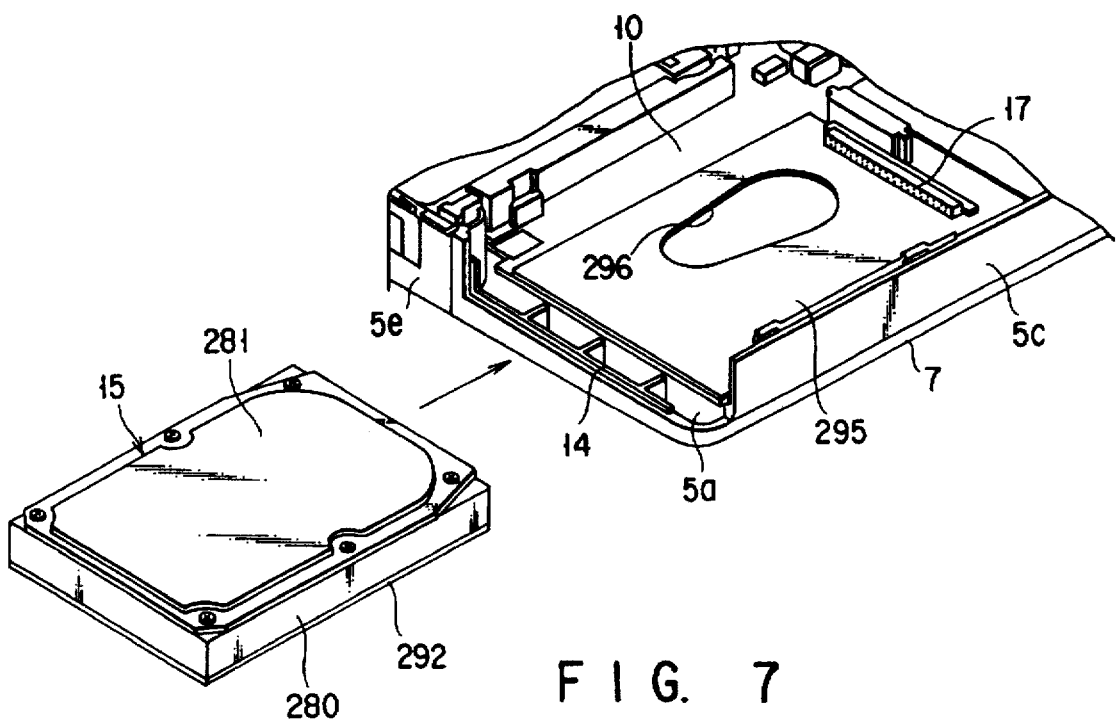
FIG. 7 is a perspective view showing a part of the lower housing half and the hard disk drive removed from the lower housing half.

As shown in FIG. 5, a hard disk drive 15 (hereinafter referred to as "HDD 15") and a CD-ROM drive 16 are provided in the lower housing half 7. The HDD 15 is located in the front-left part of the lower housing half 7 and mounted on the circuit board 10. As shown in FIG. 7, the left-side wall 5e of the lower housing half 7 has an HDD insertion port 14. The lower edge of the port 14 is at the same level as the upper surface of the circuit board 10. On the circuit board 10 there is arranged a hard disk connector 17, which faces the HDD insertion port 14. Through the port 14 the HDD 15 is removed from the lower housing half 7. As seen from FIGS. 7 and 8, the HDD 15 has a metal housing 280. The housing 280 is a rectangular box, having an open top which is closed by a top cover 281 in airtight fashion. The housing 280 has a bottom wall 282 which extends parallel to the top cover 281. The bottom wall 282 has a motor-holding hole 283. A motor-supporting bracket 284 is provided which has a body 285. The body 285 is fitted in the motor-holding hole 283, whereby the bracket 284 is secured to the housing 280. The body 285 protrudes downwards from the bottom wall 282 of the metal housing 280 and has a flat lower surface 285a.

The metal housing 280 contains an electric motor 287. The motor 287 has a shaft 288, which is supported by the body 285 of the motor-supporting bracket 284. Rotatably mounted on the shaft 288 is the boss 290a of a rotor 290. A magnetic recording medium 291 shaped like a disk is mounted and fixed on the circumferential surface of the rotor 290.

A wiring board 292 is secured to the metal housing 280, extends parallel to the bottom wall 282 thereof and is electrically connected to the motor 287. A relay connector 293 is attached to one end of the wiring board 292 and remains connected to the hard disk connector 17 as long as the HDD 15 is set in the lower housing half 7. The wiring board 292 has an opening 294. The body 285 of the motor-supporting bracket 284 extends through this opening 294 and slightly projects downwards from the lower surface of the wiring board 292.

Figure 8:
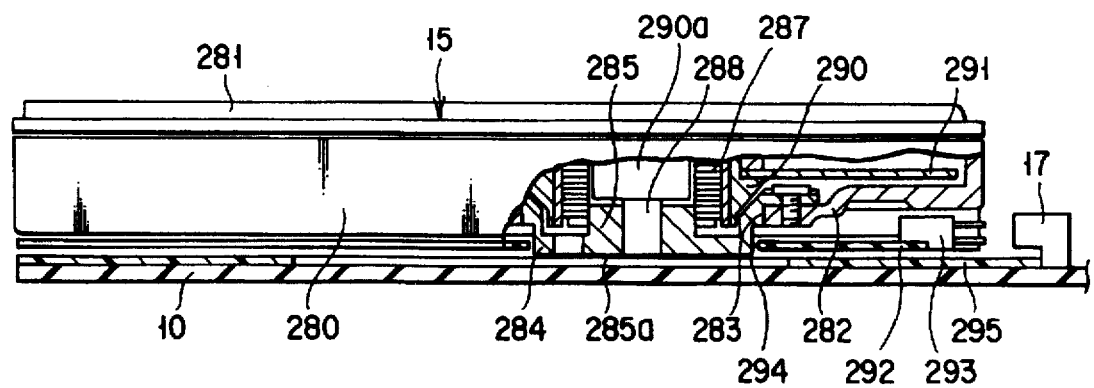
FIG. 8 is a cutaway side view of the housing of the hard disk drive.
Figure 10:
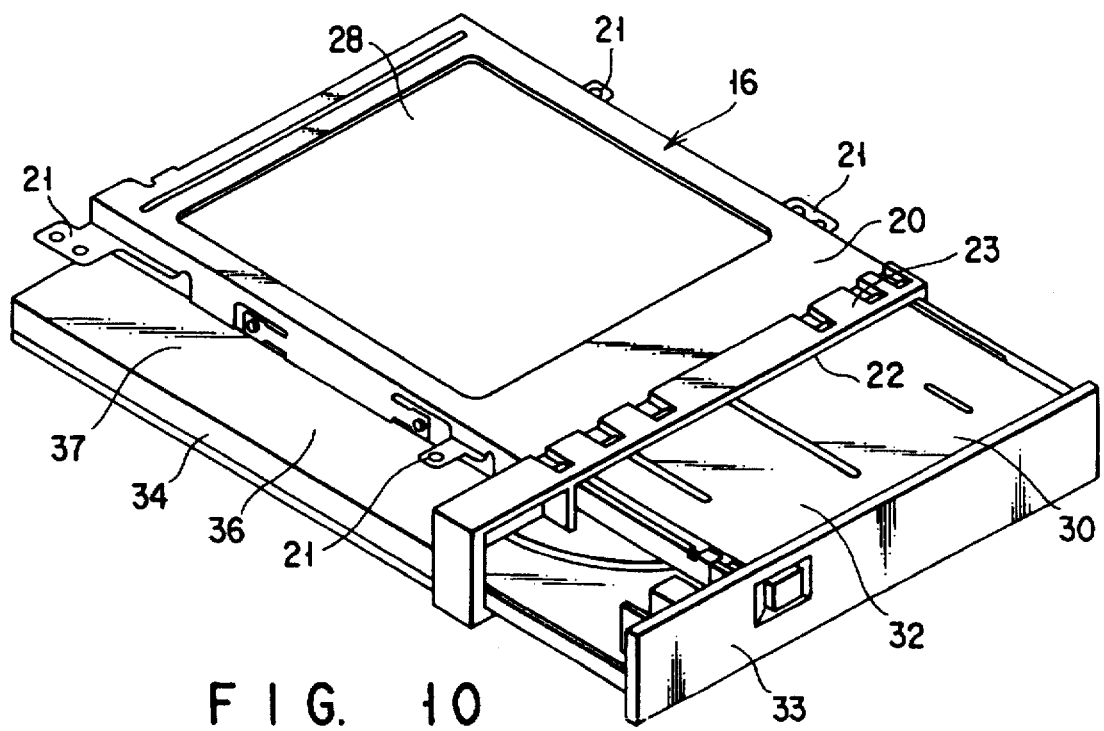
FIG. 10 is a perspective view of the CD-ROM drive, seen from the bottom.
Figure 11:
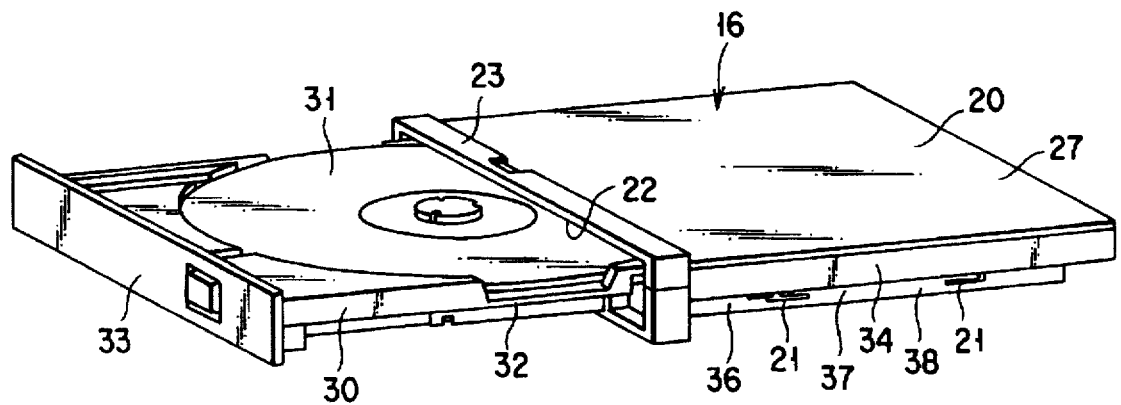
FIG. 11 is a perspective view of the CD-ROM drive.

As shown in FIGS. 7 and 8, the upper surface of the circuit board 15, which opposes the HDD 15, is covered with a smooth insulating sheet 295. The insulating sheet 295 prevents the wiring board 292 of the HDD 15 from coming into frictional contact with the circuit board 10 when the HDD 15 is inserted into the lower housing half 7 through the insertion port 14 made in the left-side wall 5e of the lower housing half 7. The wiring board 292 moves in sliding contact with the insulating sheet 295 as the HDD 15 is inserted into the lower housing half 7. Since the body 285 of the motor-supporting bracket 284 extends through the opening 294 of the wiring board 292 and projects downwards from the lower surface thereof, the insulating sheet 295 has an escape hole 296. Due to the escape hole 296, the insulating sheet 295 remains out of contact with the body 285 of the motor-supporting bracket 284. The escape hole 296 is elliptical, extending in the direction in which the HDD 15 can be inserted into and pulled from the lower housing half 7. It is in this hole 296 that the lower surface 285a of the body 285 is located. Hence, the lower surface 285a of the body 285 neither abuts on, nor comes into frictional contact with, the insulating sheet 295 when the HDD 15 is inserted into or pulled from the lower housing half 7. As seen from FIGS. 5 and 6, the CD-ROM drive 16 is located in the right half of the lower housing half 7. The CD-ROM drive 16 has a metal casing 20 as is shown in FIGS. 10 and 11. The casing 20 is a flat box and thin enough to be set within the lower housing half 7. The casing 20 has a plurality of tongues 21 and a guide frame 23. The frame 23 defines a disk insertion port 22. The tongues 21 are fastened by screws to the bottom wall 5a of the lower half half 7. The casing 20 is thereby secured to the lower housing half 7, with the guide frame 23 opposing the right-side wall 5f of the lower housing half 7. The right-side wall 5f has an opening 24, in which the guide frame 23 is fitted.

Provided in the casing 20 are a disk receptacle 27 and a disk-driving unit 28. As shown in FIGS. 10 and 11, the disk receptacle 27 contains a disk holder 30 which can be pulled from the casing 20. The disk holder 30 has a bottom wall 32 and an end wall 33. The bottom wall 32 supports an optical disk 31. The end wall 33 is connected to the right edge of the bottom wall 32. The size of the holder 30 is determined by the diameter of the optical disk 31. The end wall 33 is large enough to close the disk insertion port 22. The end wall 33 remains flush with the side wall 5f of the lower housing half 7 as long as the disk holder 30 is set within the metal casing 20. The disk holder 30 can be pulled from the disk receptacle 27 through the opening 24 made in the right-side wall 5f of the lower housing half 7.

Figure 9:
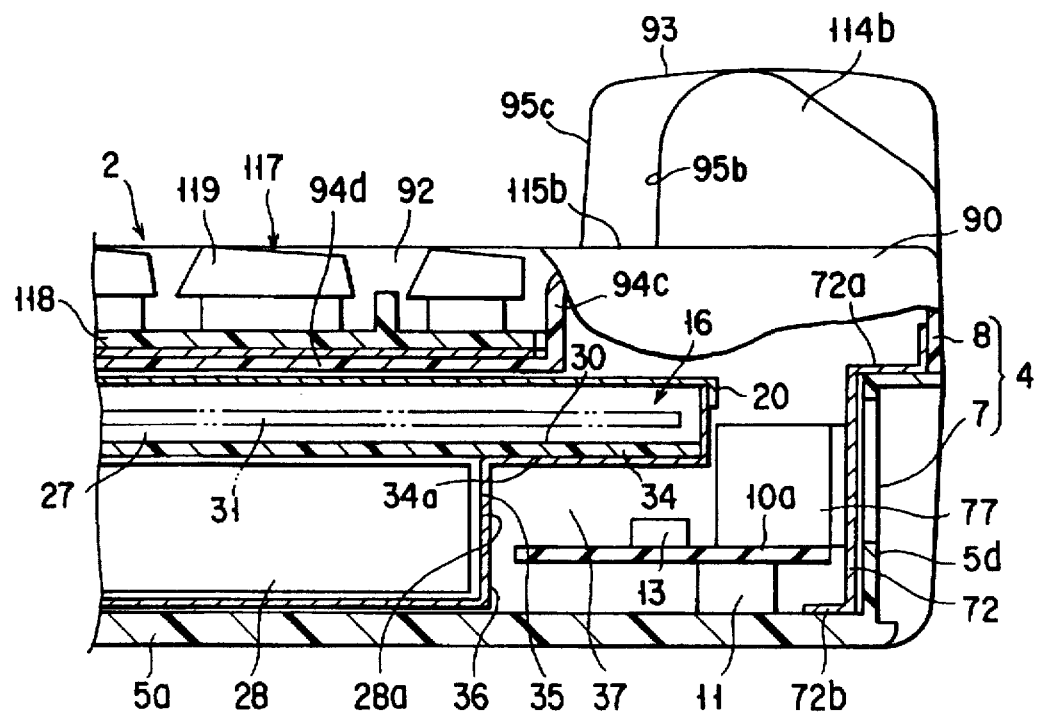
FIG. 9 is a sectional view of a part of the first embodiment, showing the section for accommodating the CD-ROM drive.

The disk-driving unit 28 has a spindle motor for rotating the optical disk 31 and a control circuit for controlling the spindle motor. The unit 28 is located below the disk receptacle 27 and is smaller than the disk receptacle 27. Thus, the disk receptacle 27 has a portion 34 protruding from one side of the disk-driving unit 28. This portion 34 has a lower surface 34a which is continuous to the side 28a of the disk-driving unit 28. The lower surface 34a of the protruding portion 34 and the side 28a of the unit 28 define a corner 35 which is located at one side of the metal casing 20. The metal casing 20 has a recess 36 which is contiguous to the corner 35. The recess 36 defines a space 37 opening downwards and to the side of the casing 20. As shown in FIG. 9, the recess 36 faces to the bottom wall 5a and back wall 5d of the lower housing half 7.

Figure 2:
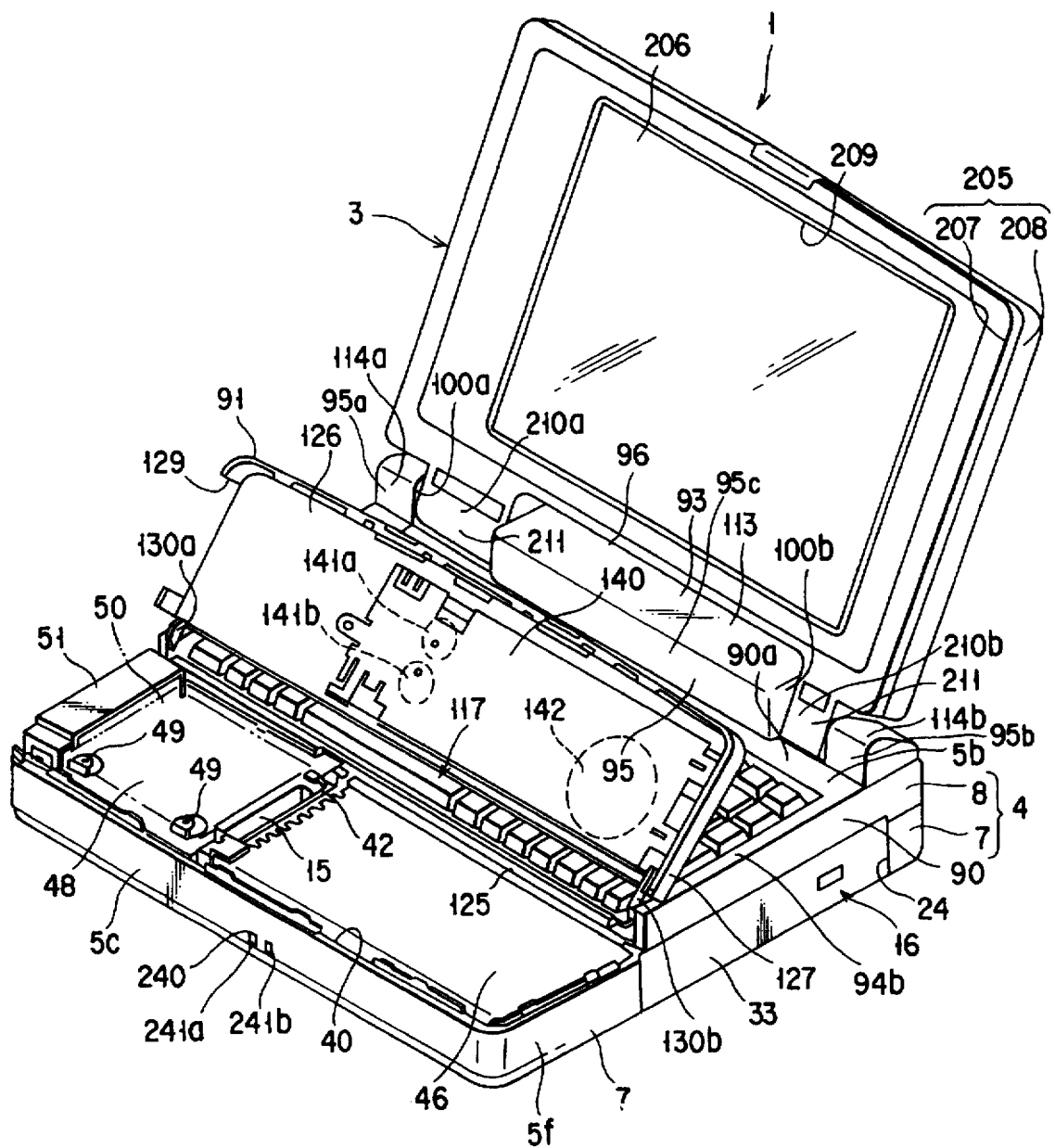
FIG. 2 is a perspective view of the portable computer of the first embodiment, showing the arm rest opened, exposing the battery pack.

As illustrated in FIGS. 2 and 5, the lower housing half 7 contains a battery receptacle 40. The battery receptacle 40 is located at the right of the HDD 15 and in front of the CD-ROM drive 16. The receptacle 40 is a recess which opens upwards. The bottom of the battery receptacle 40 is covered with a metal shield plate 41. The shield plate 41 covers the bottom wall 5a of the lower housing half 7 and also the upper surface of the front half of the circuit board 10.

Figure 3:
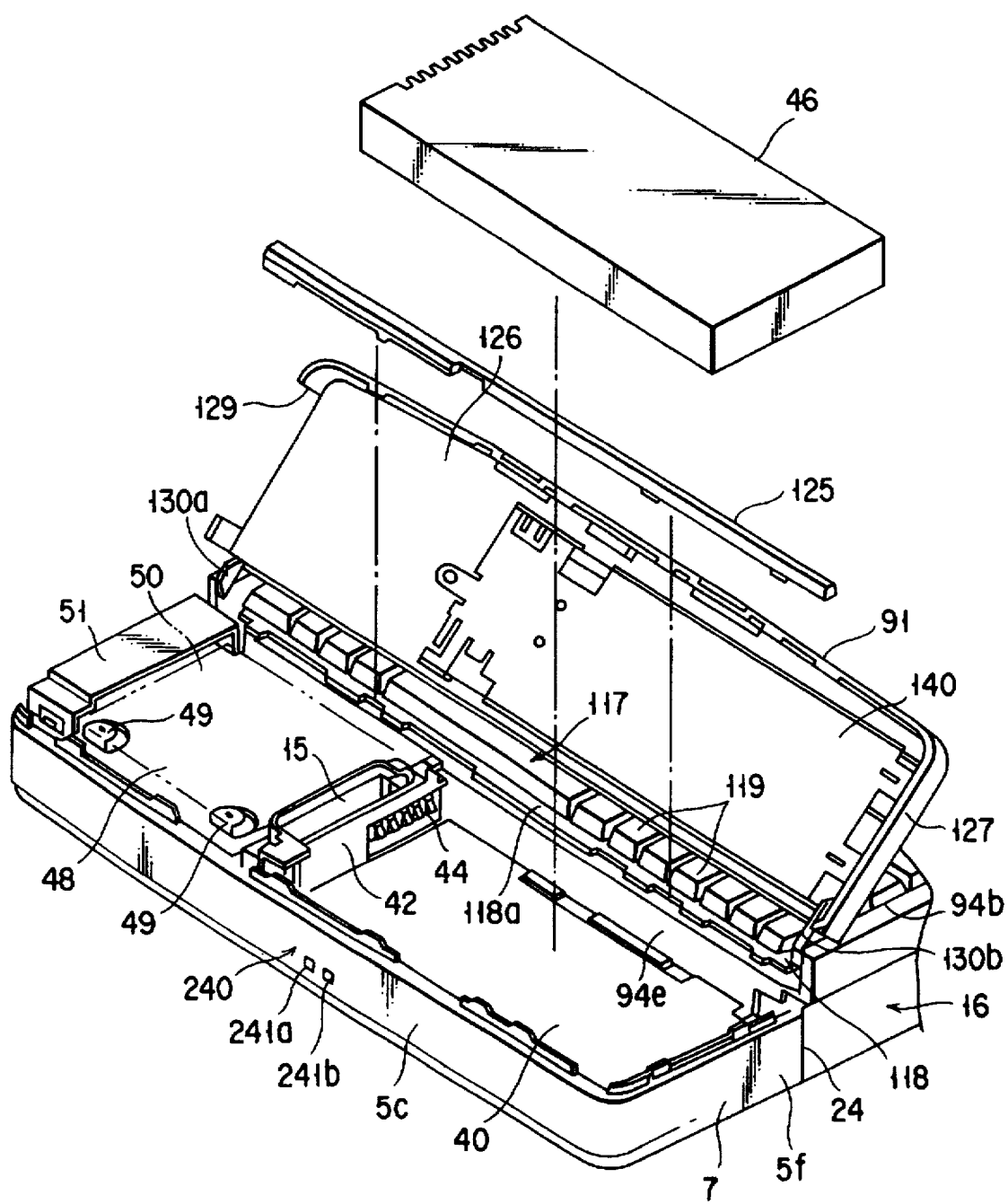
FIG. 3 is a perspective view of the front half of the main body of the first embodiment, showing the arm rest opened and the battery pack removed from the battery receptacle.

As shown in FIG. 3, a battery holder 42 and a battery connector 44 are provided between the HDD 15 and the battery receptacle 40. The battery holder 42 is made of synthetic resin. The battery connector 44 is mounted on the upper surface of the circuit board 10 and exposed to the battery receptacle 40.

The battery receptacle 40 contains a battery pack 46, which can be removed from the receptacle 40. The battery pack 46 is a power source for supplying electric power to the portable computer 1 when the computer 1 is used at places where no electric power is commercially available. While the battery pack 46 remains set in the battery receptacle 40, the battery pack 46 has its positive and negative terminals (not shown) connected to the battery connector 44. This is because the HDD 15 and the battery pack 46 are arranged side by side in the front half of the lower housing half 7.

As seen from FIG. 3, the upper surface of the HDD 15 is covered with a shield plate 48. The shield plate 48 is secured by screws to the bottom wall 5a of the lower housing half 7. It has seats 49 to which a sound board 50 is removably fastened by screws. The board 50 has a plurality of jacks (not shown). A terminal cover 51 is fixed to the left side of the lower housing half 7, protecting the jacks of the sound board 50. As seen from FIG. 4, the terminal cover 51 has a plurality of plug holes 53, into which the plugs of a headphone (not shown), or the like, may be inserted. The plug holes 53 opens at the left side of the housing 4.

The CD-ROM drive 16 may be replaced by a floppy disk drive (not shown). In this case, the sound board 50 is removed from the seats 49 since it is not necessary.

As shown in FIGS. 5 and 13, a first card receptacle 56 and a second card receptacle 57 are provided on the upper surface of the circuit board 10. The card receptacles 56 and 57 are designed to hold an extension card 58 each, such as a PCMCIA (Personal Computer Memory Card International Association) card or an interface card. Both receptacles 56 and 57 are located at the back of the HDD 15 and at the left of the CD-ROM drive 16. They are positioned, one above the other in the height direction of the lower housing half 7. To be more specific, the card receptacles 56 and 57 are arranged adjacent to the left-side wall 5e of the lower housing half 7. The left-side wall 5e has a card insertion part 59, through which extension cards 58 can be inserted into and pulled from the first card receptacle 56 and the second card receptacle 57, respectively.

Each of the card receptacles 56 and 57 has a card connector 60 and guide rails 61a and 61b. The extension card 58 can be connected to the card connector 60. The guide rails 61a and 61b are provided for guiding the card 58 to the card connector 60 from the card insertion part 59. The card receptacles 56 and 57 have an ejector 62 each. The ejector 62 has an operation lever 63 which is supported on the guide rails 61a and 61b. The lever 63 is exposed at the card insertion port 59.

Figure 12:
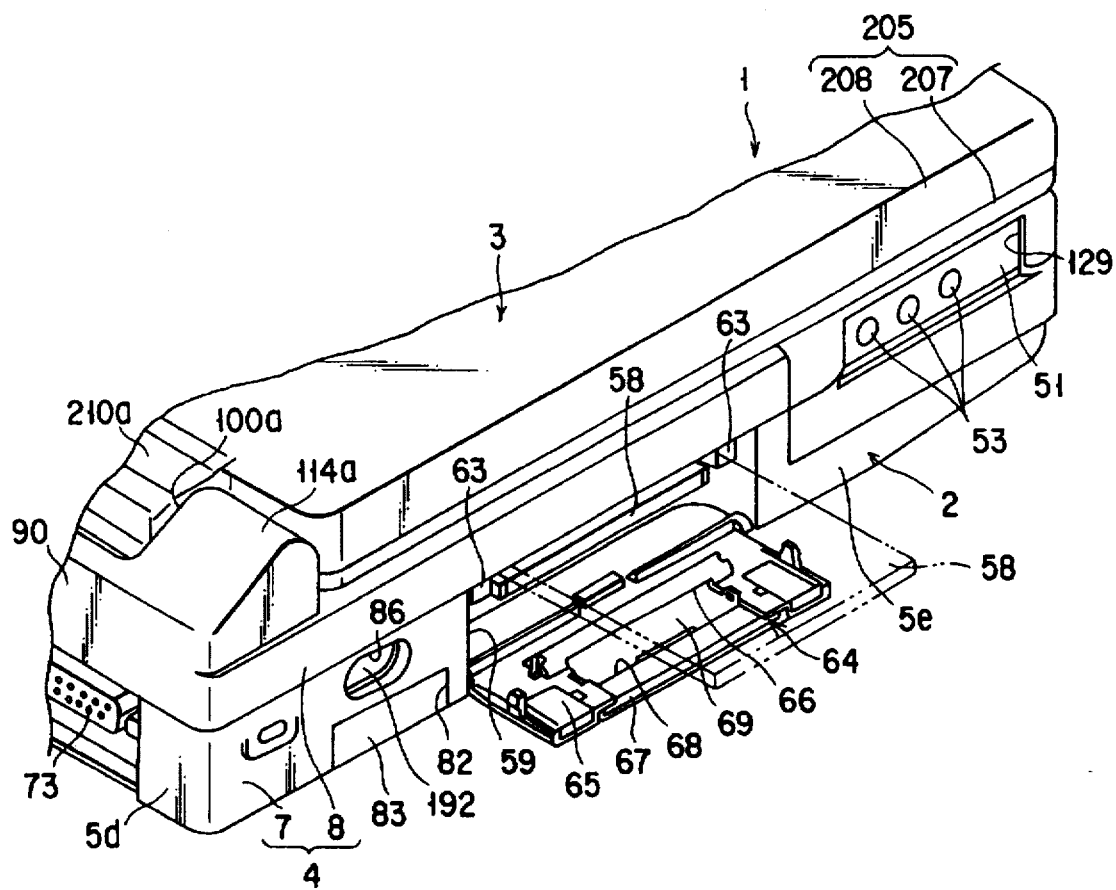
FIG. 12 is a perspective view of the left side section of the first embodiment, showing the card cover opened.

As seen from FIGS. 5 and 12, a card cover unit 64 is attached to the left side of the lower housing half 7. The card cover unit 64 has three covers 65, 67 and 69. The first cover 65 is rotatably connected to the left side of the lower housing half 7, to open and close the card insertion port 59. The first cover 65 has an opening part 66 which communicates with the first and second card receptacles 56 and 57, and the second cover 67 is rotatably connected to the first cover 65, to open and close the opening part 66. The second cover 67 has an opening part 68 which communicates with the second card receptacle 57, and the third cover 69 is rotatably connected to the second cover 67, to open and close the opening part 68. Thus, even while first card cover 65 is closing the card insertion port 59, the first card receptacle 56 can be exposed by rotating the second cover 67, opening the opening part 66, and the second card receptacle 57 can be exposed by rotating the third cover 69, opening the opening part 68. Since the card insertion port 59 opening to both card receptacles 56 and 57 remains closed by the first card cover 65, the opening to the card receptacles 56 and 57 is minimized. This prevents dust or the like from entering the first card receptacle 56 and the second card receptacle 57.

Figure 6:
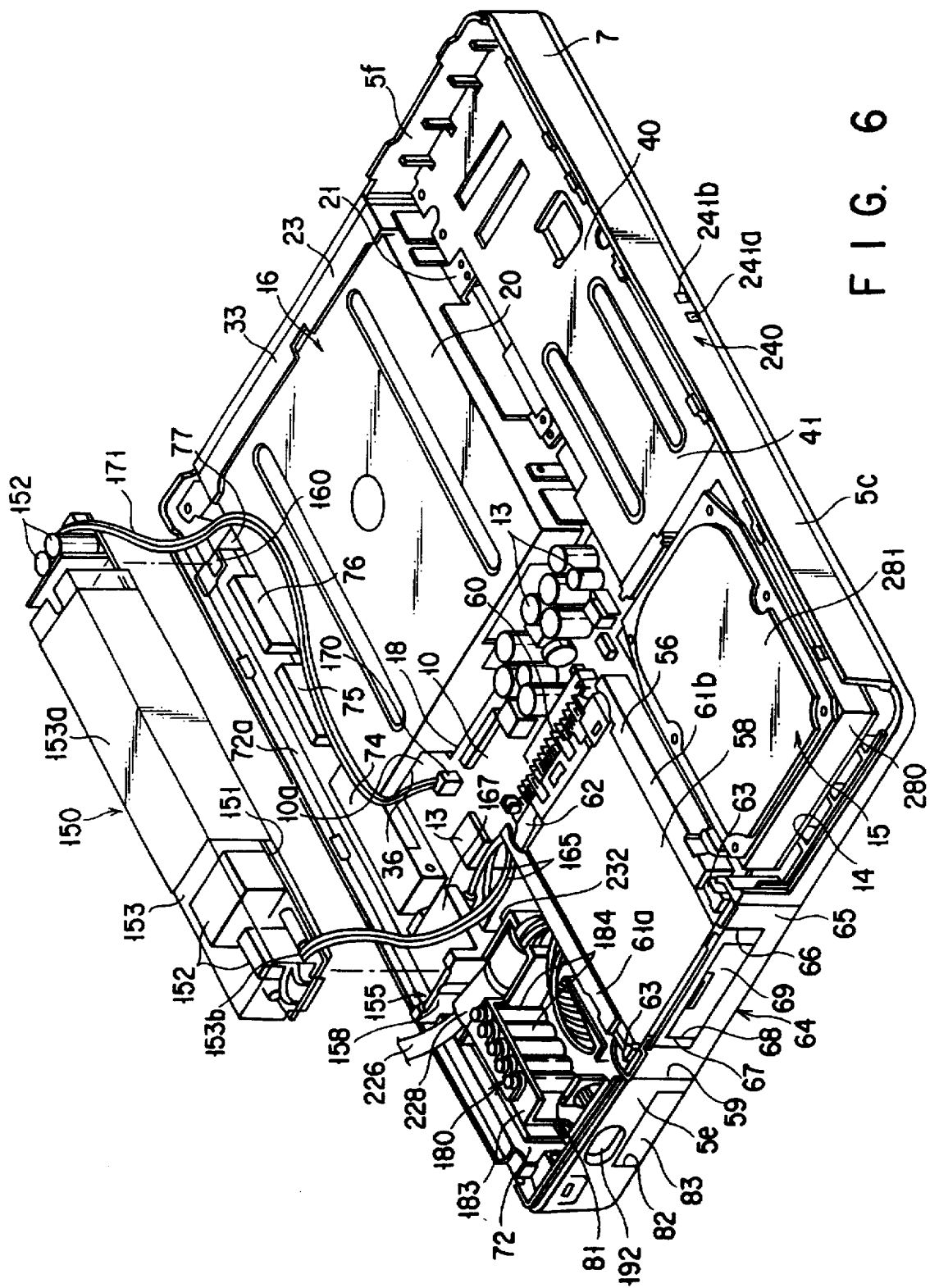
FIG. 6 is a perspective view of the lower housing half of the first embodiment, showing the AC power unit removed from the lower housing half.

As shown in FIGS. 6 and 9, the circuit board 10 has a connector support section 10a which extends along the back wall 5d of the lower housing half 7, or in the widthwise direction thereof. The connector support section 10a has a portion inserted in the recess 36 of the CD-ROM drive 16. The circuit components 13 are placed in the space 37 defined by the recess 36.

Figure 4:
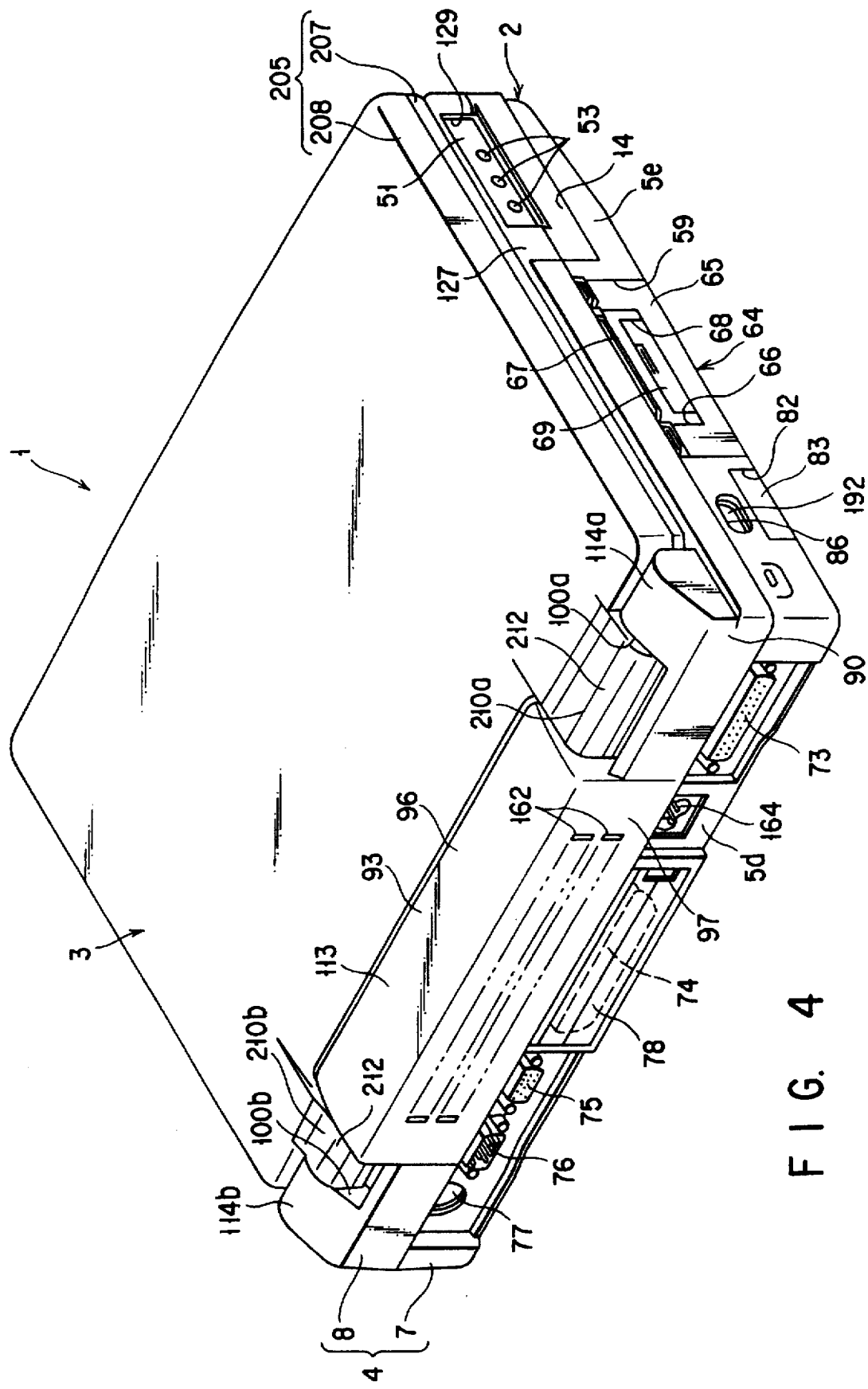
FIG. 4 is a perspective view of the first embodiment, showing the display unit set in the closed position.

Mounted on the connector support section 10a are: a first parallel port 73 (see FIGS. 4 and 13) for connecting a printer or an external floppy disk drive to the circuit board 10; an extension port 74 for connecting an external extension station to the board 10; a RGB connector 75 for connecting an external CRT display to the board 10; a connection port 76 for connecting a peripheral device (having a RS232C interface connector) to the circuit board 10; and a keyboard connector 77 for connecting an external keyboard or a mouse to the board 10. As shown in FIG. 4, the ports 73, 74 and 76 and the connectors 75 and 77 are juxtaposed in the widthwise direction of the lower housing half 7 and exposed at the back wall 5d of the lower housing half 7. A port cover 78 is rotatably coupled to the back wall 5d, to open and close the extension port 74.

As seen from FIGS. 6, 9 and 13, a connector panel 72 made of metal is attached to the rear edge of the connector support section 10a. The connector panel 72 supports the ports 73, 74 and 76 and the connectors 75 and 77. The connector panel 72 is as long as the connector support section 10a is broad and upwards at the back of the connector support section 10a. The connector panel 72 has a first flange 72a at the upper edge and a second flange 72b at the lower edge. The first flange 72a is laid on the upper edge of the back wall 5d of the lower housing half 7, and the second flange 72b on the bottom wall 5a of the lower housing half 7.

Figure 14:
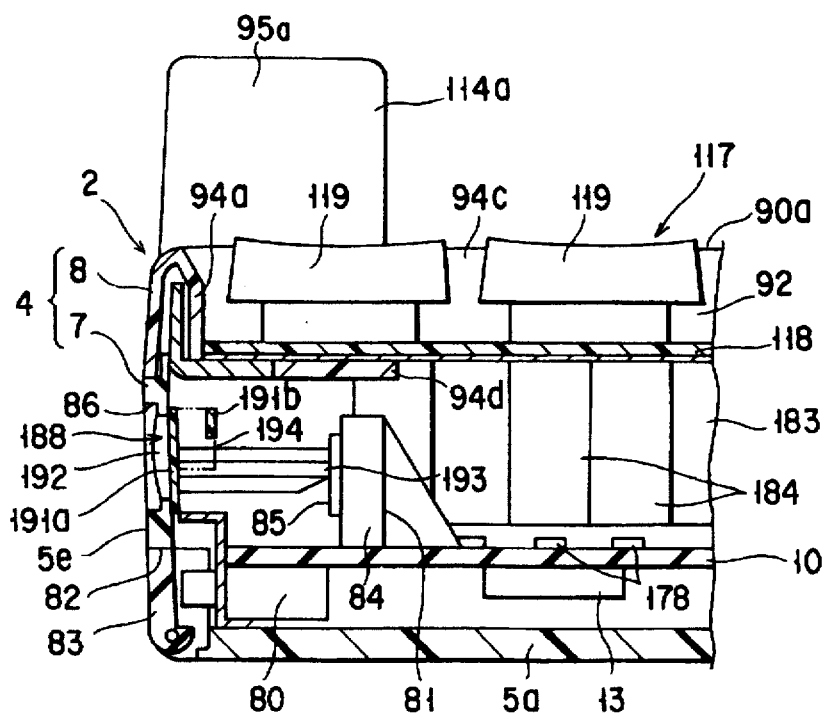
FIG. 14 is a sectional view of a part of the first embodiment, depicting the positional relationship between the power switch and the second parallel port.

As illustrated in FIG. 14, a second parallel port 80 and a power switch 81 are mounted on the rear-end portion of the circuit board 10. The second parallel port 80 is provided to connect an external floppy disk drive to the circuit board 10. The port 80 is placed on the lower surface of the circuit board 10 and near the left edge of the circuit board 10. It opposes the left-side wall 5e of the lower housing half 7. The wall 5e has an opening 82 which exposes the second parallel port 80. A side cover 83 is rotatably coupled to the left-side wall 5e, to open and close the opening 82.

The power switch 81 is mounted on the upper surface of the circuit board 10. The power switch 81 comprises a switch body 84 and a push-type armature 85. The switch body 84 holds the armature 85. The switch 81 has leads (not shown) which pierce the circuit board 10. The leads are soldered at the lower surface of the circuit board 10, whereby the power switch 81 is secured to the circuit board 10. As shown in FIG. 14, the switch 81 is arranged on the upper surface of the board 10, spaced apart from the second parallel port 80, and located at the left thereof. The armature 85 opposes the left-side wall 5e of the lower housing half 7. The wall 5e has an opening 86 which exposes the armature 85. The opening 86 is located right above the opening 82 made in the left-side wall 5e of the lower housing half 7.

Referring back to FIG. 1, the upper housing half 8 comprises a housing body 90 and an arm rest 91. The arm rest 91 is connected to the front edge of the housing body 90. The housing body 90 has an upper surface 90a which faces the bottom wall 5a of the lower housing half 7. A keyboard receptacle 92 is provided in the upper surface 90a of the housing body 90, and a projection 93 is provided on the upper surface 90a of the body 90. As can be seen from FIGS. 13 and 14, the keyboard receptacle 92 is a recess which is defined by a pair of side walls 94a and 94b, a back wall 94c and a bottom wall 94d. The bottom wall 94d is contiguous to the walls 94a to 94c. The keyboard receptacle 92 is almost as large as the housing body 90. The bottom wall 94d is located above the CD-ROM drive 16 and both card receptacles 56 and 57. As shown in FIG. 3, a partition 94e extends downwards from the front edge of the bottom wall 94d. The partition 94e is fastened at its lower end portion by screws to the bosses 11 of the lower housing half 7. The partition 94e serves as the back wall of the battery receptacle 40. In other words, it separates the battery receptacle 40 from the interior of the lower housing half 7.

Figure 15:
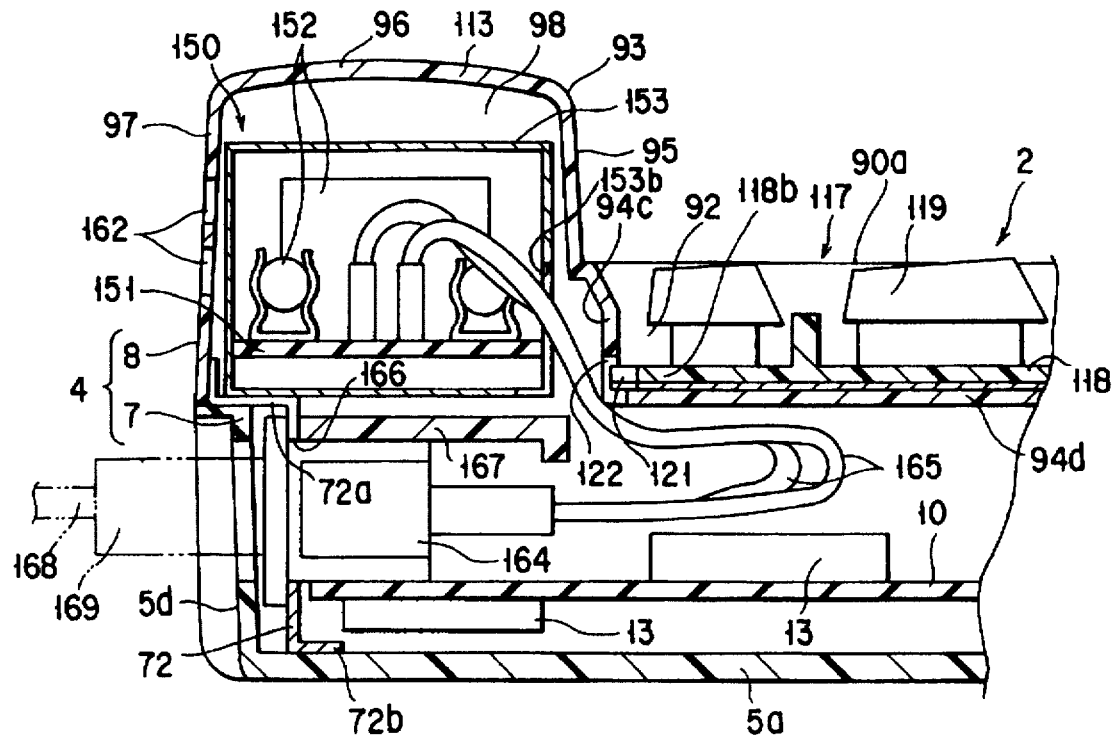
FIG. 15 is a sectional view of a part of the first embodiment, showing the AC power unit placed in the receptacle provided in the housing.

As shown in FIGS. 13 and 15, the projection 93 is provided at the rear of the keyboard receptacle 92. The projection 93 protrudes upwards from the upper surface 90a of the housing body 90 and extends in the widthwise direction of the housing body 90. It is as long as the housing body 90 is broad. As seen from FIG. 15, the projection 93 comprises a front wall 95, a top wall 96, and a back wall 97. The front wall 95 extends upward from the upper surface 90a of the housing body 90. The top wall 96 extends backwards from the upper edge of the front wall 95. The back wall 97 extends downwards from the rear edge of the top wall 96. The walls 95, 97 and 97 define a receptacle 98, which opens at the bottom, communicating with the interior of the housing 4. The back wall 97 is flush with the back wall 5d of the lower housing half 7.

As illustrated in FIG. 1, the projection 93 has a pair of display-supporting U-notch 100a and 100b. The U-notches 100a and 100b are spaced apart in the widthwise direction of the housing 4. They are identical in structure. Only the left U-notch 100a will, therefore, be described.

Figure 16:
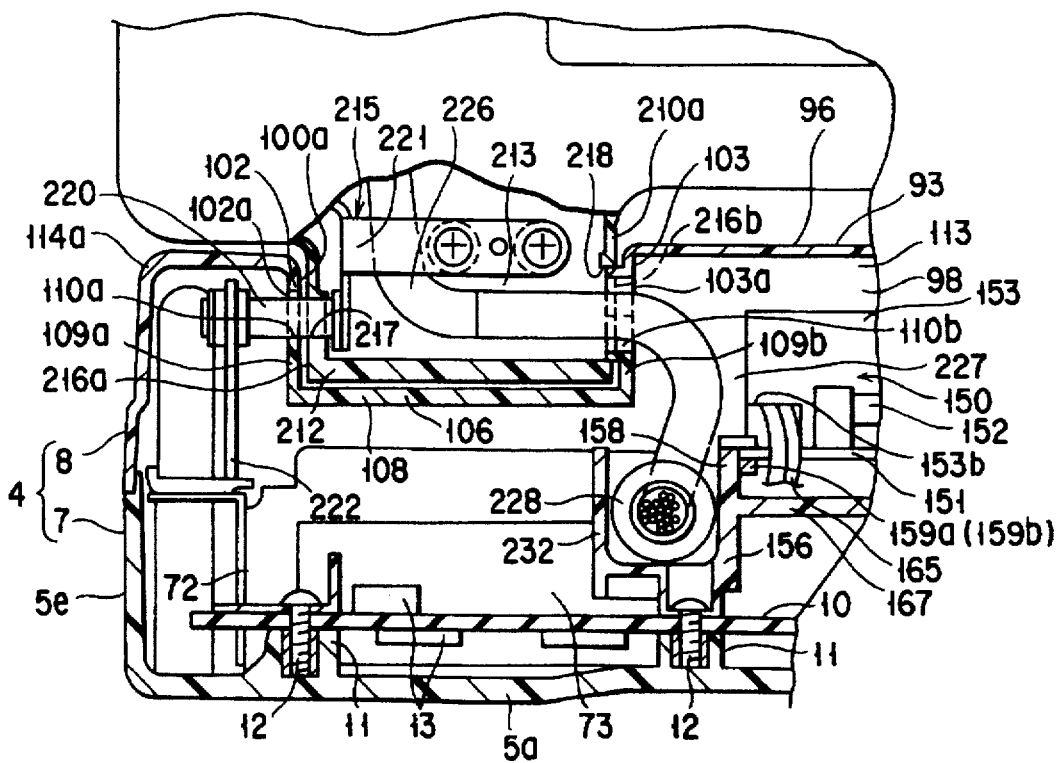
FIG. 16 is a sectional view of a part of the first embodiment, illustrating how the display unit is coupled to the housing.
Figure 20:
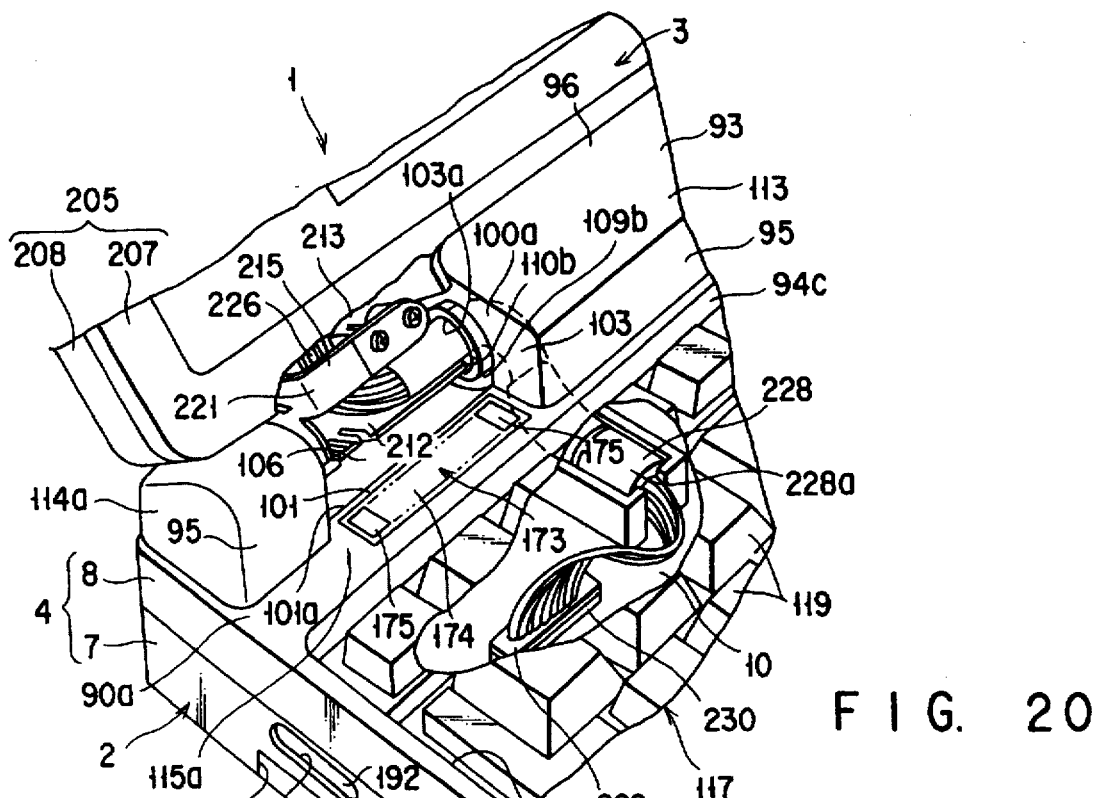
FIG. 20 is a perspective view of a part of the first embodiment, showing how the display unit is coupled to the housing.

As shown in FIGS. 16 and 20, the U-notch 100a is defined by a bottom wall 101 and two side walls 102 and 103. The bottom wall 101 is a part the housing body 90 of the upper housing half 8. The side walls 102 and 103 extend upwards from the bottom wall 101 and parallel to each other. The bottom wall 101 has an opening 101a, which communicates with the interior of the housing 4. The side walls 102 and 103 have side openings 102a and 103a, respectively. The side openings 102a and 103a are continuous to the opening 101a and the receptacle 98.

A cover 106 is fastened by screws to the bottom wall 101. As seen from FIGS. 13 and 16, the cover 106 comprises a bottom wall 108 and a pair of side walls 109a and 109b. The bottom wall 108 covers the opening 101a, and the side walls 109a and 109b are fitted in the side openings 102a and 103a, respectively. The side wall 109a and the side opening 102a define an opening 110a. Similarly, the side wall 109b and the side opening 102b define an opening 110b.

The projection 93 consists of a unit receptacle 113 and two hinge receptacles 114a and 114b. The unit receptacle 113 is located between the U-notches 100a and 100b. The first hinge receptacle 114a is located at the left of the U-notch 100a, and the second hinge receptacle 114b at the right of the U-notch 100b. As shown in FIG. 16, the unit receptacle 113 and the hinge receptacles 114a and 114b are located above the rear end of the circuit board 10 and communicate with the interior of the housing 4.

As shown in FIGS. 1 and 20, the front wall 95a of the hinge receptacle 114a and the front wall 95b of the hinge receptacle 114b are located at the back of the front wall 95c of the unit receptacle 113. Therefore, the upper surface 90a of the housing body 90 has flat portions 115a and 115b which are located respectively between the front wall 95a and the front wall 95c and between the front wall 95b and the front wall 95c.

As shown in FIGS. 1, 13 and 14, a keyboard 117 is held in the keyboard receptacle 92 made in the housing body 90. The keyboard 117, used as means for inputting data, has a keyboard panel 118. The panel 118 is a rectangular plate fitted in the keyboard receptacle 92, contacting the bottom wall 94d thereof. A number of keys 119 and a joy-stick 120 (a pointing device) are arranged on the keyboard panel 118.

The keyboard panel 118 has a front edge 118a and a rear edge 118b. The front edge 118a extends along on the front edge of the keyboard receptacle 92. The rear edge 118b extends along the back wall 94c of the keyboard receptacle 92. Formed integral with the rear edge 118b are a plurality of engagement projections 121 (only one shown in FIG. 15). The engagement projections 121 are inserted into engagement holes 122 which are made in the back wall 94c of the keyboard receptacle 92. Thus, the keyboard panel 118 is fastened at its rear edge 118b to the back wall 94c of the keyboard receptacle 92.

As illustrated in FIGS. 2 and 3, a keyboard holder 125 is attached to the front edge of the keyboard receptacle 92. The keyboard holder 125 is shaped like a rod, is as long as the keyboard panel 118 is broad, and extends in the widthwise direction thereof. The keyboard holder 125 is removably connected to the front edge of the bottom wall 94d of the keyboard receptacle 92. The front edge 118a of the keyboard panel 118 is clamped between the bottom wall 94d and the keyboard holder 125.

Since the keyboard panel 118 is fastened at its rear edge 118b to the back wall 94c of the keyboard receptacle 92 and at its front edge 118a to the bottom wall 94d, the keyboard panel 117 is held steadfastly in the keyboard receptacle 92. The front edge 118a of the keyboard panel 118 is covered and concealed by the keyboard holder 125.

Referring back to FIG. 1, the arm rest 91 of the upper housing half 8 is located more proximal to the user than the keyboard 117. The arm rest 91 is continuous to the front edge of the keyboard receptacle 92. It is positioned above the HDD 15 and the battery receptacle 40 and, hence, covering them. The arm rest 91 consists of a hand rest 126 and a wall 127 which are formed integral with each other. The hand rest 126 is a flat plate. The wall 127 extends downwards from the front, left and right edges of the hand rest 126. A pair of click-switch buttons 128a and 128b are arranged in the central part of the hand rest 126. The button 128a is pushed to execute a command. The button 128b is pushed to cancel a command. The lower edge of the wall 127 has an elongated U-notch 129, through which the terminal cover 51 is exposed.

As FIG. 2 shows, the arm rest 91 is coupled to the keyboard receptacle 92. More precisely, the arm rest 91 has two arms 130a and 130b which project from the front-left and front-right edges and which are clamped between the keyboard 117, on the one hand, and the side walls 94a and 94b of the receptacle 92, on the other hand. The side walls 94a and 94b have an arm-holding portion 131 each, as is seen from FIGS. 17, 18A and 18B which show only the right side wall 94b. The arm-holding portion 131 has a recess 132 which opposes the arm 130b (130a). As shown in FIGS. 19A, 19B and 19C, the recess 132 is defined by a top wall 132a and a front wall 132b. The top wall 132a extends in the depthwise direction of the upper housing half 8. The front wall 132b extends downwards from the front edge of the top wall 132a. The lower edge of the front wall 132b is connected to the bottom wall 94d of the keyboard receptacle 92. Vertical posts 133 are provided in the recess 132, each extending upwards from the bottom wall 94d and reaching the top wall 132a.

The arm 130b has a rod-shaped portion 135 which is fitted in the recess 132. The rod-shaped portion 135 is in sliding contact with the top wall 132a. Hence, the rod-shaped portion 135 is moved to the corner defined by the top wall 132a and the front wall 132b when the arm rest 91 is pulled forward from the housing 4 as is illustrated in FIG. 19B. As the arm rest 91 is pulled upwards in this condition, it is rotated around the rod-shaped portion 135. As a result, the front half of the housing 4 is opened, exposing the sound board 50 and the battery receptacle 40. The arm rest 91 is rotated until the rear edge of the wall 127 abuts on the upper edges of the wide walls 94a and 94b of the keyboard receptacle 92. Namely, the arm rest 91 coupled to the keyboard receptacle 92 can be rotated between a closed position where it covers the battery receptacle 40 and the sound board 50 and an opened position where it exposes the receptacle 40 and the board 50. While the arm rest 91 remains in the opened position, the battery pack 46 can be pulled out, and inserted into, the battery receptacle 40.

To rotate the arm rest 91 from the opened position to the closed position, the user needs first to rotate the arm rest 91 downwards until the wall 127 abuts on the upper edge of the lower housing half 7 and then to slide the arm rest 91 toward the keyboard receptacle 92. The arms 130a and 130b are thereby fitted into the arm-holding portions 131a and 131b. At this time, the rod-shaped portions 135 of the arms 130a and 130b move beyond the vertical posts 133, sliding on the upper edges of the top wall 132a. As the arms 130a and 130b fit into the arm-holding portion 131, they vibrate to make the user feel that the arm rest 91 has just reached the closed position and has just covered the battery receptacle 40 and the sound board 50.

The arm rest 91 is as long as the housing 4 is broad. Therefore, it may be inclined as it is slid backward. Even if it is inclined and slid in the inclined position, the arm 130a or the arm 130b, or both, move beyond the vertical posts 133. At least one arm fits into the arm-holding portion 131 without fail. Suppose only the arm 130a moves beyond the vertical posts 133. In this case, the user only pushes the arm 130b, whereby the arm 130b or the rod-shaped portion 135 of the arm 130b moves beyond the vertical posts 133. The arm 130b therefore fits into the arm-holding portion 131. As a result, both arms 130a and 130b fit into the arm-holding portion 131, respectively. Thus, the arm rest 91 can be easily slid to the closed position to cover the battery receptacle 40 and the sound board 50.

As shown in FIG. 1, a pair of latches 138a and 138b are secured to the front edge of the arm rest 91. They can catch the upper-front edge of the lower housing half 7, holding the arm rest 91 in the closed position so that the arm rest 91 covers the battery receptacle 40 and the sound board 50.

As seen from FIG. 2, the back of the hand rest 126 is covered with an inner panel 140 made of metal. The inner panel 140 faces the battery receptacle 40. Two click switches 141a and 141b and a disc-shaped speaker 142 are interposed between the hand rest 126 and the inner panel 140. The click switches 141a and 141b contact the click-switch buttons 128a and 128b, respectively, when the user pushes the buttons 128a and 128b. The click switches 141a and 141b are electrically connected to the circuit board 10 by a wiring board (not shown). The speaker 142 is located at the right end of the hand rest 126 and faces the through holes 143 which are made in the right end of the hand rest 126.

As illustrated in FIG. 1, the housing 4 contains an AC power unit 150. More precisely, the AC power unit 150 is provided in the unit receptacle 113 of the housing body 90. The unit 150 is a module which is designed to convert commercially available AC power to DC power. It is shaped like a rectangular prism and extends in the widthwise direction of the housing 4. As shown in FIG. 15, the AC power unit 150 comprises a wiring board 151, various circuit components 152, and a casing 153. The wiring board 151 is a rectangular plate positioned in a horizontal plane. The circuit components 152 are mounted on the wiring board 151. The case 153 is a hollow prism and contains the wiring board 151 and the circuit components 152. Some of the circuit components 152 generate heat while operating. As shown in FIG. 5, the case 153 has a shield plate 153a made of metal. The shield plate 153a surrounds the circuit components 152, preventing high-frequency noise from leaking from the components 152.

Figure 26:
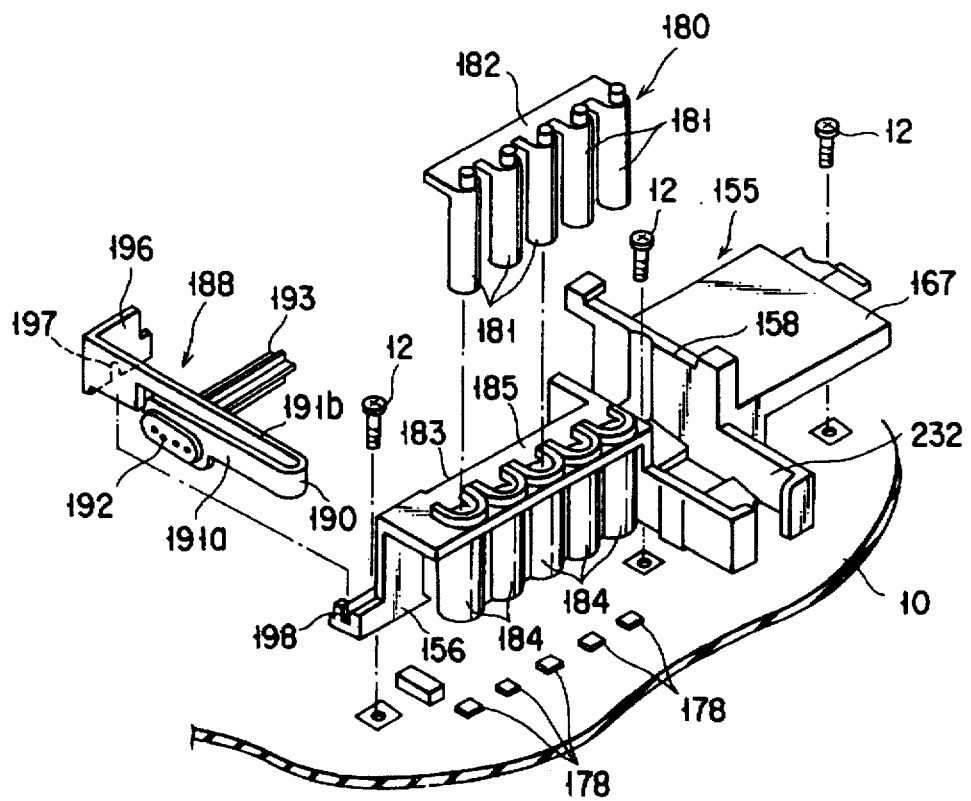
FIG. 26 is an exploded perspective view showing the holder, the lens assembly and the switch actuator.

As FIGS. 5 and 6 show, the AC power unit 150 extends along the first flange 72a of the connector panel 72 and is located above the connector support section 10a of the circuit board 10. The unit 150 is held at its one longer side by a holder 155 and at the opposite longer side by the connector panel 72. The holder 155 is made of synthetic resin and secured to the circuit board 10. As shown in FIG. 24, one end portion of the wiring board 151 of the unit 150 extends outwards through a notch 153b made in the case 153, and the one end portion of the wiring board 151 is held by the holder 155. The holder 155 has a seat 156 mounted on the upper surface of the circuit board 10 as is illustrated in FIGS. 16 and 26. The seat 156 is fastened by screws 12 to the bosses 11 of the lower housing half 7, together with the circuit board 10.

As seen from FIG. 24, the holder 155 has a support wall 158 which opposes one end portion of the circuit board 10. The support wall 158 stands upright in front of the connector panel 72. The lower end of the support wall 158 is connected to the seat 156 of the holder 155. The wall 158 has a pair of engagement projections 159a and 159b at its upper edge. One end portion of the wiring board 151 rest upon these engagement projections 195a and 159b.

As shown FIG. 25, the other end portion of the wiring board 151 extends outward, passing through the case 153, and is laid upon the first flange 72a of the connector panel 72. The first flange 72a has a support member 160 supporting the wiring board 151. The other end portion of the wiring board 151 is fastened by a screw 161 to the support member 160. The AC power unit 150 is, therefore, provided at the upper end of the connector panel 72. A greater part of the unit 150 protrudes upward from the top of the lower housing half 7. The AC unit 150 is set within the unit receptacle 113 of the projection 93 once the upper housing half 8 is mounted on and fastened to the lower housing half 7. The unit 150 occupies a greater part of the space in the unit receptacle 113.

A number of vent holes 162 are made in the back wall 97 of the projection 93. The vent holes 162 communicate with the unit receptacle 113 and oppose the AC unit 150.

Figure 22:
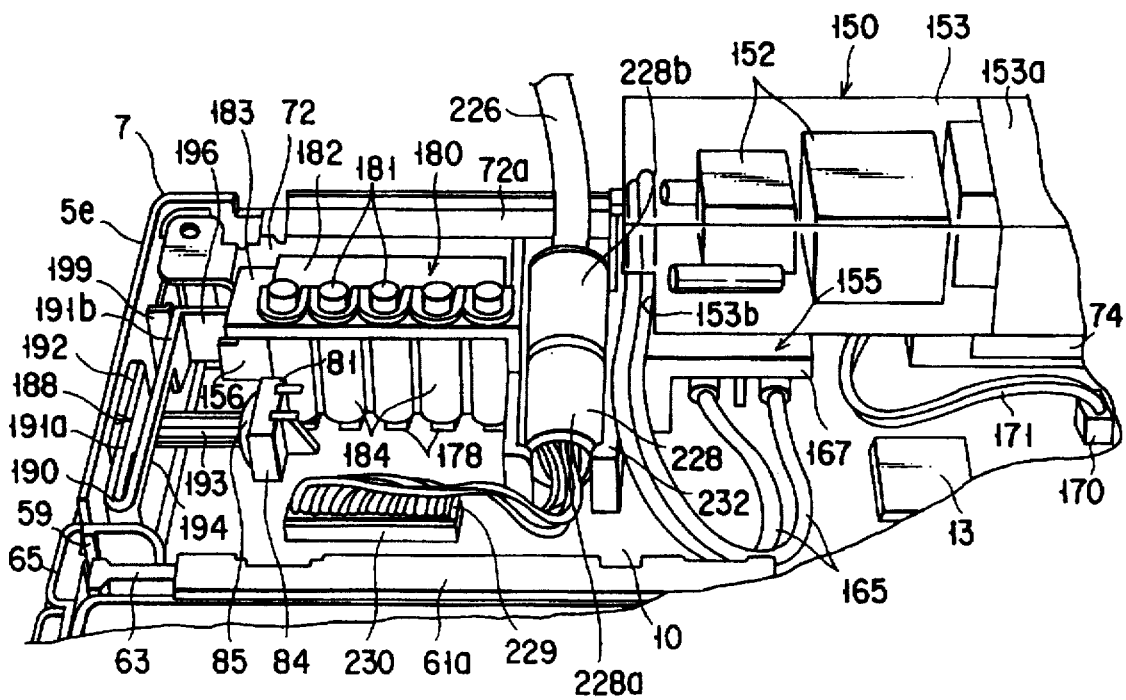
FIG. 22 is another perspective view of a part of the lower housing half, illustrating the AC power unit, the holder and some other components.

As shown in FIGS. 15 and 22, the AC power unit 150 has two input cables 165. The input cables 165 are connected at one end to one end portion of the wiring board 151. The cables 165 have a connector 164 each, at the other end. The connectors 164 are located below the AC power unit 150 and in a hole 166 made in the connector panel 72. Both connectors 164 are exposed through the opening made in the back wall 5d of the lower housing half 7. The connectors 164 are mounted on the upper surface of the circuit board 10 and located near the support wall 158 of the holder 155. Secured to the vertical edge of the support wall 158 and formed integral with the wall 158 is a connector holder 167 which extends parallel to the circuit board 10. The connector holder 167 and the circuit board 10 cooperate, clamping the connectors 164. The connectors 164 are thereby secured to the lower housing half 7. It is into these connectors 164 that the plug 169 connected to a power cord 168 which is connected to a commercially available power supply.

As illustrated in FIG. 6, two output cables 171 are connected, at one end, to the other end portion of the wiring board 151. As seen from FIG. 23, the output cables 171 extend to the holder 155, passing through a passage located below the wiring board 151 and through the gap between the protruding portion 34 of the CD-ROM drive 16 and the connector panel 72. The cables 171 are connected to the upper surface of the circuit board 10 by a connector 170.

As shown in FIGS. 13 and 20, an icon 173 is arranged on the left flat portion 115a of the housing body 90 and located in front of the left U-notch 100a. The icon 173 has an icon substrate 174 made of synthetic resin transparent to light. The icon substrate 174 is rectangular, extending in the widthwise direction of the housing body 90 and being flush with the left flat portion 115a. The icon substrate 174 has a plurality of marks which are to be displayed in order to indicate which function or operation the portable computer 1 is performing. The marks 175 are spaced apart in the widthwise direction of the housing body 90. As seen from FIG. 13, the flat portion 115a of the housing body 90 has an opening 176, which exposes the interior of the housing 4. The opening 176 is located above the circuit board 10 and faces the marks 175.

Referring to FIGS. 13, 22 and 26, a plurality of light-emitting diodes 178 are juxtaposed in a row on the upper surface of the circuit board 10. The light-emitting diodes 178 oppose the marks 175 of the icon 173, and serve as light sources for illuminating the marks 175, respectively. A lens assembly 180 is provided between the array of marks 175 and the array of diodes 178, for guiding light beams from the diodes 178 to the marks 175. The lens assembly 180 has columnar lenses 181 which extend vertically. The lenses 181 are connected at their upper end to a connecting wall 182.

The lens assembly 180 is positioned near the support wall 158 of the holder 155. The wall 158 has a lens support 183 which supports the lens assembly 180. The lens support 183 comprises a plurality of guides 184 and a flat wall 185. The guides 184 are hollow cylinders. The flat wall 185 is connected to the upper ends of the guides 184. The guides 184 extend vertically and are arranged side by side. The lower open end of each guide 184 faces one light-emitting diode 178. On the other hand, the upper open end of each guide 184 faces the opening 176 made in the flat portion 115a of the housing body 90. The lenses 181 are inserted, from above, into the guides 184, and the wall 182 connecting the lens 181 is laid on the flat wall 185 of the lens support 183. The lower and upper ends of each lens 181 therefore face the light-emitting diode 178 and the mark 175, respectively. The light beam emitted by any light-emitting diode 178 passes through the lens 181 along the axis thereof, reaching the mark 175. The mark 175 is illuminated and displayed.

As shown in FIGS. 14 and 22, a switch actuator 188 made of synthetic resin is arranged on the upper surface of the circuit board 10 and between the left-side wall 5e of the lower housing half 7 and the power switch 81. When operated by the user, the switch actuator 188 turns on or off the power switch 81. The switch actuator 188 comprises a bent portion 190 and two lever portions 191a and 191b. The bent portion 190 has a U-shaped cross section. The lever portions 191a and 191b are connected to ends of the bent portion 190 and extend parallel to each other and substantially parallel to the left-side wall 5e of the lower housing half 7.

The first lever portion 191a is located closer to the left-side wall 5e than the second lever portion 191b. A push button 192 is mounted on the free end of the first lever portion 191a. The push button 192 is exposed through the opening 86 of the left-side wall 5e. A rod-shaped projection 193 protrudes from the push button 192 toward the power switch 81, passing through a notch 194 made in the second lever portion 191b. The distal end of the projection 193 contacts the push-type armature 85 of the power switch 81.

The second lever portion 191b has an engagement member 196 at its free end. The engagement member 196 extends toward the seat 156 of the holder 155. As is shown in FIG. 26, a first notch 197 is made in the lower edge of the engagement member 196, and a second notch 198 is made in that edge of the seat 156 which opposes the engagement member 196. The engagement member 196 is fitted in part in the second notch 198, while said edge of the seat 156 is fitted in part in the first notch 197. The switch actuator 188 is thereby connected to the holder 155.

As seen from FIG. 22, the corner defined by the second lever portion 191b and engagement member 196 of the switch actuator 188 abuts on a rib-shaped wall 199 which extends inwardly from the left-side wall 5e of the lower housing half 7. The engagement member 196 integral with the second lever portion 191b is held by the left-side wall 5e and the holder 155. The member 196 function as a fulcrum for the second lever portion 191b. Hence, when the user pushes the push button 192 with a finger, the first lever portion 191a is bent around the bent portion 190, whereas the second lever portion 191b is bent around the engagement member 196. The rod-shaped projection 193 is thereby pushed onto the armature 85 of the power switch 81. As a result of this, the power switch 81 is turned on or off.

As shown in FIGS. 1, 2 and 3, the display unit 3 comprises a housing 205 and a color liquid crystal display 206. The housing 205 is shaped like a flat box and has a front panel 207 and a rear panel 208. The front panel 207 has a rectangular opening 209. The liquid crystal display 206 is set in the housing 205 and exposed through the opening 209 made in the front panel 207.

The housing 205 further has two legs 210a and 210b. Either leg is a hollow member and comprised of a front section 211 and a rear section 212 which are formed integral with the front panel 207 and the rear panel 208, respectively, and which are connected together. The first leg 210a define a cable passage 213 which communicates with the interior of the housing 203 as illustrated in FIG. 20. The first leg 210a and the second leg 210b are fitted in the left U-notch 100a and right U-notch 100b of the housing 4 and coupled to the housing 4 by means of two hinge devices 215, respectively. The first leg 210a and the second leg 210b are coupled to the housing 4 in the same manner. This, it will be explained how the first leg 210a is coupled to the housing 4, with reference to FIG. 16.

As shown in FIG. 16, the first leg 210a has a pair of side walls 216a and 216b. The side walls 216a and 216b oppose the side walls 102 and 103 of the left U-notch 100a, respectively. The left side wall 216a has a through hole 217, which communicates with the opening 110a made in the side wall 102. The right side wall 216b has a through hole 218, which communicates with the opening 110b made in the side wall 103.

Each of the hinge devices 215 comprises a shaft 220, a first bracket 221, and a second bracket 222. The first bracket 221 is fixed to one end of the shaft 220. The second bracket 222 is rotatably mounted on the other end of the shaft 220. The shaft 220 extends through the opening 110a of the side wall 102 and the through hole 217 of the left side wall 216a. One end portion of the shaft 220 is inserted in the first leg 210a, and the first bracket 221 is fastened by screws to the rear section 212 of the first leg 210a. The other end portion of the shaft 220 is inserted in the hinge receptacle 114a of the projection 93, and the second bracket 222 is fastened by screws to the lower housing half 7. Thus, the display unit 3 is coupled to the housing 4 and can be rotated around the shaft 220 to move between a closed position where it covers the arm rest 91 and the keyboard 117 and an opened position where it exposes the arm rest 91 and the keyboard 117.

As illustrated in FIG. 1, the legs 210a and 210b have a front surface 224. The front surface 224 of either leg becomes substantially flush with the outer surfaces of the front walls 95 of the hinge receptacles 114a and 114b when the display unit 3 is rotated to the opened position to expose the arm rest 91 and the keyboard 117. To state more precisely, the front surface 224 is located behind the front wall 95 of the unit receptacle 113, by a distance equal to the width of the flat portion 115a of the housing body 90. In front of the front surface 224 of the first leg 210a, the icon 173 is provided.

As shown in FIGS. 16 and 20, A cable 226 connected at one end to the color liquid crystal display 206 extends through the cable passage 213 provided in the first leg 210a. The cable 226, is a flexible bundle of leads. Interposed between the first bracket 221 and the rear section 212, the cable 226 takes a predetermined position in the cable passage 213. The other end portion of the cable 226 is led into the unit receptacle 113 through the opening 110b made in the side wall 103 and the through hole 218 of the right side wall 216b.

As is seen from FIG. 16, a cable passage 227 is provided between the right side wall 103 of the left U-notch 100a and one end of the AC power unit 150. The cable passage 227 opens to the interior of the lower housing half 7 at one end of the unit receptacle 113. The cable passage 227 is located right above the holder 155. The cable 226 is led into this cable passage 227.

Figure 21:
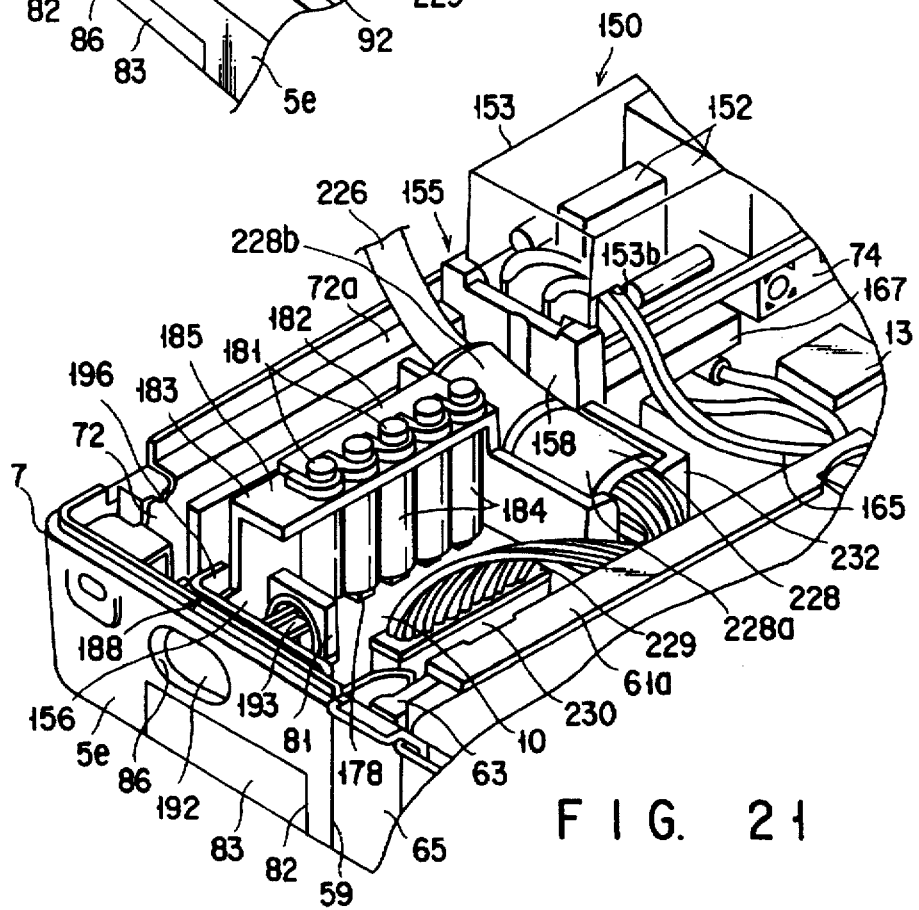
FIG. 21 is a perspective view of a part of the lower housing half, illustrating the AC power unit, the holder and some other components—all arranged in the lower housing half.

In the cable passage 227 the cable 226 is bent downwards. The cable 226 extends from the unit receptacle 113 into the lower housing half 7. The distal end portion of the cable 226 is bent along the upper surface of the circuit board 10 and extends toward the front of the lower housing half 7. As FIGS. 21 and 22 show, a hollow cylindrical core 228 made of hard material is mounted on the bent portion of the cable 226. The core 228 is comprised of two hollow cylinders 228a and 228b separated from each other. The cable 226 can therefore be bent more easily than otherwise.

As seen from FIG. 20, a first stacking connector 229 is attached to the distal end of the cable 226. The first stacking connector 229 is connected to a second stacking connector 230 which is provided on the upper surface of the circuit board 10. The display unit 3 is thereby electrically connected to the main body 2 of the personal computer 1.

As shown in FIGS. 21 and 22, the core 228 protecting the cable 226 is located between the support wall 158 of the holder 155 and the lens support 183. The holder 155 has a core support 232 which is provided on the upper surface of the circuit board 10 and between the support wall 158 and the lens support 183 and which extends in the depthwise direction of the lower housing half 7. The core support 232 has a recess facing upwards, in which the core 228 is fitted as illustrated in FIG. 21. The core 228 is thereby secured to the circuit board 10 by the holder 155, near the node of the circuit board 10 and the cable 226. This means that the holder 155 holds not only the AC power unit 150, but also the connectors 164, the lens assembly 180, the switch actuator 188 and the cable 226.

As described above, the icon 173 is arranged on the upper surface 90a of the housing body 90. Due to this, the display unit 3 conceals the icon 173 when it is rotated to the closed position to cover the arm rest 91 and the keyboard 117. If the icon 173 displays the condition of the power supply, the user cannot see the icon 173, failing to know the condition of the power supply. To enable the user to know the condition of the power supply, an indicator 240 is provided, as shown in FIG. 1, on the central part of the front wall 5c of the lower housing half 7. The indicator 240 has two light-emitting sections 241a and 241b which are juxtapose in the widthwise direction of the lower housing half 7. The first light-emitting unit 241a is provided to indicate whether or not the computer 1 is connected a commercially available AC power supply. The section 241a emits light when the computer 1 is connected to a commercially available AC power supply while the power switch 81 remains off. The second light-emitting section 241b is provided to indicate whether or not the battery pack 46 has been fully charged. The section 241b emits an amber light beam when the computer 1 is connected to a commercially available AC power supply while the power switch 81 remains off. The section 241b starts emitting a green light beam the moment the battery pack 46 is fully charged. The battery pack 46 is charged while the power switch 81 remains off, as long as the portable computer 1 is connected to a commercially available AC power supply. When the power switch 81 is turned on, the charging of the battery pack 46 is terminated, and the second light-emitting section 241b stops emitting light.

As illustrated in FIG. 28, the light-emitting sections 241a and 241b have a lens 243 each. The lenses 243 are made of synthetic resin transparent to light. They are provided in the outer surface of the front wall 5c of the lower housing half 7.

As shown in FIG. 28, a pair of light-emitting diodes 244 is mounted on the lower surface of the circuit board 10. The light-emitting diodes 244 are light sources of the indicator 240. These diodes 244 oppose the bottom wall 5a of the lower housing half 7. The light beams they emit are applied toward the bottom wall 5a. The light beams are guided to the lenses 243 by two light guides 245 which are formed integral with the lenses 243. The light guides 245 extend slantwise from the bottom wall 5a toward the front wall 5c of the lower housing half 7. As seen from FIG. 29, each light guide 245 has a front surface 245a and a rear surface 245b which oppose each other. Both surfaces 245a and 245b are inclined downwards from the front wall 5c toward the bottom wall 5a.

The light guides 245 have a light-receiving section 246 each. The light-receiving sections 246 are located between the bottom wall 5a and the light-emitting diodes 244. Each light-receiving section 246 has an upper surface 246a and a lower surface 246b which oppose each other. The upper surface 246a is substantially parallel to the lower surface of the circuit board 10 and faces one of the light-emitting diode 244. The lower surface 246b is inclined up toward the rear end of the light-receiving section 246. Hence, the light beam emitted downward from the light-emitting diode 244 enters the light-receiving section 246, is reflected by the inclined lower surface 246b, and travels to the light guide 245. In the light guide 245, the light beam is reflected by the front surface 245a of the light guide 245 and further by the rear surface 245b thereof. Finally, the light beam is emitted from the light guide 245, namely from the front of the lower housing half 7.

As shown in FIGS. 27 and 28, the light-receiving sections 246 of the light guides 245 are connected together by a connector 248. The connector 248 has a tongue 249. The tongue 249 is set in contact with the bottom wall 5a. It has a hole, in which a projection 250 protruding upwards from the wall 5a is inserted.

The light beams emitted downwards from the light-emitting diodes 244 are applied to the light-receiving sections 246, travel through the light guides 245, and are guided to the lenses 243 provided in the front wall 5c of the lower housing half 7. Therefore, it is unnecessary to arrange the light-emitting sections 241a and 241b of the indicator 240 in axial alignment with the light-emitting diodes 244. This increases the freedom of positioning the indicator 240 and the light-emitting diodes 244.

The projection 93 of the upper housing half 8, which is required to support the display unit 3, contains not only small components (such as cables and a sub-battery for resume function), but also the AC power unit 150. To be more specific, the AC power unit 150 is provided in the elongated unit receptacle 113 which is located between the U-shaped notches 100a and 100b. Namely, the AC power unit 150 is placed in the dead space in the rear portion of the housing 4. The housing 4 and, ultimately, the computer 1 is smaller than in the case where the AC power unit 150 is not contained in the unit receptacle 113.

Since the projection 93 protrudes upwards from the upper surface 90a of the housing body 90, the AC power unit 150 contained in the projection 93 does not extend to a position below the keyboard 117 or into the rear part of the housing 4. Furthermore, the heat the AC power unit 150 generates while it is converting the commercially available AC power to DC power is radiated from the housing 4 through the front wall 95, top wall 96 and back wall 97 of the projection 93. In particular, the vent holes 162 made in the back wall 97 of the projection 93 help to enhance the efficiency of radiating the heat from the housing 4. The heat does not accumulate in the housing 4. Moreover, the AC power unit 150 can be cooled with the air flowing into the projection 93 through the vent holes 162.

Hence, head can be efficiently radiated from the AC power unit 150 without using a heat sink, though the unit 150 is incorporated in the housing 4. The influence of the heat on the various function components provided in the housing 4, such as the HDD 15 and the battery pack 46, can be reduced to a minimum.

As indicated above, the AC power unit 150 is supported by the connector panel 72 which is made of metal and which contacts the bottom wall 5a and back wall 5d of the lower housing half 7. The heat the unit 150 generates is diffused widely into the lower housing half 7 via the connector panel 72. The heat can be efficiently dissipated outwardly from the housing 4, to prevent a local temperature rise in the projection 93 of the housing 4.

The AC power unit 150 is not only connected to the circuit board 10 by the holder 155, but also supported by the connector panel 72. Therefore it is unnecessary to provide a member on the inner surface of the upper housing half 8 in order to support the AC power unit 150. The upper housing half 8 is more simple than otherwise. Further, the AC power unit 150 is supported at one end by the support wall 158 of the holder 155, merely by setting the wiring board 151 projecting outwards through the notch 153a made in the case 153, into engagement with the engagement projections 159a and 159b of the holder 155.

The unit 150 need not be secured to the support wall 158 by screws. The AC power unit 150 can easily be attached to the support wall 158.

Moreover, the circuit board 10 is free of the influence of the heat radiating from the AC power unit 150. This is because the AC power unit 150 is spaced from the circuit board 10 by a distance equal to the height of the connector panel 72.

As described above, the holder 155 holds not only the AC power unit 150, but also the connectors 164, the lens assembly 180, the switch actuator 188 and the core 228. Neither brackets nor screws are required to support these components 164, 180, 188 and 228. This helps to decrease the number of parts required and to simply the portable computer 1 in structure. In particular, since the core 228 of the cable 226 is fastened directly to the circuit board 10, the passage for the cable 226 connected to the board 10 can be positioned near the node of the circuit board 10 and the cable 226. The cable 226 can therefore be readily positioned with respect to the circuit board 10 and will not be bent or curved too much.

The front wall 95c of the unit receptacle 113 provided in the projection 93 which is required to support the display unit 3 extends forward from the front walls 95a and 95b of the hinge receptacles 114a and 114b. This means that the unit receptacle 113 is large enough to accommodate the AC power unit 150.

The front walls 95a and 95b of the hinge receptacles 114a and 114b are located behind the front wall 95c of the unit receptacle 113, and the flat portions 115a and 115b on the upper surface 90a of the housing body 90 have each a part which is located between the front walls 95a and 95b of one hinge receptacle and the front wall 95c of the unit receptacle 113. The icon 173 is provided on the flat portion 115a and therefore located just in front of the first leg 210a, and the mark 175 is provided in the icon 173. Thus, when the display unit 3 is set at the opened position, exposing the arm rest 91 and the keyboard 117, the user can see the mark 175 on the icon 173 without shifting his or her line of vision greatly from the keyboard 117 or the color liquid crystal display 206. The user can easily and correctly recognize the icon 173.

As described above, the CD-ROM drive 16 is located in the lower housing half 7. The casing 20 of the CD-ROM drive 16 has the recess 36 is contiguous to the corner 35 defined by the disk receptacle 27 and the disk-driving unit 28. The connector support section 10a, the circuit components 13, and the like are packed in this recess 36. No space in the housing 4 is left unused accommodate components. The housing 4 is, therefore, more compact than otherwise.

The present invention is not limited to the first embodiment described above. Rather, there are other embodiments of the present invention.

FIG. 30 shows a portable computer which is the second embodiment. More precisely, FIG. 30 is a sectional view showing a part of the computer. The second embodiment is identical to the first embodiment, except that the CD-ROM drive 16 assumes a different position in the housing 4. The components similar or identical to those of the first embodiment are denoted at the same reference numerals in FIG. 30 and will not be described in detail.

As shown in FIG. 30, the CD-ROM drive 16 is located between the circuit board 10 and the keyboard 117. The CD-ROM drive 16 is secured on the upper surface of the circuit board 10, with the recess 36 facing the right-side wall 5f of the lower housing half 7. Therefore, the one end portion of the board 10 is located below the recess 36.

An input/output connector 261 is mounted on the one end portion of the circuit board 10 and connected to the circuit board 10. The node of the board 10 and the connector 261 is covered by a shield plate 262 which is located on the right side of the node. The connector 261 and the shield plate 262 are provided in the space 37 which is an inner part of the recess 36. The right-side wall 5f of the lower housing half 7 has a hole 263 which faces the input/output connector 261. The hole 263 is usually closed by a connector cover 264 which is rotatably connected to the lower housing half 7.

Figures 31, 32:
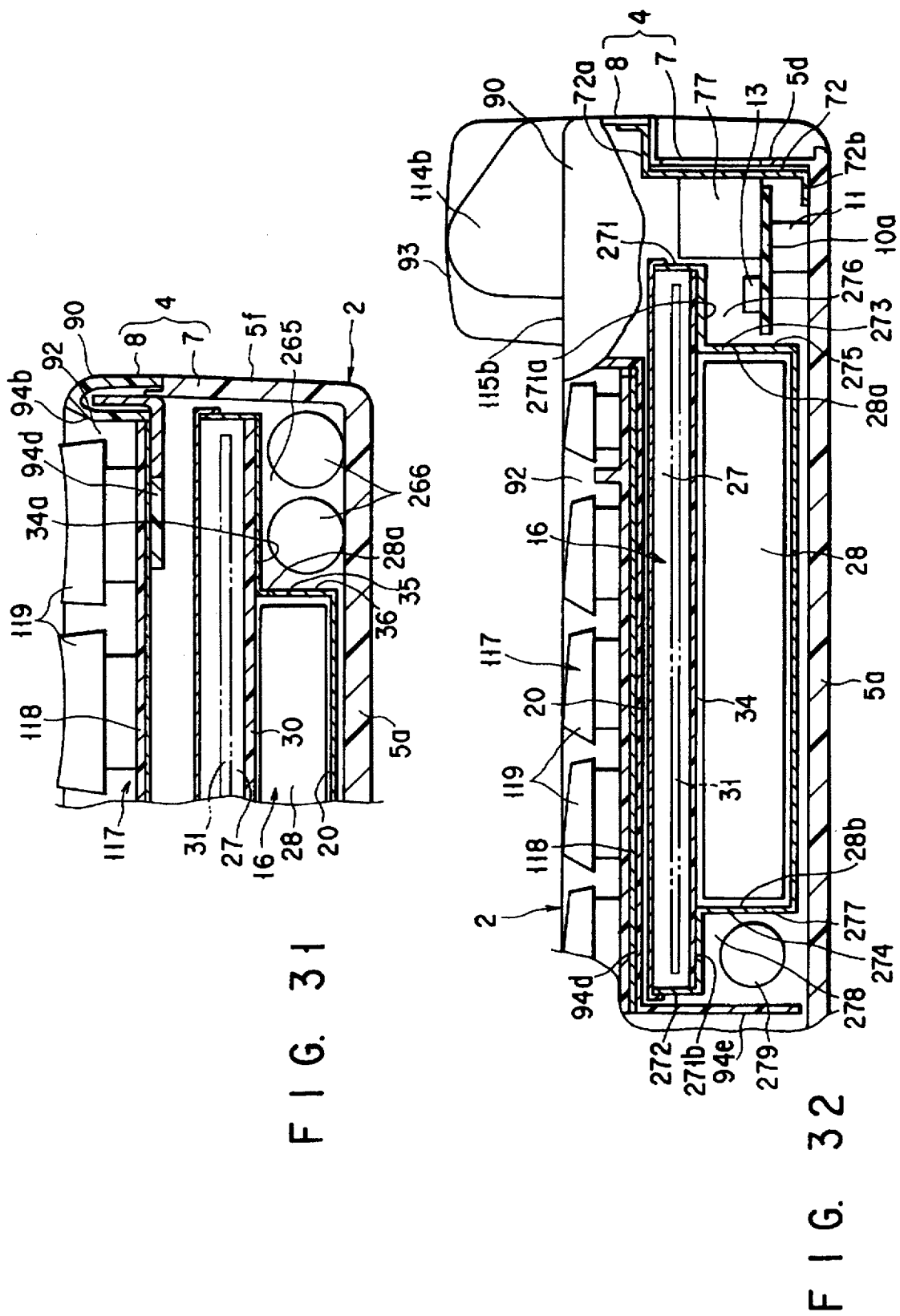
FIG. 31 is a sectional view showing a part of a portable computer which is a third embodiment of the invention.
FIG. 32 is a sectional view showing a part of a portable computer which is a fourth embodiment of the invention.

FIG. 31 shows a portable computer which is the third embodiment of the invention. To sate more correctly, FIG. 31 is a sectional view showing a part of the portable computer.

As in the third embodiment (FIG. 31), the CD-ROM drive 16 is secured on the bottom wall 5a of the lower housing half 7, with the recess recess 36 facing the right-side wall 5f of the lower housing half 7. Thus, the recess 36, the bottom wall 5a and the right-side wall 5f define a space 265. In this space 265 there is provided a plurality of sub-batterys 266 resume function.

In the second and third embodiments shown in FIGS. 30 and 31, the recess 36 of the CD-ROM drive 16 is utilized, accommodating the connector 261 or the sub-batterys 266. The components are packed in the housing 4 at a higher density than in the housing of the conventional portable computer.

FIG. 32 illustrates a portable computer which is the fourth embodiment of the invention. To be more precise, FIG. 32 is a sectional view showing a part of the computer. The fourth embodiment is identical to the first embodiment, except that the casing 20 of the CD-ROM drive 16 has a different shape. The components similar or identical to those of the first embodiment are denoted at the same reference numerals in FIG. 32 and will not be described in detail.

As seen from FIG. 32, the disk receptacle 27 has two projections 271 and 272. The first projection 271 bulges to one side of the disk-driving unit 28, and the second projection 272 to the opposite side of the disk-driving unit 28. The lower surface 271a of the first projection 271 is continuous to the side 28a of the disk-driving unit 28, and the surface 271a and the side 28a define a first corner 273. On the other hand, the lower surface 272a of the second projection 272 is continuous to the other side 28b of the disk-driving unit 28, and the surface 272a and the side 28b define a second corner 274.

The lower surface 271a of the first projection 271 and the side 28a of the disk-driving unit 28 are located at one side of the casing 20. A first recess 275 is formed in this side of the casing 20. The first recess 275 is contiguous to the first corner 273 and has a first space 276 which opens at one side of the casing 20 and the lower surface thereof. The first space 276 faces the bottom wall 5a and back wall 5d of the lower housing half 7. A part of the connector support section 10a of the circuit board 10 is inserted in the first space 276.

The lower surface 272a of the second projection 272 and the other side 28b of the disk-driving unit 28 are located at the other side of the casing 20. A second recess 277 is formed in this other side of the casing 20. The second recess 277 is contiguous to the second corner 274 and has a second space 278 which opens at the other side of the casing 20 and the lower surface thereof. The second space 278 faces the bottom wall 5a and the partition 94e which is the back wall of the battery receptacle 40. A function component 279 such as a sub-battery is inserted in the second space 278.

In the fourth embodiment, both recesses 275 and 277 made in the casing 20 are used to accommodate the connector support section 10a of the circuit board 10 and the function component 279. Thus, no space between the CD-ROM drive 16 and the casing 20 is wasted. The components are packed in the housing 4 at a higher density than in the housing of the conventional portable computer.

FIGS. 33 to 54 shows a portable computer 1 which is the fifth embodiment of the present invention. The fifth embodiment differs from the first embodiment, in the structures of the battery pack 46 and the battery receptacle 40 and in the method of securing the speaker 142. In all other respects the fifth embodiment is identical to the first embodiment. Therefore, the components similar or identical to those of the first embodiment are denoted at the same reference numerals in FIGS. 33 to 54 and will not be described in detail.

Figure 33:
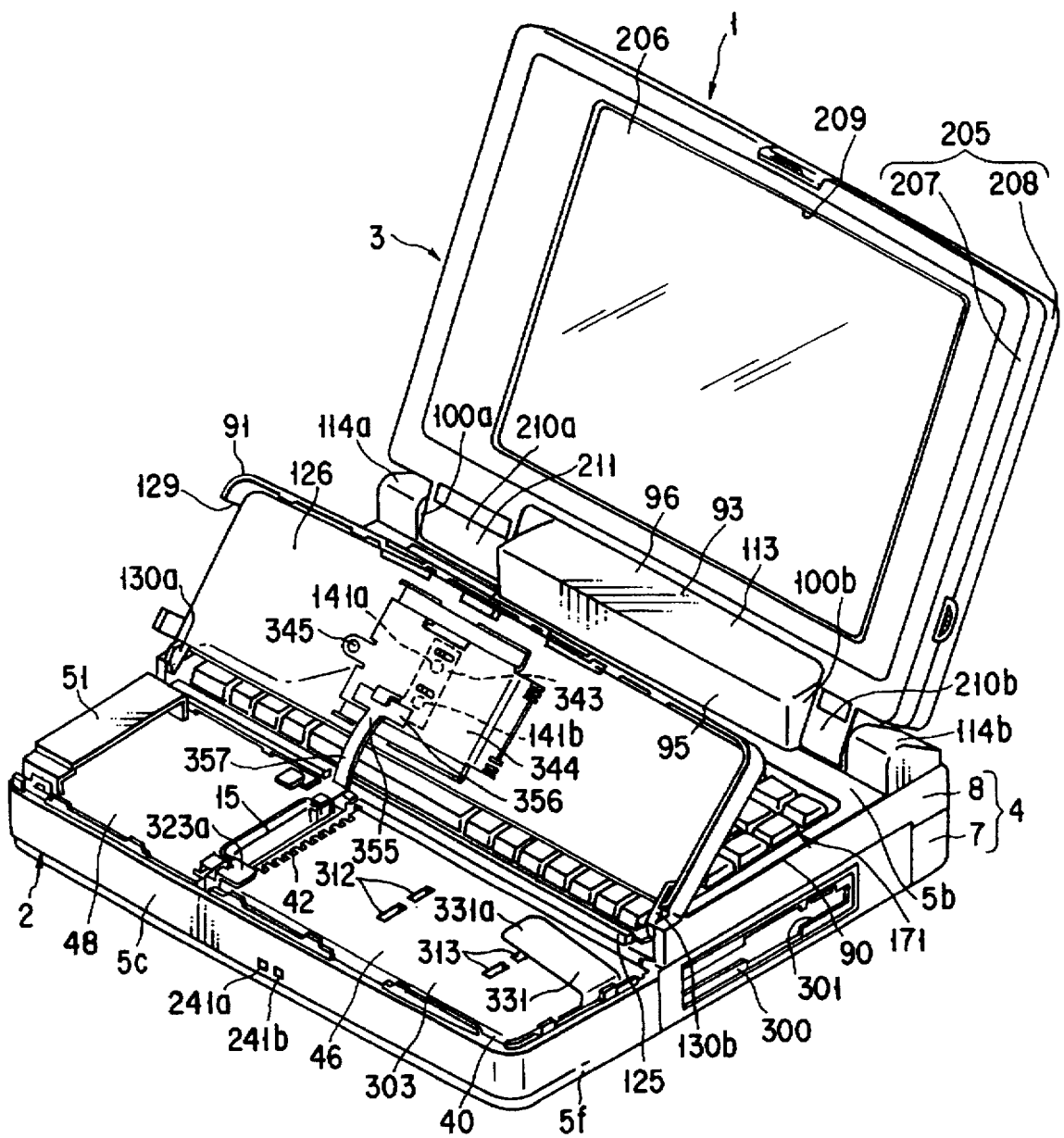
FIG. 33 is a perspective view of a portable computer which is a fifth embodiment of the present invention, showing the arm rest opened, exposing the battery pack.

As shown in FIG. 33, the portable computer 1 incorporates a floppy disk drive 300 instead of a CD-ROM drive 16. The floppy disk drive 300 has a disk insertion port 301 in the right-side wall 5f of the lower housing half 7.

As shown in FIGS. 34 to 37, the battery pack 46 used in the fifth embodiment has a battery case 303 which is made of synthetic resin. The battery case 303 is a rectangular box having a long axis X1 extending in the widthwise direction of the lower housing half 7 and a short axis X2 extending in the depthwise direction of the lower housing half 7. The case 303 comprises a body 303a and a cover plate 303b. The body 303a is a box open at the top. The cover plate 303b closes the open top of the body 303a. The battery case 303 contains, for example, ten nickel-hydrogen secondary cells 304, a thermister 305, a breaker 306, and a fuse 307. The thermister 305, the breaker 306 and the fuse 307 are located in the gaps among the secondary cells 304.

Figures 34, 35:
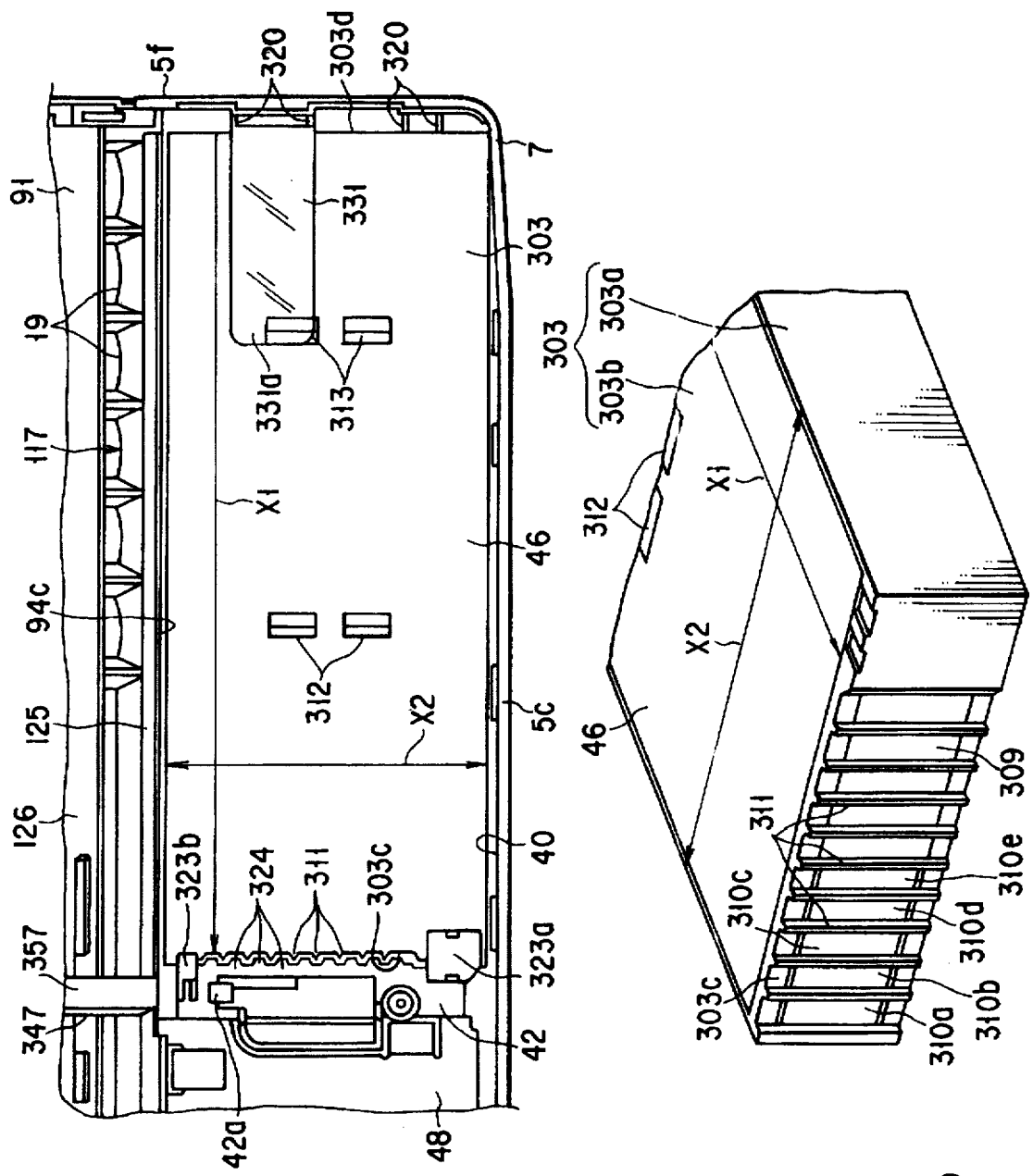
FIG. 34 is a plan view of the front half of the fifth embodiment, showing the battery pack set in the battery receptacle.
FIG. 35 is a perspective view of the battery pack for use in the fifth embodiment, as seen from the terminal side.

As shown in FIG. 35, a terminal holder 309 is mounted on that side 303c of the battery case 303 which extends along the long axis X1. The terminal holder 309 holds five terminal strips 310a to 310e which are juxtaposed along the short axis X2. The first terminal strip 310a and the fifth terminal strip 310e are connected to the secondary cells 304 and function as the positive and negative terminals of the battery pack 46. The second terminal strip 310b and the fourth terminal strip 310d are connected to the thermistor 305. The third terminal strip 310c is used as an auxiliary terminal or terminal for determining the type of the secondary cells 304.

As seen from FIG. 35, too, rib-shaped partitions 311 are provided on the side 303c of the battery case 303. The partitions 311 extend vertically and are spaced apart along the short axis X2. Each partition 311 projects forward more than the terminals strips 310a to 310e and has a part which is interposed between two adjacent terminal strips. Should electrically conductive things, e.g., clips, contact the battery pack 46 at the side 303c, the partitions 311 would prevent them from contacting the terminal strips 310a to 310e. No short-circuiting would happen between any adjacent terminals strips 310a to 310e.

As illustrated in FIG. 34, the cover plate 303b which is the top wall of the battery case 303 has a first pair of recesses 312 and a second pair of recesses 313. The recesses 312 are spaced apart from the recesses 313 along the long axis X1 of the battery case 303. The recesses of each of the first and second pairs are spaced apart along the short axis X2 of the battery case 303.

Figure 36:
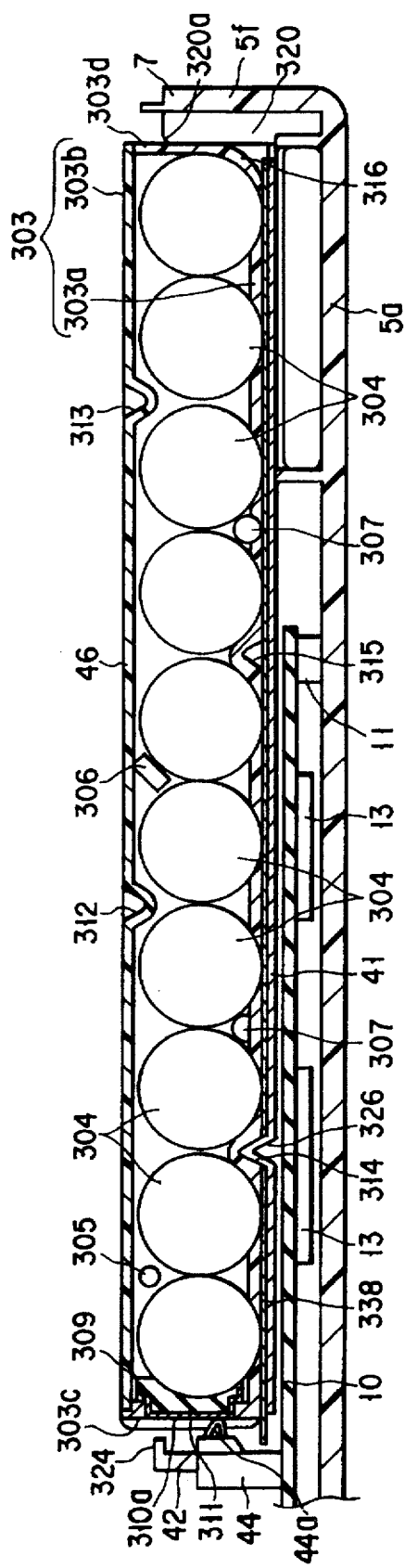
FIG. 36 is a sectional view of a part of the fifth embodiment, showing the battery pack set in the battery receptacle.
Figure 37:
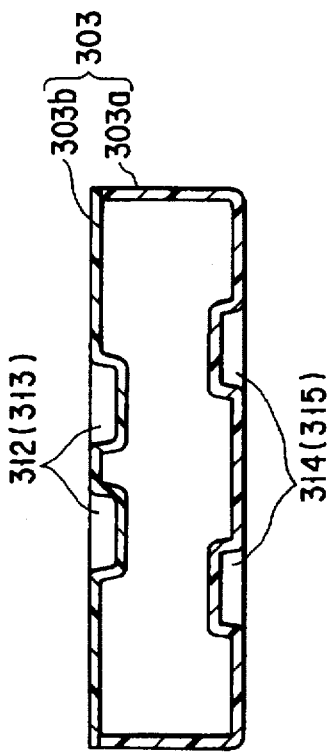
FIG. 37 is a sectional view of the battery case used in the fifth embodiment.

As FIGS. 36 and 37 show, the body 303a which is the bottom wall of the battery case 303 has a third pair of recesses 314 and a fourth pair of recesses 315 (only one shown). The recesses 314 are spaced apart from the recesses 315 in the long axis X1 of the battery case 303. The recesses of each of the third and fourth pairs are spaced apart along the short axis X2 of the battery case 303.

As shown in FIG. 36, the recesses 312 of the first pair are displaced with respect to the recesses 314 of the third pair, along the long axis X1 of the battery case 303. Similarly, the recesses 313 of the second pair are displaced with respect to the recesses 315 of the fourth pair, along the long axis X1 of the battery case 303. As seen from FIG. 37, the distance by which the recesses 312 of the first pair and the recesses 313 of the second pair are spaced apart in the short axis X2 is shorter than the distance by which the recesses 314 of the third pair and the recesses 315 of the fourth pair are spaced apart in the short axis X2.

The positions of the recesses 312 to 315 are determined in accordance with the type and capacity of the battery pack 46.

Hence, seeing the positions of these recesses, the user can easily and clearly understand which type of a battery pack 46 can be used in the portable computer 1.

The battery case 303 has a rounded lower corner 316 defined by the side 303d and the bottom. It should be noted that the side 303d faces away from the side 303c on which the terminals strips 310a to 310e are provided.

As shown in FIGS. 40 and 41, the battery connector 44 to which the battery pack 46 is connected has five connection terminals 44a to 44e. The connection terminals 44a to 44e are biased, projecting outwards. They contact the terminal strips 310a to 310e of the battery pack 46, respectively, as long as the battery pack 46 remains in the battery receptacle 40.

Figure 42:
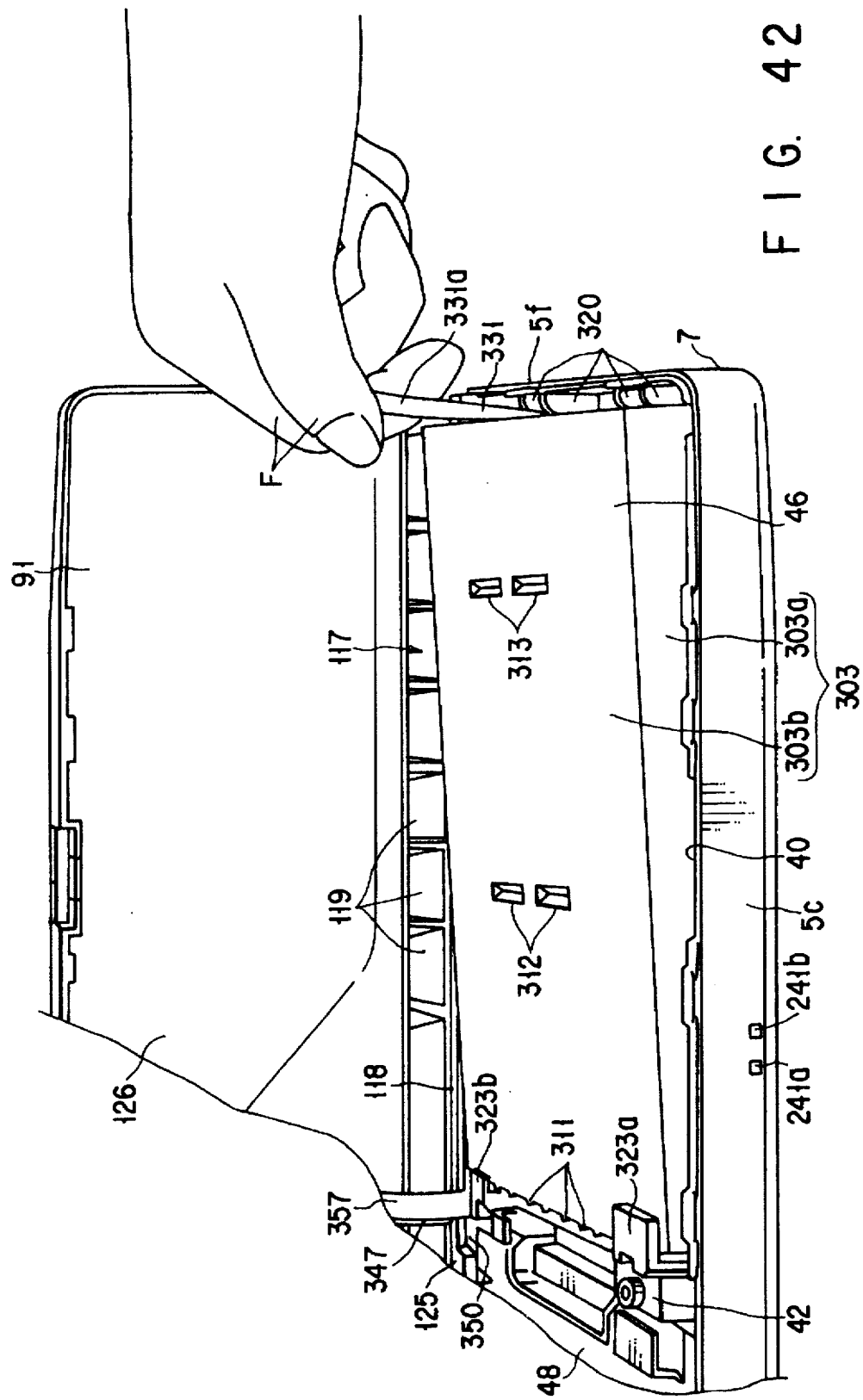
FIG. 42 is a perspective view of the battery receptacle, showing the batter pack pulled upwards.

As illustrated in FIGS. 39 and 42, the battery receptacle 40 has a plurality of ribs 320 which are formed integral with the bottom wall 5a and right-side wall 5f of the lower housing half 7. The ribs 320 extend upwards from the bottom wall 5a and are spaced apart from one another in the short axis X2 of the battery case 303. Each rib 320 is rounded at the top 320a.

As shown in FIG. 41, the battery holder 42 has a guide surface 322 and a pair of guides 323a and 323b. The guide surface 322 is continuous to the battery connector 44. The guides 323a and 323b protrude upwards from the upper edge of the guide surface 322 toward the battery receptacle 40. The guides 323a and 323b are spaced apart in the short axis X2 of the battery case 303. A plurality of engagement projections 324, shaped like comb teeth, are formed integral with the upper edge of the guide surface 322. These projections 324 are spaced apart in the short axis X2 of the battery case 303. Some of the engagement projections 324 are located right above the five connection terminals 44a to 44e and slip into the gap between the partitions 311 of the battery pack 46.

As seen from FIGS. 40 and 41, the shield plate 41 which is the bottom wall of the battery receptacle 40 has a pair of projections 326. The projections 326 are fitted into the recesses 314 of the third pair of the battery pack 46 when the battery pack 46 is set into the battery receptacle 40.

To set the battery pack 46 into the battery receptacle 40, the user positions the battery pack 46 such that the side 303c of the case 303 is directed toward the battery connector 44. Thus, the terminal strips 310a to 310e, which are mounted on the side 303c, oppose the battery connector 44. Then, the user holds the battery pack 46, with the rounded lower corner 316 of the case 303 directed downwards.

Next, as shown in FIG. 38, the user inserts the battery pack 46 into the battery receptacle 40, while holding the pack 46 in an inclined position and keeping the terminal strips 310a to 310e at the lowest position. One end of the battery pack 46 is thereby held between the shield plate 41 and the guides 323a and 323b of the battery holder 42. At this time, the partitions 311 of the battery case 303 slip into the gap between the engagement projections 324 of the battery holder 42. As a result, the terminal strips 310a to 310e come into contact with the connection terminals 44a to 44e of the battery connector 44.

Then, the user rotates the battery pack 46 downwards around the nodes of the terminal strips 310a to 310e and the connection terminals 44a to 44e, thereby dropping the pack 46 into the battery receptacle 40. In this process, the battery pack 46 does not interfere with the rib 320 since the battery case 303 has the rounded lower corner 316 facing downwards and contacting the ribs 320. If the user hold the battery pack 46, mistakenly upside down as shown in FIG. 39, in his or her attempt to place the pack 46 in the battery receptacle 40, the pack 46 will interfere with the ribs 320. This is because the angular corner of the battery case 303 faces downwards and abuts on the ribs 320. In this case, the battery pack 46 cannot be further inserted into the battery receptacle 40. From this condition the user notices that he or she is holding the pack 46 upside down.

When the battery pack 46 is set fully into the battery receptacle 40, the projections 326 protruding from the bottom of the receptacle 40 fit into the recesses 314 (the third pair) made in the bottom wall of the battery case 303. Seeing this happen the user understands that the battery pack 46 is of the type that can be used in the portable computer 1. If he or she inserts a battery pack which cannot be used in the computer 1 into the receptacle 40 or inserts the pack 46 while holding it upside down as shown in FIG. 39, the projections 326 abut on the lower surface of the battery pack, inclining the pack and preventing the pack from further moving into the receptacle 40. The projections 326 prohibit the use of a wrong battery pack and an wrong positioning of the battery pack.

When the battery pack 46 is correctly fitted in the battery receptacle 40, it is pushed toward the ribs 320 by the connection terminals 44a to 44e of the battery connector 44. Thus pushed, the pack 46 is clamped between the terminals 44a to 44e, on the one hand, and the ribs 320, on the other hand. The battery pack 46 is thereby held firmly in the receptacle 40, electrically connected to the battery connector 44.

After the battery pack 46 is completely set in the battery receptacle 40, the partitions 311 of the battery case 303 slip into the gap between the engagement projections 324 of the battery holder 42 as is illustrated in FIG. 34. Those portions of the partitions 311, now clamped the engagement projections 324, are located above the position where the terminal strips 310a to 310e contact the connection terminals 44a to 44e. Thus located, the portions of the partitions 311 prevent anything, such as an electrically conductive member such as a clip, from contacting the terminal strips 310a to 310e or the connection terminals 44a to 44e. Short circuiting is thereby avoided.

As shown in FIG. 41, the shield plate 41 has a cutout 327 in the edge 41a which is adjacent to the battery connector 44. The cutout 327 is located below the nodes of the connection terminals 44a to 44e and the terminal strips 310a to 310e. An electrically conductive member such as a clip, if clamped between the front of the battery pack 46 and the shield plate 41, slips into the cutout 327. The cutout 327 therefore prevent the shield plate 41 from being short-circuited to the terminal strips 310a to 310e.

As seen from FIG. 40, a ribbon 331 is provided in the battery receptacle 40, for facilitating the removal of the battery pack 46 from the battery receptacle 40. The ribbon 331 is made of synthetic resin and has a width of about 20 mm. It is rigid enough to remain straight.

The ribbon 331 is connected to the shield plate 41. To be more specific, the shield plate 41 has a ribbon-fastening portion 332. The ribbon-fastening portion 332 is located closer to the ribs 320 than to the battery connector 44. The portion 332 has a pair of slits 332a and 332b which extend along the short axis X2 of the battery case 302. The slits 332a and 332b are spaced along the long axis X1 of the battery case 303.

A buckle 334 is formed to one end of the ribbon 331, extending at right angles to the ribbon 331. The buckle 334 is a rectangular plate broader than the ribbon 331. It will be laid on the shield plate 41 when the ribbon 331 is connected to the shield plate 41. It has a slit 335 through which the ribbon 331 can pass. The ribbon 331 can be secured to the ribbon-fastening portion 332 of the shield plate 41 when it is guided through the slits 332a and 332b made in the portion 332 and the slit 335 made in the buckle 334.

Figure 43B:
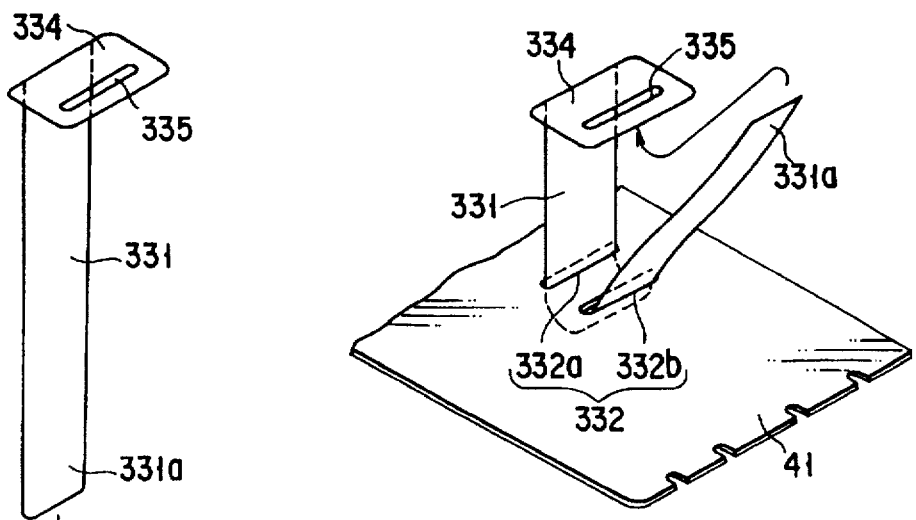
FIG. 43B is a perspective view, illustrating the ribbon which is being pulled upwards after it has been passed through the slit, turned around and passed through another slit made in the shield plate.
Figure 43A:
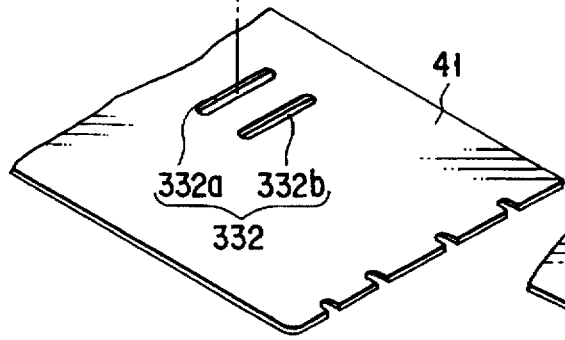
FIG. 43A is a perspective view, showing a ribbon which is about to be inserted into a slit made in the shield plate used in the fifth embodiment.
Figure 43C:
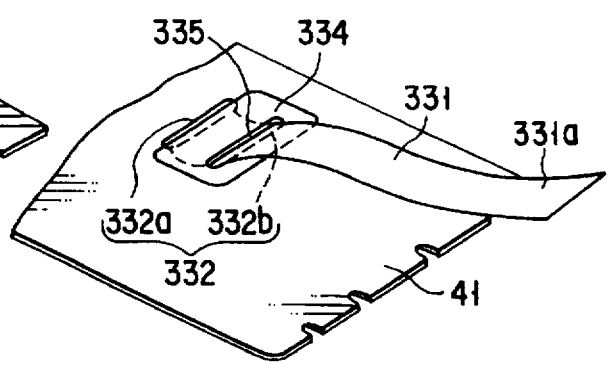
FIG. 43C is a perspective view, showing the ribbon fastened to the shield plate.

How to connect the ribbon 331 to the portion 332 of the shield plate 41 will be explained, with reference to FIGS. 43A, 43B and 43C. First, as shown in FIG. 43A, the end portion 331a of the ribbon 331, to which no buckle is secured, is passed downwards through the first slit 332a. Then, as shown in FIG. 43B, the end portion 331a of the ribbon 331 is bent upward and passed through the second slit 332b and is pulled upward for some distance. The end portion 331a of the ribbon 331 is passed through the slit 335 of the buckle 334. Finally, as shown in FIG. 43C, the end portion 331a of the ribbon 331 is pulled upwards until the buckle 334 is pulled downward onto the upper surface of the shield plate 41. The ribbon 331 is thereby fastened to the ribbon-fastening portion 332 of the shield plate 41.

Once connected to the shield plate 41, the ribbon 331 remains extending straight upward from the battery receptacle 40 as shown in FIG. 40, because it is sufficiently rigid. After the battery pack 46 has been set in the battery receptacle 40, the lower portion of the ribbon 331 is clamped between the bottom of the battery receptacle 40 and the battery pack 46, and the remaining portion of the ribbon 331 (including the end portion 331a) remains extending upwards above the battery pack 46. Hence, if the ribbon 331 is pinched with the fingers F at the end portion 331a and pulled up as shown in FIG. 42, the battery pack 46 is pulled up at one end from the battery receptacle 40. This makes it easy for the user to remove the battery pack 46 from the battery receptacle 40.

Since the ribbon-fastening portion 332 is located closer to the ribs 320 than to the battery connector 44, the angle is limited at which battery pack 46 is inclined when pulled up at one end as the user pulls the ribbon 331 upwards. No excessive force is exerted on the terminal strips 310a to 310e of the pack 46 or the connector terminals 44a to 44e of the battery connector 44, thus preventing damages to the strips 310a to 310e and the terminals 44a to 44e.

The ribbon 331 is rigid enough to remain straight. It retains an upright position, extending upwards from the battery receptacle 40, even after the battery pack 46 has been removed from the battery receptacle 40. Retaining an upright position, the ribbon 331 is seen well. The user can therefore take care not to push the ribbon 331 into the battery receptacle 40 while he or she is setting the pack 46 into the battery receptacle 40. Thus, the ribbon 331 helps the user to remove the battery pack 46 from the receptacle 40.

As described above, the ribbon 331 is fastened to the portion 332 of the shield plate 41, merely by being guided through the slits 332a and 332b of the portion 332 and the slit 335 of the buckle 334. No adhesive needs to be applied and dried to connect the ribbon 331 to the shield plate 41. Therefore, the ribbon 331 can be easily and quickly fastened to the shield plate 41. Should it be damaged, the ribbon 331 could be easily removed from the shield plate 41 and fast replaced by a new one.

That portion of the ribbon 331 which extends up from the battery receptacle 40 slips into the gap between the receptacle 40 or the pack 46 and the arm rest 91 when the arm rest 91 is rotated to the closed position. As long as the arm rest 91 stays in the closed position, the ribbon 331 remains concealed in the housing 4 and unseen from the outside, thus maintaining the good appearance of the computer 1.

As shown in FIGS. 40 and 41, the upper surface of the shield plate 41, i.e., the bottom of the battery receptacle 40, is covered with a black insulating sheet 338. The insulating sheet 338 has a plurality of openings 339 for guiding the projections 326 and the ribbon 331. The sheet 338 conceals the components (e.g., the shield plate 41) provided on the bottom of the receptacle 40 even after the battery pack 46 has been removed therefrom. The outer appearance of the battery receptacle 40 is therefore good.

As seen from FIG. 33, the click switches 141a and 141b arranged on the hand rest 126 are supported by a flexible printed wiring strip 343. The printed wring strip 343 is secured to the lower surface of the hand rest 126 by means of a protective cover 344. The protective cover 344 is fastened by a screw 345 to the lower surface of the hand rest 126.

Figure 44:
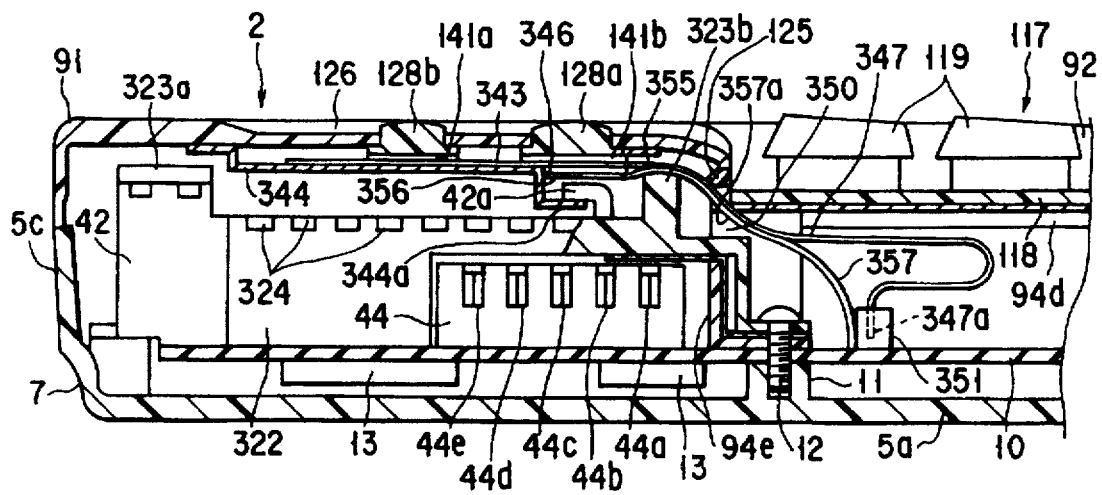
FIG. 44 is a sectional view of a part of the fifth embodiment, showing the arm rest rotated into the closed position.

As shown in FIGS. 44 and 45, the protective cover 344 has a cable-guiding hole 346 and an engagement member 344a. Both the hole 346 and the member 344a are located near the keyboard 117. The engagement member 344a catches a hook 42a protruding from the upper surface of the battery holder 41, when the arm rest 91 (including the hand rest 126) is rotated to the closed position.

The printed wiring strip 343 has a flat and soft cable portion 347. The cable portion 347 is a band having a width of about 5 mm. It has a wiring pattern on one side only. The wiring pattern is connected to the click switches 141a and 141b. The cable portion 347 has a terminal section 347a to which the wiring pattern is connected.

As illustrated in FIGS. 44 and 45, the cable portion 347 is led into the gap between the HDD 15 and the battery receptacle 40 through the cable-guiding hole 346 of the protective cover 344. The cable portion 347 has a portion which oppose the battery holder 42 and which is arched curved toward the keyboard 117. The distal end portion of the cable portion 347 extends through a cable passage 350 provided between the partition 94e and the keyboard holder 125 and turns into a space beneath the keyboard 117. The terminal section 347a of the cable portion 347 is connected to a connector 351 mounted on the circuit board 10, at a position below the front of the keyboard 117.

The arm rest 91 supporting the printed wiring strip 343 can be rotated between its closed position and its opened position. To allow the arm rest 91 to rotate smoothly, the cable portion 347 of the printed wiring strip 343 is first led backwards from the connector 351 and then turned forwards, thus bent in the form of letter U in the space between the circuit board 10 and the keyboard 117. Thus bent, the cable portion 347 is long enough not to prevent the arm rest 91 from rotating.

A guard member 355 is secured to the protective cover 344, protecting that portion of the cable portion 347 which projects from the protective cover 344. The guard member 355 is made a synthetic resin sheet that can undergo elastic deformation. The member 355 has a support 356 and a cable guide 357. The support 356 is adhered to the protective cover 344. The cable guide 357 is a band which has substantially the same width as the cable portion 347.

As seen from FIG. 44, the cable guide 357 has a bent portion 357a which inclines downward and toward the cable passage 350 while the arm rest 91 remains in the closed position. The distal end portion of the bent portion 357a extends through the cable passage 350 to a space below the keyboard 117. The cable guide 357 is elastic and yet rigid enough to retain the bend portion 357a. It is placed in sliding contact with the lower surface of the cable portion 347.

Being soft, the cable portion 347 is pushed down from the cable passage 350 toward the space below the keyboard 117, extending along the upper surface of the cable guide 357. Thus, the cable portion 347 is bent in a specific shape and extends through a specific passage.

When the arm rest 91 is rotated to its opened position as illustrated in FIG. 45, the cable guide 357 is bent upwards in the form of an arc, despite of its elasticity. The cable portion 347 set in sliding contact with the cable guide 357 is bent upwards and slantwise as it is pushed onto the keyboard 117 while sliding on the cable guide 357. In other words, the cable guide 357 determines the shape in which the cable portion 347 is bent and the passage through which the cable portion 347 extends.

Thanks to the cable guide 357, the cable portion 347 can be pushed into and pulled from the space below the keyboard 117 through the cable passage 350, while retaining a gently curved shaped, when the user opens and closes the arm rest 91 to replace the battery pack 46 with a new one. The flexible cable portion 347 is neither bent sharply nor folded in the cable passage 350. The wires of the wiring pattern provided on the cable portion 347 would therefore not be damaged or broken.

The distal end portion of the cable guide 357 is inserted into the space below the keyboard 117. Hence, it can move to some extend in the depthwise direction of the housing 4. The cable guide 357 may have any structure other than the above-described one. For instance, its distal end may be fastened by a screw to the lower housing half 7. In this case, the cable guide 357 needs to be long enough not to prevent the smooth rotation of the arm rest 91.

Figure 47:
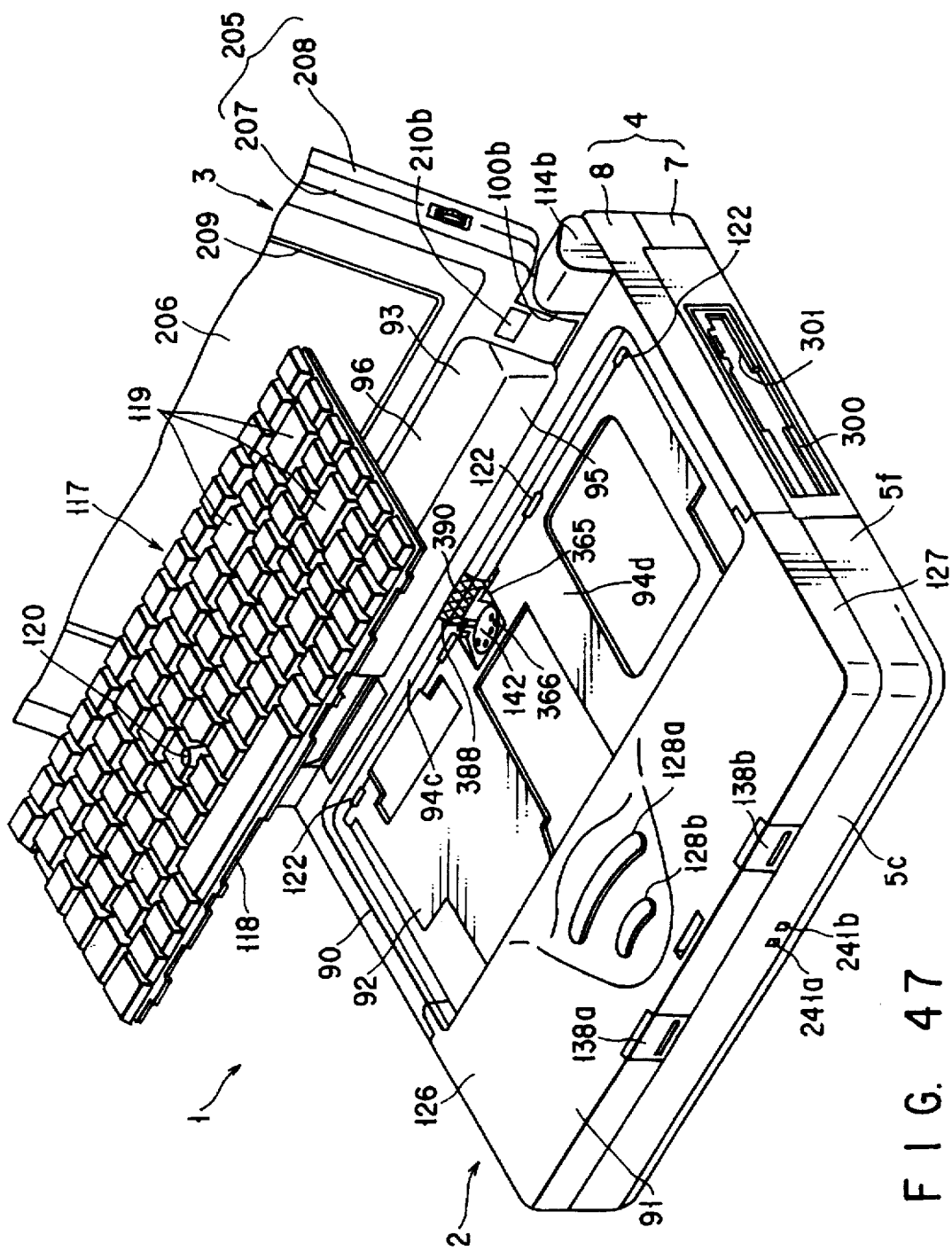
FIG. 47 is a perspective view of the fifth embodiment, showing the keyboard removed from the keyboard receptacle.

As shown in FIG. 47, the portable computer 1 has a speaker 142 is provided below the rear end portion of the keyboard 117. As seen from FIG. 48, the speaker 142 has a ring-shaped frame 361 and a cover 362. The frame 361 supports a vibration plate (not shown). The cover 362 covers the upper surface of the vibration plate. The speaker 142 is secured to the housing body 90 of the upper housing half 8. More specifically, as shown in FIGS. 48 to 52, a speaker receptacle 365 is mounted on the bottom wall 94d of the keyboard receptacle 92. The speaker receptacle 365 has a support wall 366 which inclines downwards gradually toward the rear edge of the bottom wall 94d. The support wall 366 has a circular hole 367, which faces the lower surface of the keyboard panel 118. A back wall 368 extends upwards from the rear edge of the support wall 366.

The lower surface 366a of the support wall 366 is flat, supporting the speaker 142. A guide wall 370 is provided on the front half of the lower surface 366a. The guide wall 370 is arcuate, extending around the rim of the circular hole 367 made in the support wall 366. A claw 371 and a boss 372 protrudes downwards from the bottom wall 94a of the keyboard receptacle 92. The claw 371 and the boss 372 oppose each other, across the circular hole 367.

The speaker 142 is held by a speaker holder 373 which is made of soft rubber-like elastic material. The speaker holder 373 has a cup-shaped body 374, in which the frame 361 of the speaker 142 is fitted. The body 374 comprises a bottom wall 375 and an annular wall 376. The bottom wall 375 contacts the bottom of the speaker 142. The annular wall 376 extends upwards from the circumference of the bottom wall 375.

Figure 48:
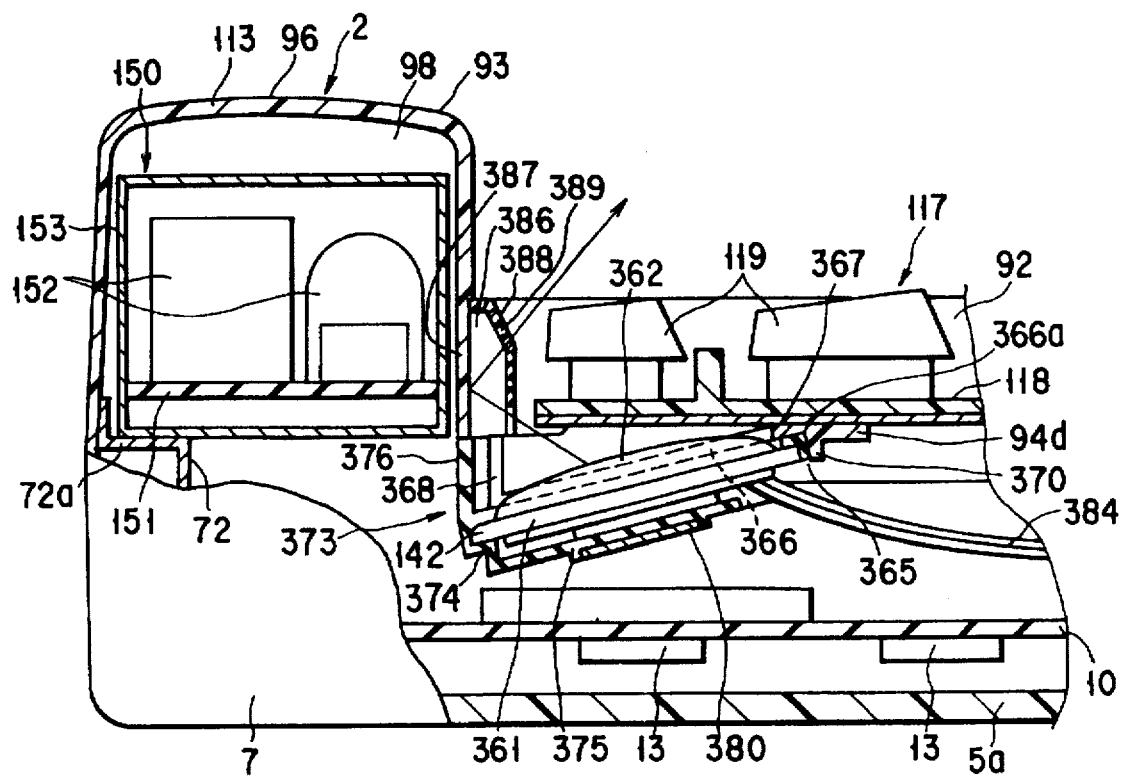
FIG. 48 is a sectional view of a part of the fifth embodiment, illustrating the speaker holding section.
Figure 49:
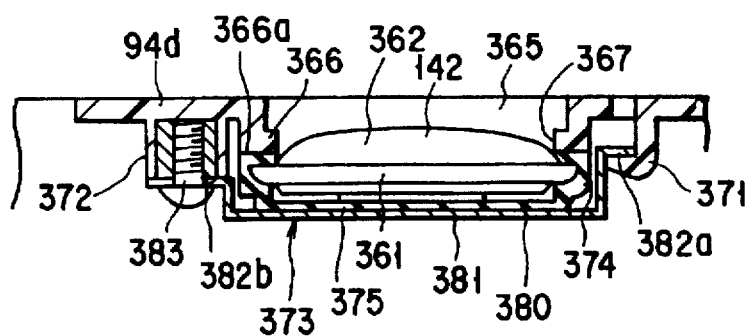
FIG. 49 is a sectional view of the speaker holding section.

As illustrated in FIG. 52, the speaker 142 is attached, together with the speaker holder 373, to the speaker receptacle 365 from below. As shown in FIG. 48, the upper surface of the holder 374 is continuous to the lower surface 366a of the support wall 366, and the annular wall 376 is continuous to the back wall 368 of the speaker receptacle 365. Therefore, the speaker holder 373 completely closes the circular hole 367.

The speaker 142 and the speaker holder 373 are fastened to a metal bracket 380, which in turn is connected to the speaker receptacle 365. The bracket 380 has a support 381 and a pair of engagement members 382a and 382b. The support 381 is a flat plate laid on the bottom wall 375 of the speaker holder 373. The engagement members 382a and 382b are formed integral with the support 381 and located at the ends of the support 381, respectively. The first engagement member 382a catches the claw 371, whereas the second engagement member 382b is fastened by a screw 383 to the boss 372. The bracket 380 is thereby secured to the speaker receptacle 365, thus fixing the speaker 142 and the speaker holder 373 to the speaker receptacle 365. The body 374 of the speaker holder 373 is interposed between the speaker 142 and the lower surface 366a of the support wall 366. Thus, below the keyboard 117, the speaker 142 is inclined downward toward the rear of the housing 4, along the lower surface 366a of the support wall 366.

The leads 384 of the speaker 142 is led into a space below the keyboard receptacle 92, passing through the body 374 of the speaker holder 373. The leads 384 are connected at their distal ends to the circuit board 10 by a speaker connector (not shown).

As shown in FIGS. 48 and 50, the back wall 94c of the keyboard receptacle 92 has a rectangular opening 386, through which the sound the speaker 142 generates may be transmitted. The opening 386 extends in the widthwise direction of the housing body 90 of the upper housing half 8 and communicates with the speaker receptacle 365. The housing body 90 has a reflection wall 387 which faces the opening 386 and which extends downwards at the rear of the back wall 94c of the keyboard receptacle 92. The lower end of the wall 387 is substantially flush with the annular wall 376.

As shown in FIGS. 48 and 50, too, a decoration cover 388 is attached to the keyboard receptacle 92, closing the rectangular opening 386 made in the back wall 94c of the keyboard receptacle 92. The decoration cover 388 has a number of tiny through holes 389. The cover 388 functions as a sound-emitting section 390, emitting the sound generated by the speaker 142. The sound-emitting section 390 is located at the central part of the back wall 94c of the keyboard receptacle 92 and near the rearmost row of keys 119 on the keyboard 117. The section 390 opposes the user as long as the display unit 3 stays in the opened position.

As described above, the speaker 142 is inclined downwards toward the rear of the housing 4, in the space below the keyboard 117. The sound emitted from the sound-emitting section 390 propagate from the housing body 90 in the direction of the arrow shown in FIG. 48. That is, the sound waves travel along a path inclined upwards toward the rear of the housing body 90. The reflection wall 387, which is located in this path, reflects the sound waves, which propagate forward. As a result, the user can hear the sound well though the speaker 142 is provided below the keyboard 117.

Arranged below the keyboard 117 is the circuit board 10 only. A larger space is provided below the keyboard 117 than below the arm rest 91 which covers the battery pack 46. The speaker 142 can be a relatively large one which generates high-quality sound.

In addition, since the speaker holder 373 interposed between the speaker 142 and the speaker receptacle 365 is made of soft rubber-like elastic material, the vibration of the speaker 142 is hardly transmitted to the housing body 90, preventing the housing 90 from resonating. Due to the use of the speaker holder 373, there is no gap between the speaker 142 and the support wall 366. A sound wave traveling upwards from the speaker 142 and a sound wave traveling downwards therefrom do not interfere with each other. The housing body 90 does not resonate. Nor do the sound waves emitted by the speaker 142 in different direction interfere with each other. The sound the speaker 142 generates is large in volume and good in quality.

As seen from FIG. 53, the keyboard 117 has two cables 400 and 401. The first cable 400 is provided to supply signals the keyboard 117 generates when the user operates the keys 119. The second cable 401 is used to supply signals the joystick 120 generates when operated by the user. The cables 400 and 401 are flat flexible printed wiring strips. The first cable 400 is much broader than the second cable 401. Both cables 400 and 401 extend from the front edge of the keyboard panel 118. The first cable 400 has a terminal section 400a at its distal end, and the second cable 401 has a terminal section 401a at its distal end. The second cable 401 should have a less electric resistance than the first cable 400. To this end, the cables 400 and 401 are made of different materials.

The first cable 400, which is broader than the second cable 401, has a substrate 402. No wiring pattern 400b is formed on one lateral edge portion of the substrate 402. The substrate 402 has a slit 403 cut in the middle portion, in that lateral edge portion. The narrow second cable 401 extending from the front edge of the keyboard panel 118 is mounted on the upper surface of the first cable 400 and led onto the lower surface thereof through the slit 403.

The terminals sections 400a of the cables 400 and the terminal section 401a of the cable 401 are located in the same plane as shown in FIG. 54. A protective tape 404 made of synthetic resin is laid on the terminal sections 400a and 401a and adhered thereto by an adhesive layer 405. The cables 400 and 401 are thereby bound together. Thanks to the protective tape 404, the terminal sections 400a and 401a have the same thickness, as can be understood from FIG. 54. They are connected to a keyboard connector (not shown).

Since the first cable 400 and the second cable 401 have their terminal sections 400a and 401a fastened together, they can be easily incorporated into the housing 4. Furthermore, it suffices to connect the terminal sections 400a and 401a to a single component, i.e., the keyboard connector. The computer 1 can be assembled in less steps than in the case where the cables 400 and 401 need to be connected to two connectors mounted on the circuit board 10. In other words, the computer 1 can be assembled faster than otherwise.

The protective tape 404 may have an extension which reaches the middle portions of the cables 400 and 401, and adhesive may be applied to this extension, thereby to bonding both cables 400 and 401 to the extension of the tape 404. In this case, as well, the first cable 400 and the second cable 401 are fastened together.

The present invention is not limited to the first to fifth embodiments described above.

FIG. 55 is a perspective view of the battery pack 46 as seen from the terminal side, said pack designed for use in a portable computer which is the sixth embodiment of the invention. The battery pack 64 differs from its counterpart used in the fifth embodiment. To be more specific, the battery case 303 has five spare terminal strips 310f to 310j mounted on the side 303c, in addition to the first to tenth terminal strips 310a to 310j. Namely, the battery pack 46 has ten terminal strips 310a to 310j in all.

The battery case 303 contains five nickel-hydrogen secondary cells 304 and five lithium-ion secondary cells (not shown). The lithium-ion secondary cells are connected to the sixth terminal strip 310f and the tenth terminal strip 310j, and the terminal strips 310f and 310j are used as other output terminals of the battery pack 46. When the pack 46 is set in the battery receptacle 40, the terminal strips 310a to 310e or the terminal strips 310f to 310j contact the connection terminals 44a to 44e of the battery connector 44, in accordance with whether the cover plate 303b is turned upwards or downwards. More precisely, when the pack 46 is fitted in the receptacle 40 with the cover plate 303b turned upward, the first to fifth terminal strips 310a to 310e contact the connection terminals 44a to 44e. On the other hand, when the pack 46 is fitted in the receptacle 40 with the cover plate 303b turned downward, the sixth to tenth terminal strips 310f to 310j contact the connection terminals 44a to 44e. Hence, the portable computer 1 can be driven by two types of cells by using only one battery pack 46.

Having ten terminal strips 310a to 310j, the battery pack 46 is can be used in portable computers which will be developed in future and which have a battery connector with more than five connection terminals for controlling the battery pack in terms of more items. In view of this, the battery pack 45 shown in FIG. 55 is versatile.

FIGS. 56 and 57 show a portable computer 1 which is a seventh embodiment of the invention. More correctly, FIG. 56 is a sectional view of a part of the computer 1, and FIG. 57 is an enlarged view of section 57 in FIG. 56.

As shown in FIGS. 56 and 57, the seventh embodiment differs from the fifth embodiment, only in the structure for pushing the cable portion 347 of the printed wiring strip 343, downwards toward the keyboard 117. As shown in FIG. 57, the cable guide 357 is adhered to the cable portion 347 by a layer 410 such as an adhesive layer or a double-sided adhesive tape. The cable guide 357 strongly pushes the cable portion 347 toward the keyboard 117.

Also in the seventh embodiment, the cable guide 356 guides a specific portion of the flexible cable portion 347 in a specific bending path. Hence, the cable portion 347 is neither bent sharply nor folded in the cable passage 350. The wires of the wiring pattern provided on the cable portion 347 would therefore not be damaged or broken.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable electronic apparatus comprising:

a main body including a box-shaped housing having a circuit board provided therein, a holder being mounted to said circuit board, said box-shaped housing having a unit receptacle protruding upwardly from a top of said box-shaped housing and located in a rear part of said box-shaped housing, said unit receptacle defining a chamber;

a display unit coupled to the rear part of said box-shaped housing; and an AC power unit, housed in said chamber and supported by said holder, for converting an AC current to a DC current, said AC power unit being electrically connected to said circuit board and having circuit components which generate heat during an operation of conversion.

2. A portable electronic apparatus according to claim 1, wherein said unit receptacle includes a wall in which a plurality of vent holes are made through to said chamber, said plurality of vent holes facing said AC power unit.

3. A portable electronic apparatus according to claim 1, wherein said AC power unit has a cable including a connector, said holder has a connector holder which faces said circuit board, and said connector holder sandwiches said connector in cooperation with said circuit board.

4. A portable electronic apparatus according to claim 1, wherein said box-shaped housing has an upper surface on which input means for inputting data is provided, said display unit is supported by said box-shaped housing to be rotatable between a closed position where said display unit covers said upper surface and said input means from above and an opened position where said display unit stands up in rear of said input means and said unit receptacle includes a top wall which is interposed between said display unit and said AC power unit when said display unit is rotated to the opened position.

5. A portable electronic apparatus according to claim 1, wherein said housing includes a lower housing for containing said circuit board and an upper housing removably joined with said lower housing and including said unit receptacle.

6. A portable electronic apparatus according to claim 1, wherein said AC power unit has a wiring board supporting said circuit components and a case surrounding said wiring board and said circuit components.

7. A portable electronic apparatus comprising:

a main body including a bottom wall, a back wall communicating with the bottom wall, a top wall located at the upper side of the back wall, a unit receptacle protruding from the top wall, and display support means arranged adjacent to said unit receptacle, said unit receptacle having a chamber including a communication portion which communicates with an inside of said main body, a circuit board being mounted on the bottom wall, a connector support member located at an inner side of the back wall, and a holder facing the communication portion being mounted on said circuit board;

a display unit having leg means supported by said display support means; and a unit contained in said chamber including circuit components which generate heat during an operation said unit being supported by said connector support member and said holder and being exposed to the inside of said main body via said communication portion.

8. A portable electronic apparatus according to claim 7, wherein said unit receptacle has a wall on which a plurality of vent holes are made through to said chamber and said plurality of vent holes face said unit.

9. A portable electronic apparatus according to claim 7, wherein said display support means is constructed and arranged to be rotatable between a closed position where said display unit covers said top wall from above and an opened position where said display unit stands up in a rear portion of said top wall, and said unit receptacle includes a wall which is interposed between said display unit and said unit when said display unit is rotated to the opened position.

10. A portable electronic apparatus according to claim 7, wherein said unit is fixed to said connector support member via a screw.

11. A portable electronic apparatus according to claim 7, wherein said unit is an AC power unit constructed and arranged to convert AC power to DC power and supply the DC power to said circuit board.

* * * * *